(12) United States Patent
Matsumoto

(10) Patent No.: US 6,295,421 B1
(45) Date of Patent: *Sep. 25, 2001

(54) CAMERA

(75) Inventor: Toshio Matsumoto, Machida (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/238,039

(22) Filed: Jan. 27, 1999

(30) Foreign Application Priority Data

Jan. 30, 1998 (JP) .................................... 10-034212
Jan. 30, 1998 (JP) .................................... 10-034214

(51) Int. Cl.$^7$ .................................................. G03B 17/02
(52) U.S. Cl. ........................................... 396/536; 396/538
(58) Field of Search .................................. 396/511, 513, 396/535, 536, 538

(56) References Cited

U.S. PATENT DOCUMENTS

| | | | | |
|---|---|---|---|---|
| 5,473,401 | * | 12/1995 | Tsunejuji | 396/536 |
| 5,481,325 | * | 1/1996 | Wada et al. | 396/538 |
| 5,565,951 | * | 10/1996 | Tokui | 396/538 |
| 5,587,757 | * | 12/1996 | Seamans et al. | 396/536 |
| 5,592,253 | * | 1/1997 | Nishimura et al. | 396/538 |
| 5,715,495 | * | 2/1998 | Nishimura | 396/538 |
| 5,809,359 | * | 9/1998 | Taku | 396/513 |
| 5,870,644 | * | 2/1999 | Naka et al. | 396/512 |
| 5,873,008 | * | 2/1999 | Stichler | 396/538 |
| 5,933,672 | * | 8/1999 | Huang | 396/536 |
| 5,987,268 | * | 11/1999 | Takahashi et al. | 396/538 |

* cited by examiner

Primary Examiner—David M. Gray
(74) Attorney, Agent, or Firm—Robin, Blecker & Daley

(57) ABSTRACT

A camera includes a cartridge chamber, a cartridge chamber lid which opens and closes the cartridge chamber, a first engagement device for engaging the cartridge chamber lid in a closed state thereof, and a second engagement device for engaging the cartridge chamber lid in a closed state thereof at least when the first engagement device is not operating.

20 Claims, 38 Drawing Sheets

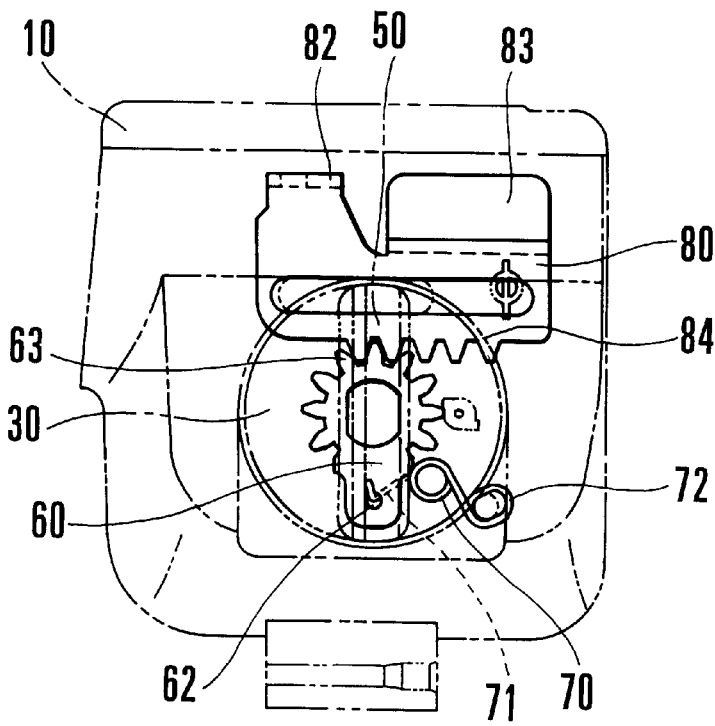
F I G. 7(a)
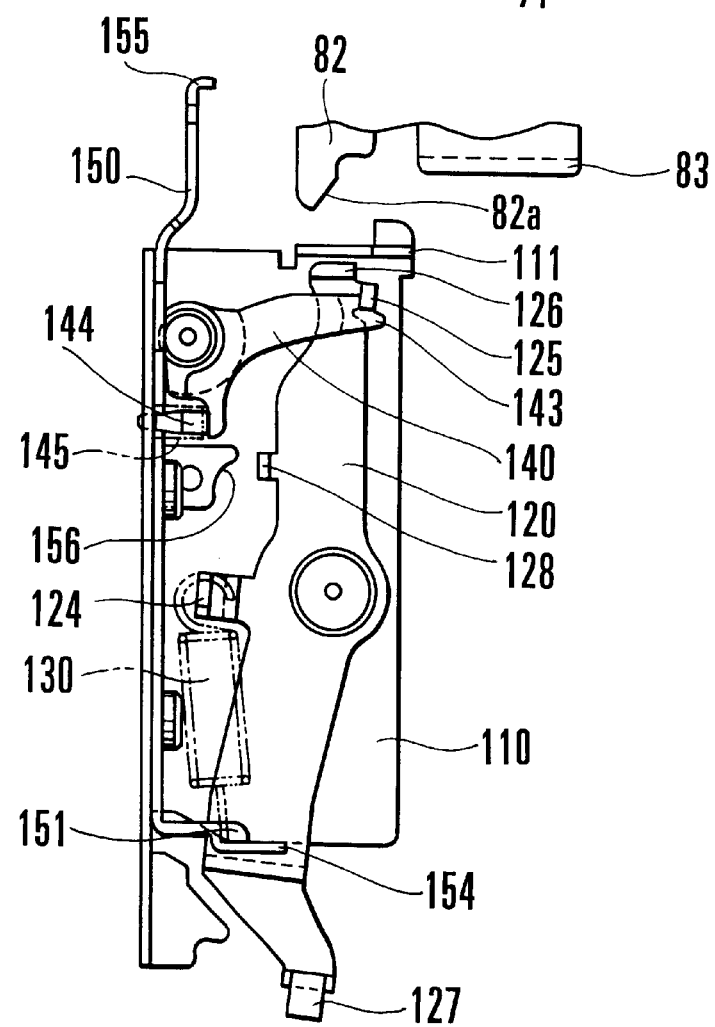
F I G. 7(b)

F I G. 10(a)
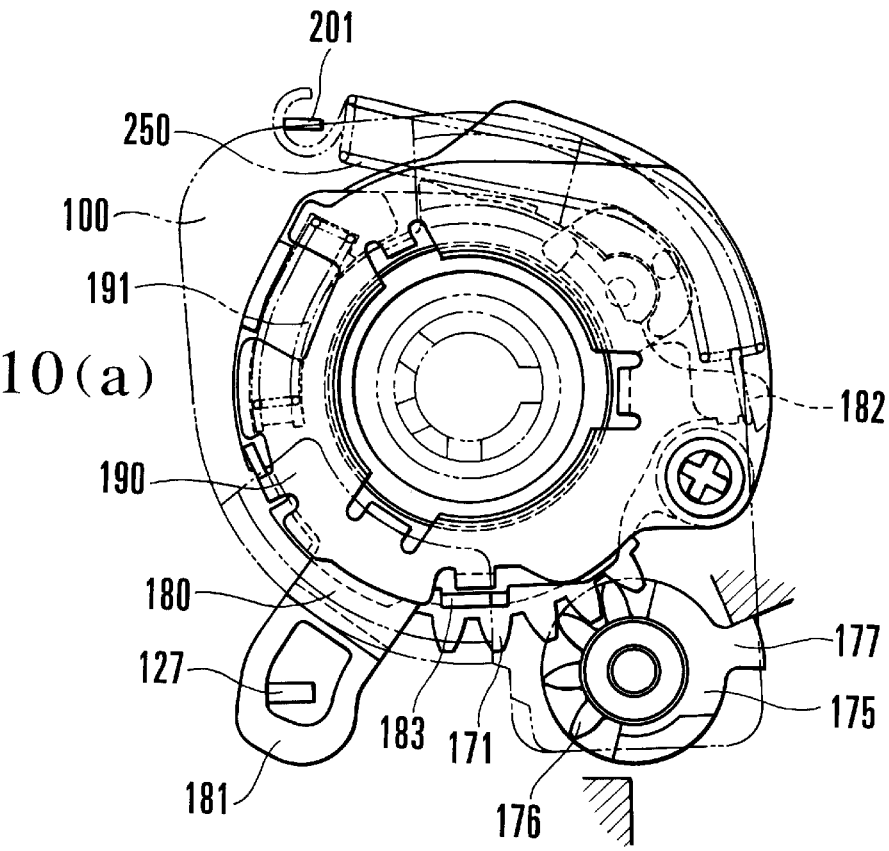
F I G. 10(b)
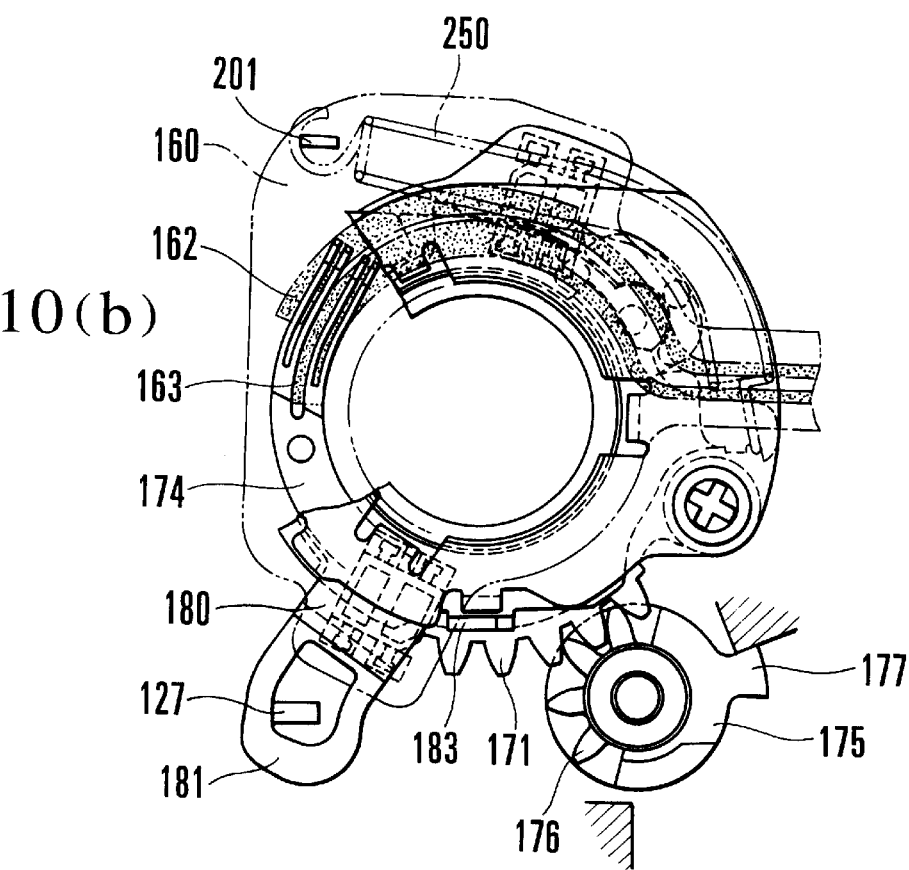

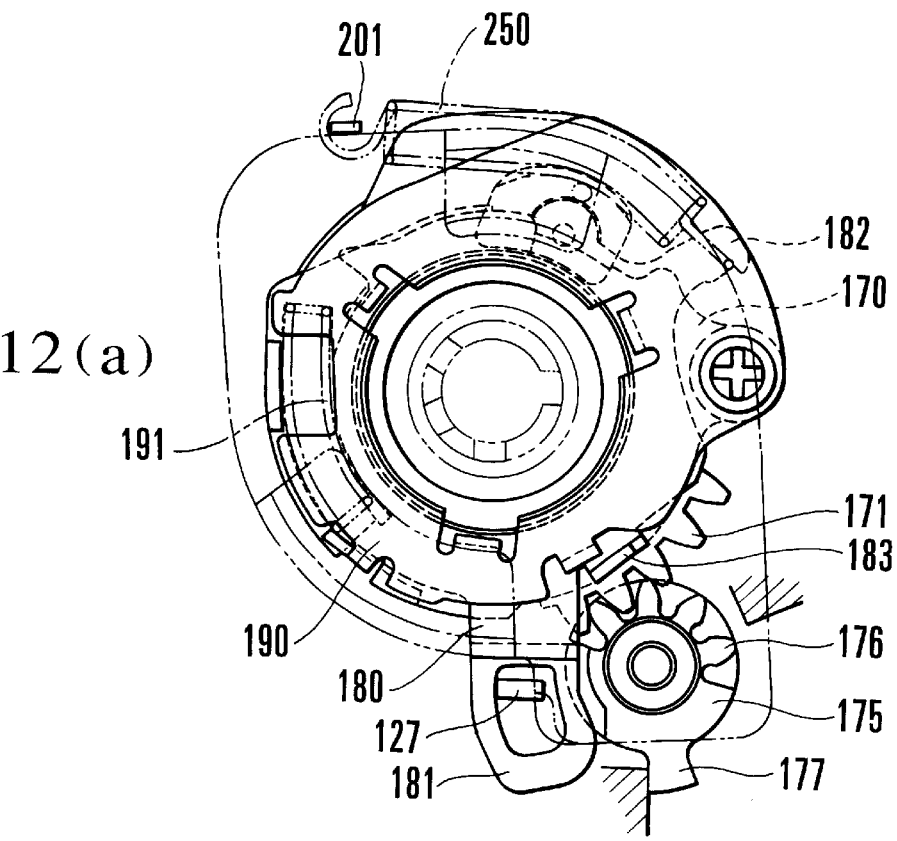
F I G. 12(a)
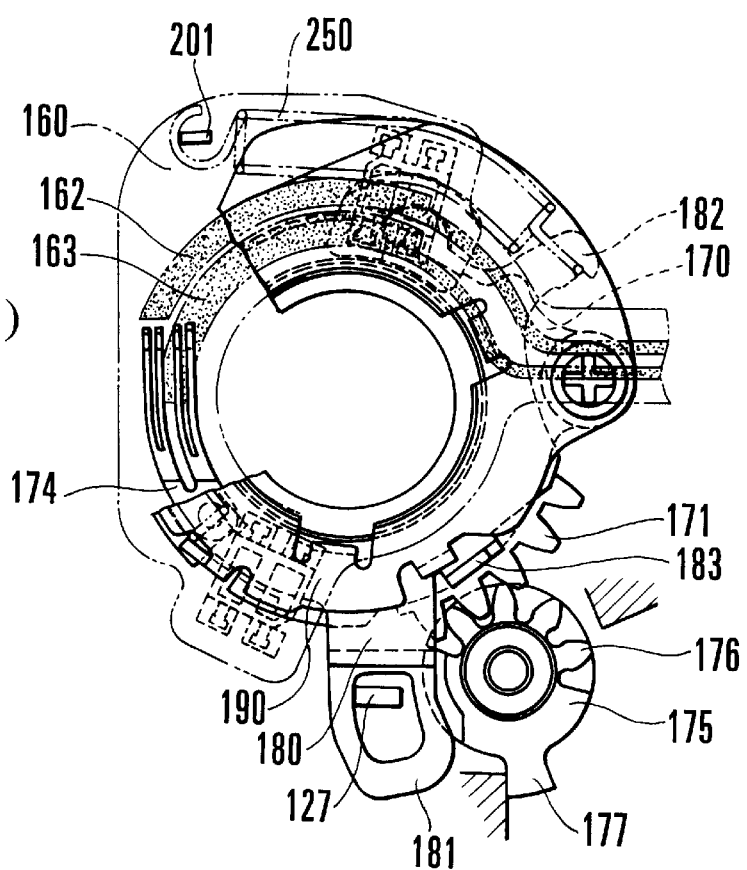
F I G. 12(b)

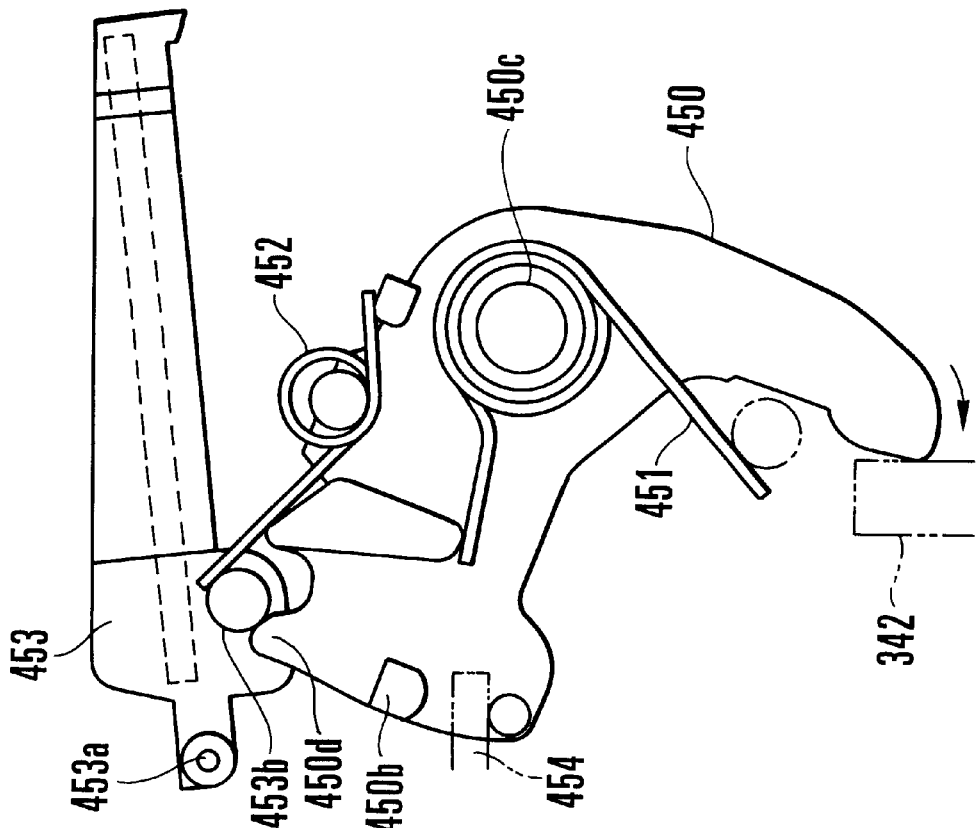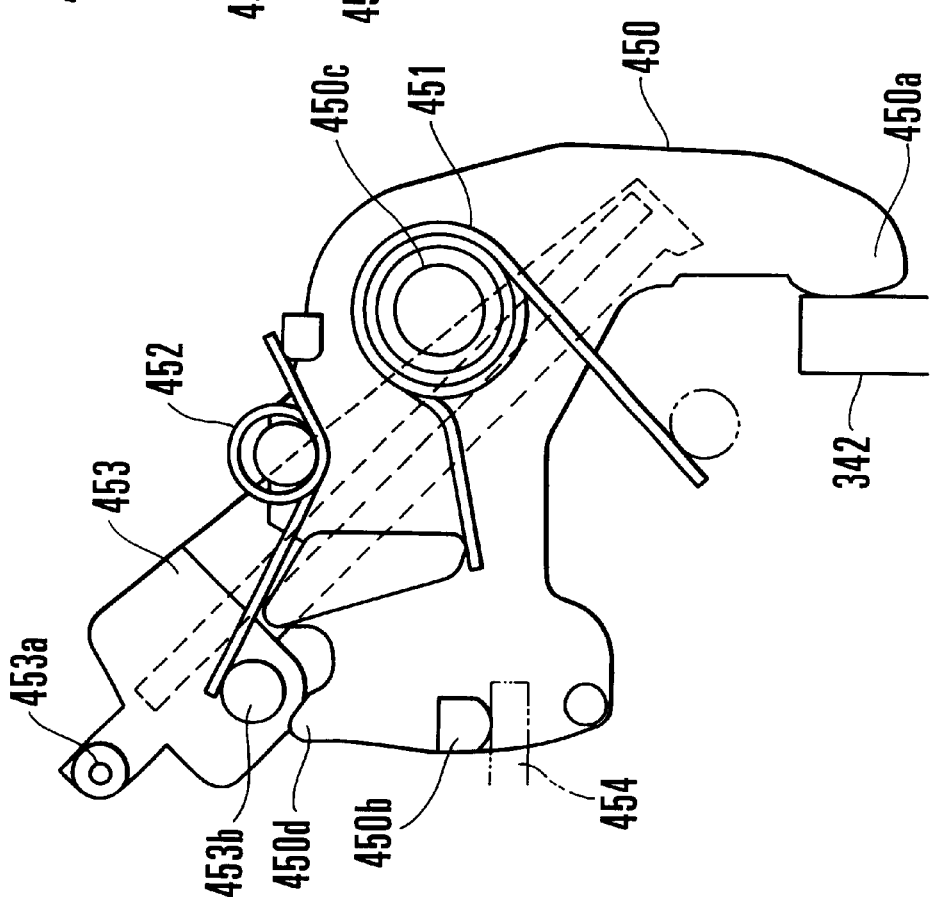

F I G. 19(a)
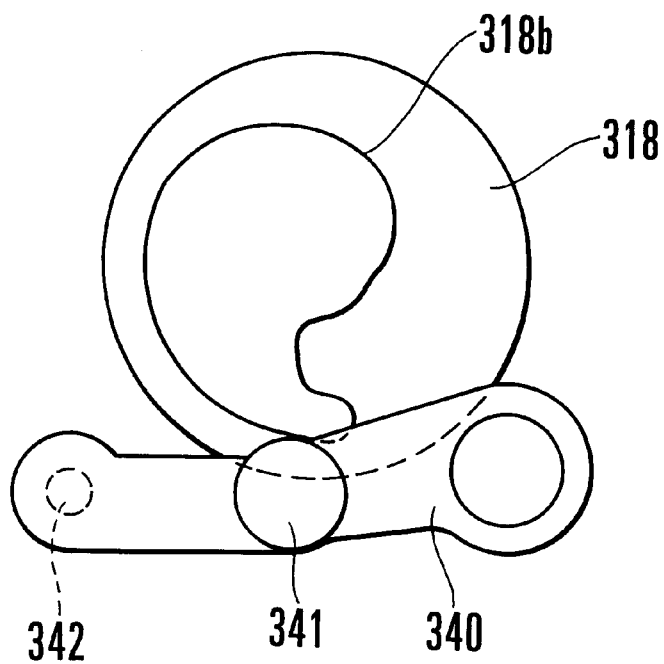
F I G. 19(b)
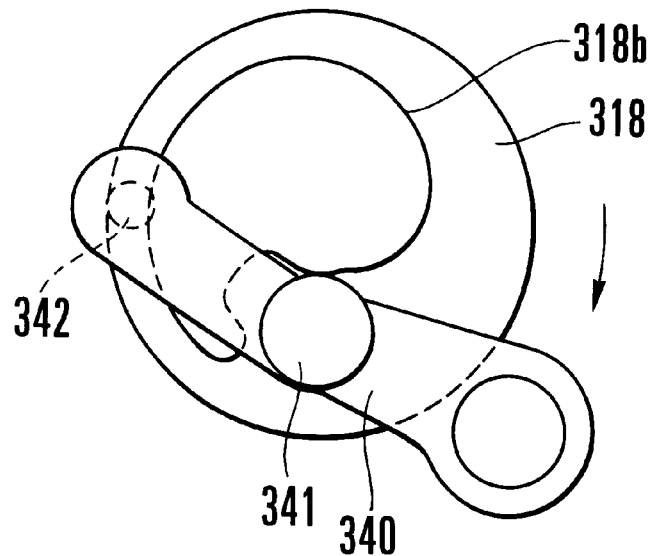

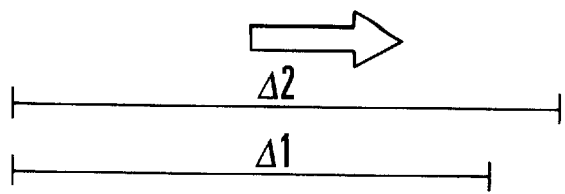

CAMERA

BACKGROUND OF THE INVENTION

1. Field of the Invention

The present invention relates to an improvement in a camera having a cartridge chamber lid for shielding a cartridge chamber from light.

2. Description of Related Art

In recent years, film cartridges of the types which are provided with light-lock doors (light-shielding doors) have been proposed. For example, the film cartridge disclosed in U.S. Pat. No. 5,347,334 belongs to these types. This kind of film cartridge is a so-called thrust type of film cartridge. If the film cartridge is not loaded in a camera, its film is wound in the film cartridge with its leader portion being accommodated therein, and if the film cartridge is loaded in the camera, the film is fed out of the film cartridge by a film transporting mechanism of the camera and is wound around a take-up spool of the camera.

In the camera which uses the thrust type of film cartridge, since the film cartridge can be loaded into or unloaded from the film cartridge in the axial direction of the take-up spool, the film cartridge can be made comparatively small and the cartridge chamber lid can be provided at the top or bottom of the body of the camera.

After the film cartridge is loaded into this type of camera, if the cartridge chamber lid accidentally opens while the film is being wound, a silver-halide film may be exposed. If a user attempts to open the cartridge chamber lid and forcedly take out the film cartridge with the film being pulled out of the film cartridge, not only will the film be exposed but also the film will be broken, and broken pieces of the film will be left in the camera. In this case, because of the smallness of the cartridge chamber lid, the user will find it difficult to remove the broken pieces, and the camera may need repair.

To prevent the occurrence of the above-described problems, it is preferable that the cartridge chamber lid be arranged not to open accidentally. Since the camera which uses the thrust type of film cartridge has the above-described problems, it is desired that the cartridge chamber lid be arranged not to open accidentally.

To this end, several methods have heretofore been proposed with respect to the camera using such a film cartridge, for the purpose of preventing the cartridge chamber lid from being erroneously opened when the film is pulled out.

For example, there is a method which, if a film may be exposed to light when a cartridge chamber lid is opened, prevents accidental opening of a cartridge chamber lid by engaging the cartridge chamber lid or an engagement member thereof with a lock member by using the movement of a magnetic actuator or that of a dedicated motor.

As another example, a method of disabling manipulation of a cartridge chamber lid opening/closing switch only when a film is wound up is disclosed in Japanese Laid-Open Patent Application No. Sho 63-25634. According to this method, a rewinding switch and the cartridge chamber lid opening/closing switch are provided in close proximity to each other on a camera body so that the cartridge chamber lid opening/closing switch is difficult to press, so long as the rewinding switch is not depressed.

However, in the above-described method of locking the cartridge chamber lid so that the cartridge chamber lid is not erroneously opened if the film loaded in the camera may be exposed to light when the cartridge chamber lid is opened, there is a need for an electrical or magnetic dedicated actuator for moving the lock member, thus resulting in the disadvantages that costs increase, that extra electrical energy is consumed to operate the actuator, and that a space into which to incorporate the actuator must be provided in the camera.

In the method for the camera proposed in Japanese Laid-Open Patent Application No. Sho 63-25634, which method, so long as the rewinding switch is not depressed, does not allow the cartridge chamber lid opening/closing switch to be easily pressed, the rewinding switch must be provided in close proximity to the cartridge chamber lid opening/closing switch, so that the design of the exterior appearance of the camera is restricted. Otherwise, because of a structure which merely does not allow the cartridge chamber lid opening/closing switch to be easily pressed, the cartridge chamber lid may be opened by the friction between a finger tip and the surface of the cartridge chamber lid opening/closing switch, or reliability similar to the reliability of a conventional camera of the type in which a rewinding switch is not provided in proximity to a cartridge chamber lid can only be obtained at the time of a vibration, falling or the like of the camera. Furthermore, the construction in which the cartridge chamber lid opening/closing switch and the rewinding switch must be provided near to each other may allow the user of the camera to unconsciously manipulate the rewind switch, and may also make it difficult for the user to perform the manipulation of opening or closing the cartridge chamber lid.

In the camera proposed in Japanese Laid-Open Patent Application No. Hei 7-319057, if a lock member which is elastically urged in frictional contact with a transmission gear of a film winding gear train is rotated in the film winding direction, the lock member can be turned to engage a manipulating member for opening or closing a cartridge chamber. However, if the transmission gear rotates in the opposite direction during film rewinding, the lock member turns to release the engagement of the manipulating member, and becomes unable to prevent accidental opening or closing of the cartridge chamber lid in the course of film rewinding.

BRIEF SUMMARY OF THE INVENTION

In accordance with one aspect of the present invention, there is provided a camera which includes a cartridge chamber, a cartridge chamber lid which opens and closes the cartridge chamber, a first engagement device for engaging the cartridge chamber lid in a closed state thereof, and a second engagement device for engaging the cartridge chamber lid in a closed state thereof at least when the first engagement device is not operating.

The above and other aspects of the present invention will become apparent from the following detailed description of a preferred embodiment of the present invention, taken in conjunction with the accompanying drawings.

BRIEF DESCRIPTION OF THE SEVERAL VIEWS OF THE DRAWING

FIGS. 7(a) and 7(b) are views showing the state of operation of an essential portion with the cartridge chamber lid being opened before the film cartridge is loaded into the camera according to the embodiment of the present invention;

FIGS. 10(a) and 10(b) are views showing the state of operation of the essential portion immediately after the cartridge chamber lid is closed with the film cartridge being loaded in the camera according to the embodiment of the present invention;

FIGS. 12(a) and 12(b) are views showing the state of operation of the essential portion in which the cartridge chamber lid is closed in the engaged stage after the film cartridge is loaded into the camera body;

FIGS. 18(a) and 18(b) are views showing a mirror-down state and a mirror-up state in the camera according to the embodiment of the present invention;

FIGS. 19(a) and 19(b) are plan views showing the relation between the cam gear and the charging lever shown in FIG. 14;

DETAILED DESCRIPTION OF THE INVENTION

An embodiment of the present invention will be described below in detail with reference to the accompanying drawings.

Figure 13A:
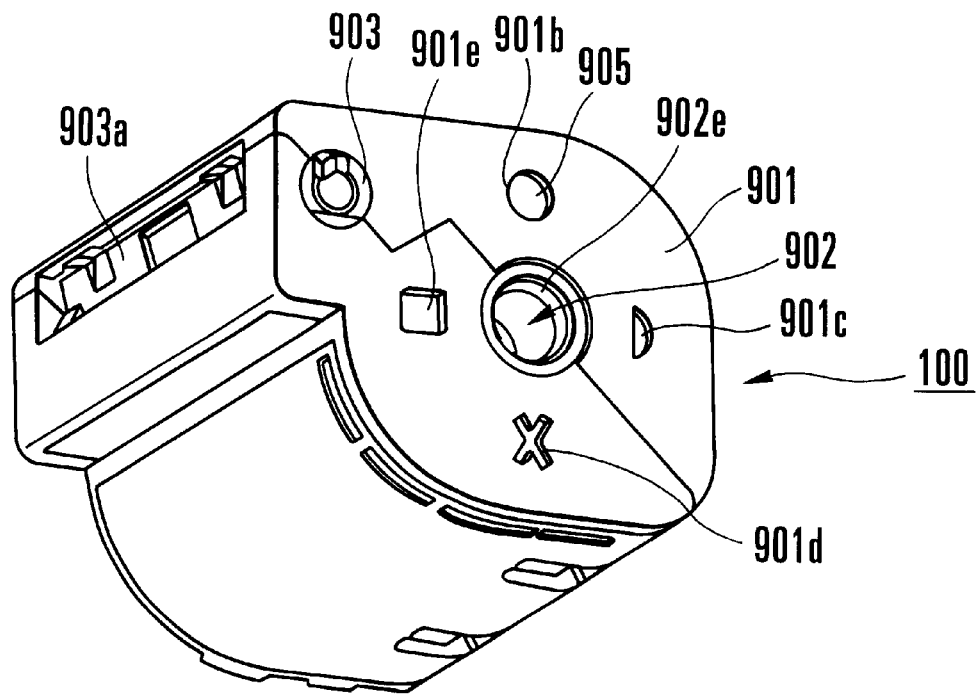
FIGS. 13(a) and 13(b) are perspective views of the film cartridge to be used in the camera according to the embodiment of the present invention.
Figure 13B:
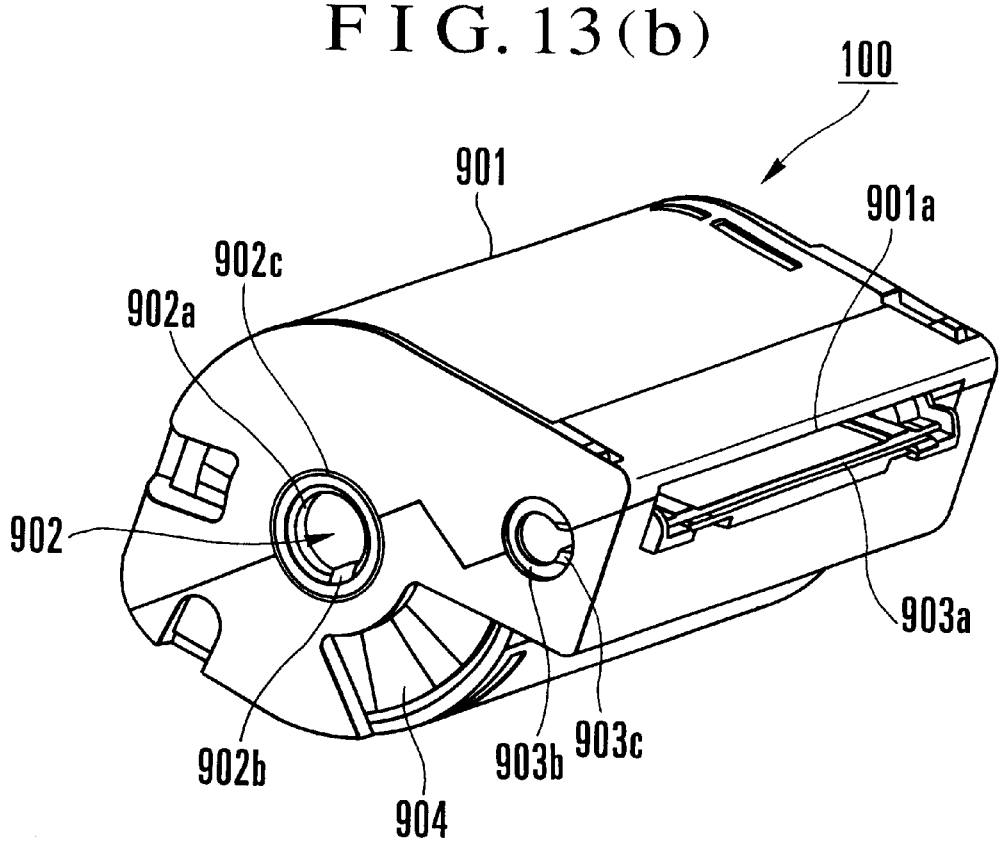

FIGS. 1 to 12(a) and 12(b) are views showing the mechanisms of a camera and a cartridge chamber according to one embodiment of the present invention. FIGS. 13(a) and 13(b) are perspective views respectively showing the top and bottom sides of a film cartridge to be used in the camera according to the embodiment of the present invention.

First, the film cartridge to be used in the camera according to the embodiment of the present invention will be described below with reference to FIGS. 13(a) and 13(b).

As shown in FIGS. 13(a) and 13(b), a film cartridge 100 includes a film cartridge shell 901, a supply spool 902 and a light-lock door 903.

The light-lock door 903 has a door portion 903a which opens or closes the film egress/ingress slot of the film cartridge shell 901, and is pivotally supported by the film cartridge shell 901. The light-lock door 903 has a shaft portion 903b which is disposed coaxially with a pivot shaft (not shown), and the shaft portion 903b has an engagement portion 903c for transmission of rotation.

If the light-lock door 903 is rotated counterclockwise as viewed in FIG. 13(a) by using the shaft portion 903b and the engagement portion 903c, the film cartridge 100 is brought into the state shown in FIG. 13(b) and the door portion 903a opens so that a film (not shown) can be fed out. On the other hand, if the light-lock door 903 is rotated counterclockwise as viewed in FIG. 13(b), the film cartridge 100 is brought into the state shown in FIG. 13(a) and the door portion 903a closes so that the film egress/ingress slot is placed into a light-shielding state.

The supply spool 902 has a shaft portion 902a, a key groove 902b and an abutment portion 902c at one end, and a shaft portion 902e at the other end. If the supply spool 902 is rotated counterclockwise as viewed in FIG. 13(b), the film (not shown) is rewound, whereas if the supply spool 902 is rotated clockwise as viewed in FIG. 13(b), the film (not shown) is forced out through an slot 901a with the door portion 903a of the light-lock door 903 being opened. The supply spool 902 is integrally provided with a data disk 904 and an indicator 905 so that various kinds of state displays which will be described below can be provided by controlling the stop phase of the supply spool 902.

The data disk 904 provides display of the ISO sensitivity of the film, the number of exposable frames and the like by means of a bar code. The indicator 905 is set so that the camera can read information corresponding to the state display provided by the indicator 905 according to the stop phase of the supply spool 902. Referring to the state display provided by the indicator 905, a display window 901b indicates unexposed film, a display window 901c indicates film which is exposed up to an intermediate frame, a display window 901d indicates film all frames of which are exposed, and a display window 901e indicates developed film. The indicator 905 can display the state of use of the film by means of the display windows 901b to 901e according to the stop phase of the indicator 905.

The supply spool 902 can be rotated only when the light-lock door 903 is opened as shown in FIG. 13(b), and when the light-lock door 903 is closed as shown in FIG. 13(a), a lock mechanism (not shown) functions to disable the supply spool 902 from being rotated.

Figure 1:
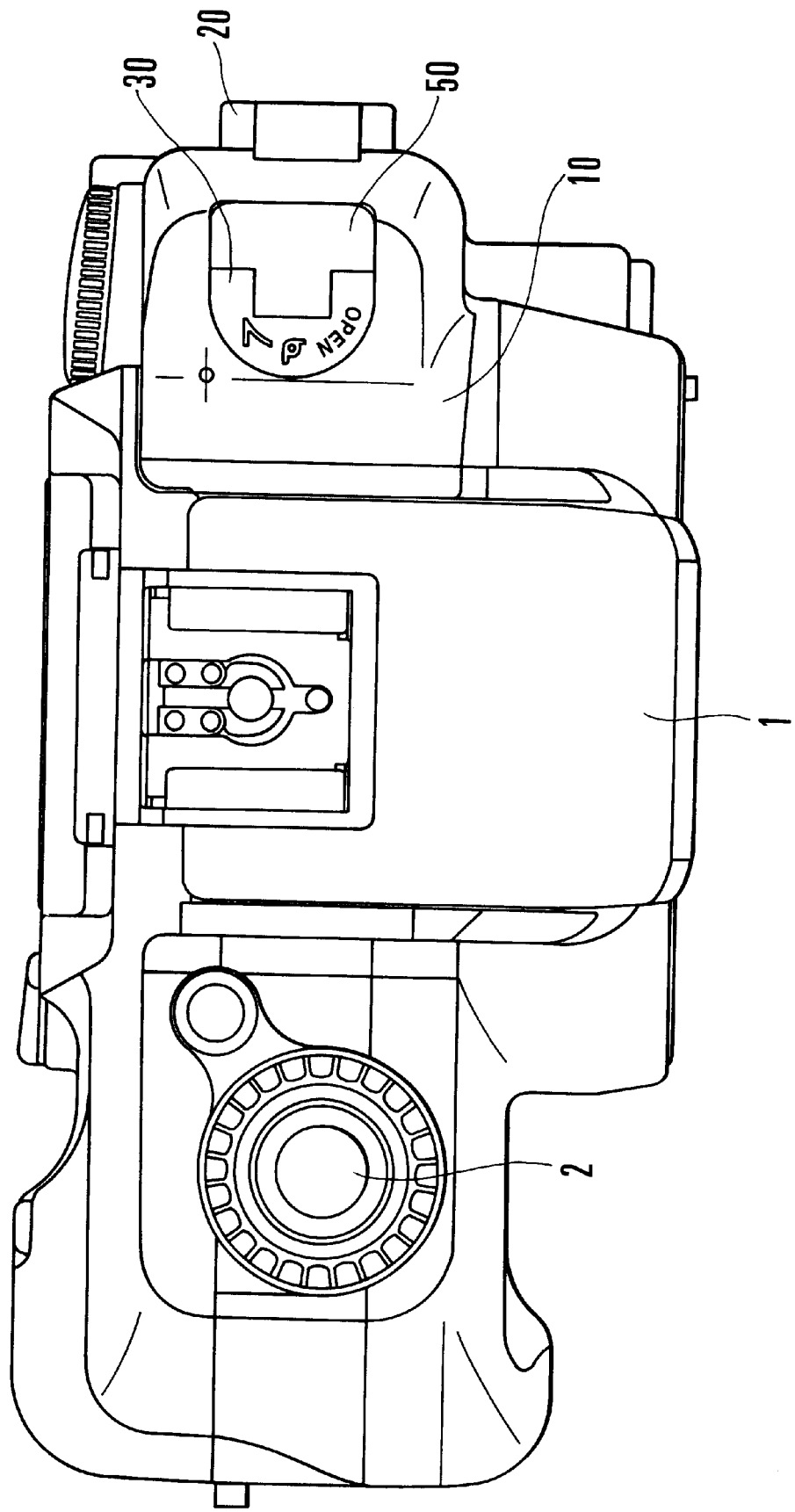
FIG. 1 is a view showing the top side of a camera according to an embodiment of the present invention.
Figure 2:
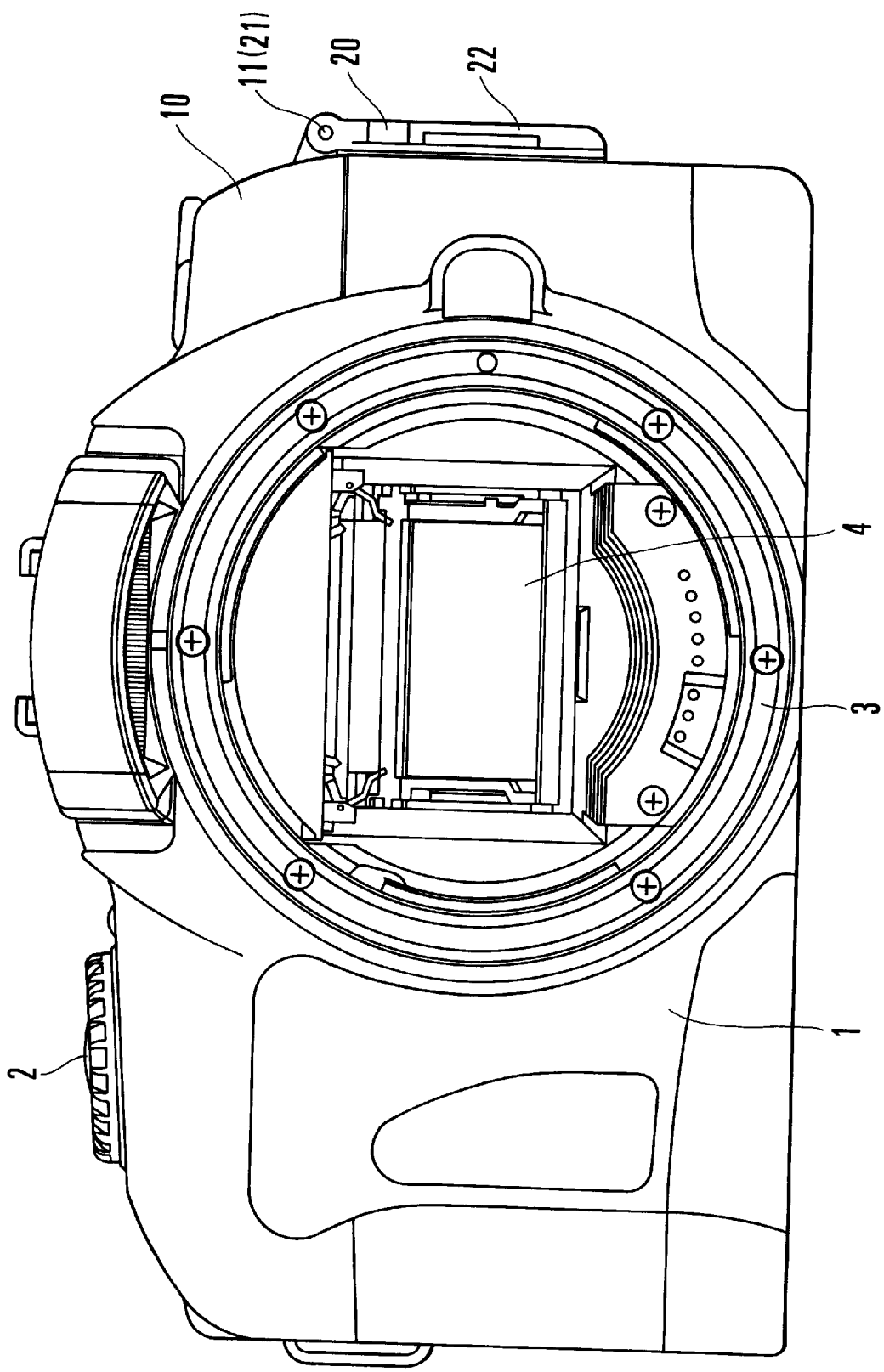
FIG. 2 is a view showing the front side of the camera according to the embodiment of the present invention.

FIGS. 1 and 2 are views respectively showing the top side and the front side of the camera according to the embodiment of the present invention.

Referring to FIGS. 1 and 2, a camera body 1 has a release button 2 composed of a two-stroke switch. If the release button 2 is depressed to the first stroke position and a switch SW1 is turned on, the camera starts light measurement in preparation for photography, and if the camera has an automatic focus detecting device, the camera performs a focus detecting operation followed by a lens driving (focus adjusting) operation. If the release button 2 is depressed to the second stroke position and a switch SW2 is turned on, the camera starts a photographing (shutter release) operation. The camera body 1 also includes a mount 3 on which to mount a photographing lens (not shown), a movable mirror 4 which serves to guide a photographing light beam which passes through the photographing lens (not shown), toward a viewfinder optical system (not shown) and which can be retracted from the photographing light beam during exposure, a cartridge chamber lid 10 which is turnable about a hinge portion 11 in the clockwise direction as viewed in FIG. 2, a strap holder 20 which is secured to the camera body 1 and has a hinge portion 21 coaxial with the hinge portion 11 of the cartridge chamber lid 10, a cartridge chamber lid opening/closing shaft 30, and an opening/closing knob 50. The cartridge chamber lid opening/closing shaft 30 and the opening/closing knob 50 will be described below in detail with reference to FIGS. 3 and so on.

FIGS. 3 to 6 are views showing mechanisms associated with the cartridge chamber lid provided in the camera according to the embodiment of the present invention.

Figure 3:
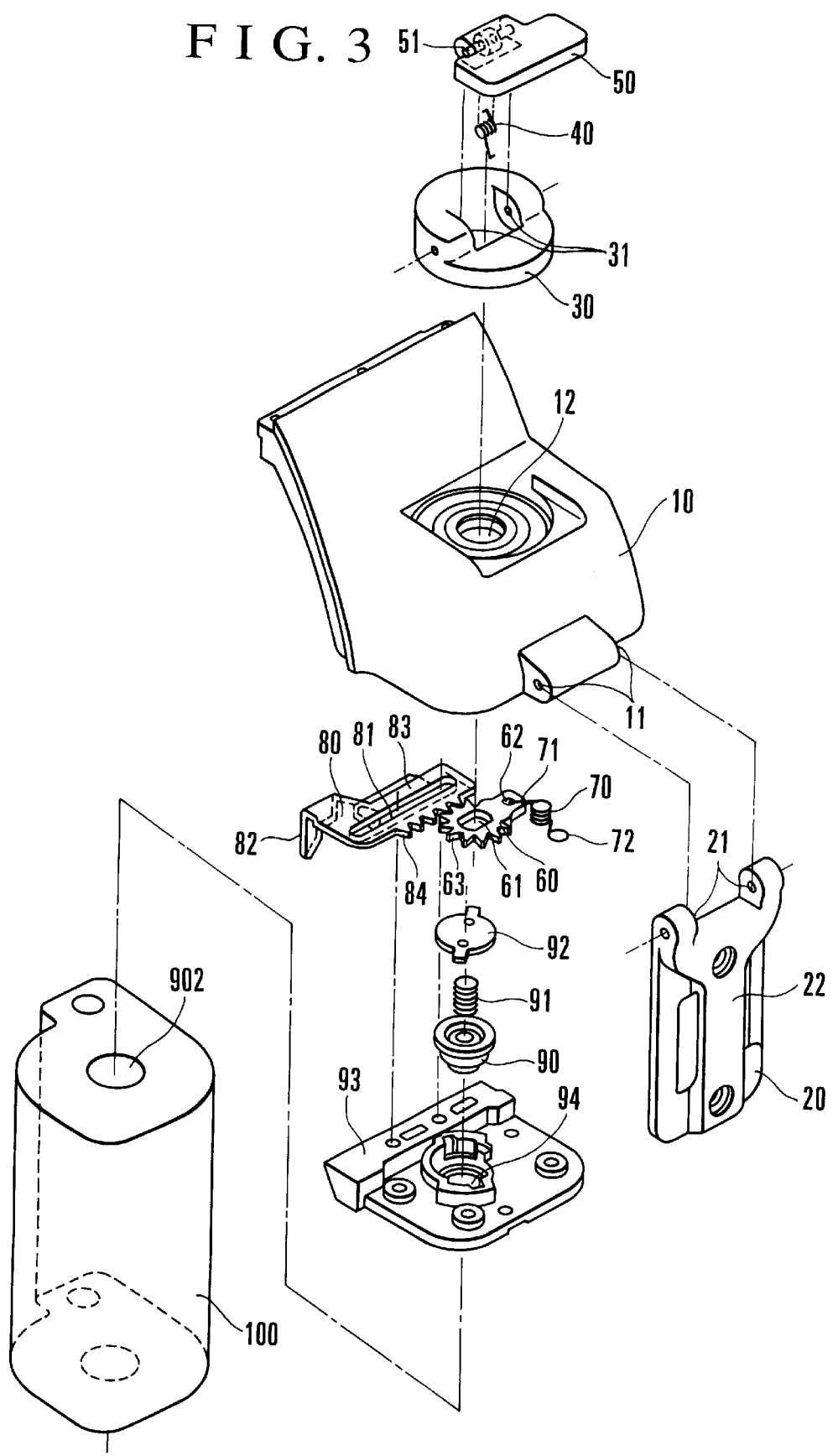
FIG. 3 is an exploded perspective view showing the construction of a cartridge chamber lid as viewed from above the front side of the top right portion of the camera body of the camera shown in FIG. 2.
Figure 4:
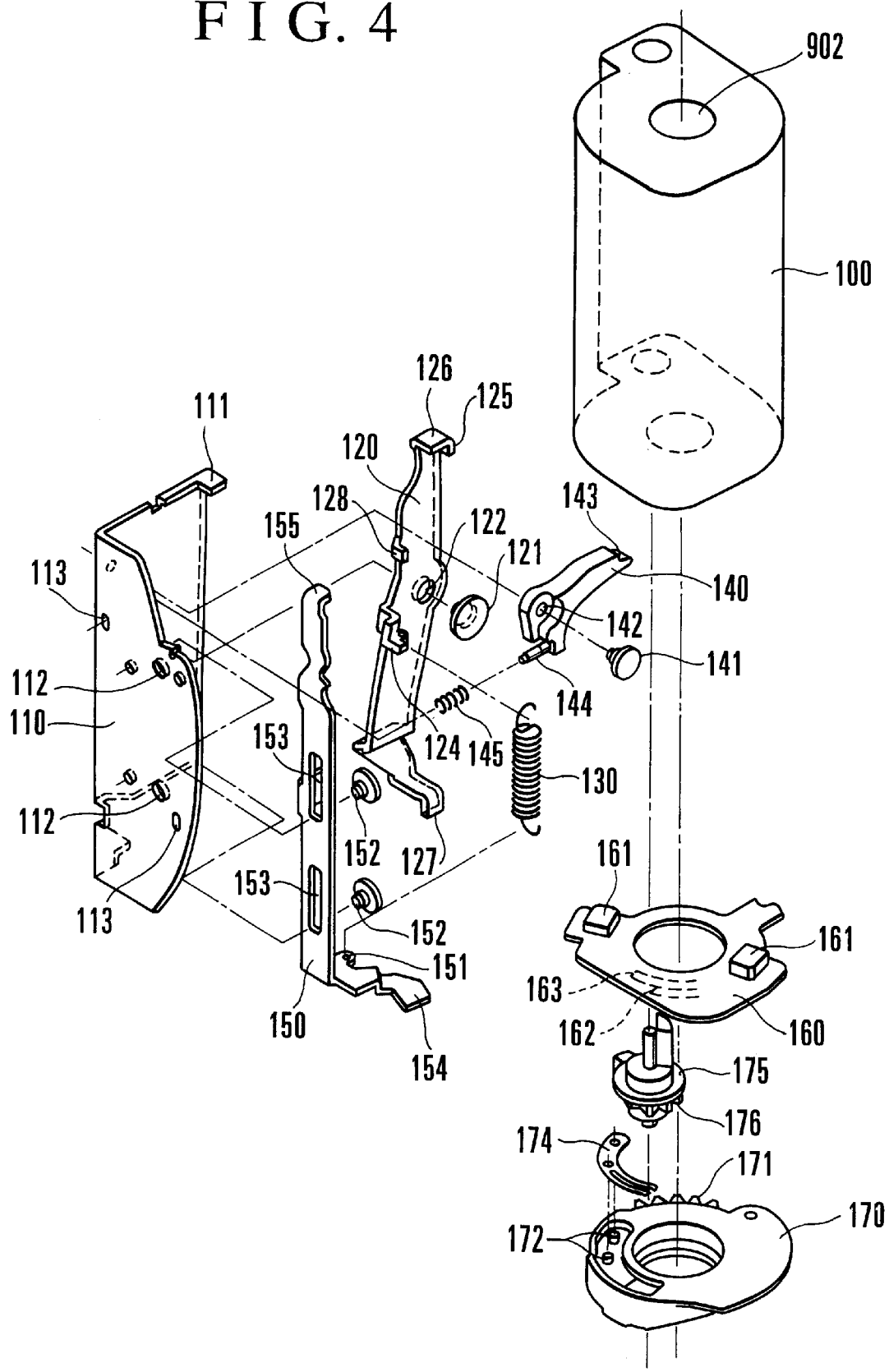
FIG. 4 is an exploded perspective view showing a portion of a cartridge loading mechanism incorporated in the camera of FIG. 2 as viewed from the front side of the top right portion of the camera body.
Figure 5:
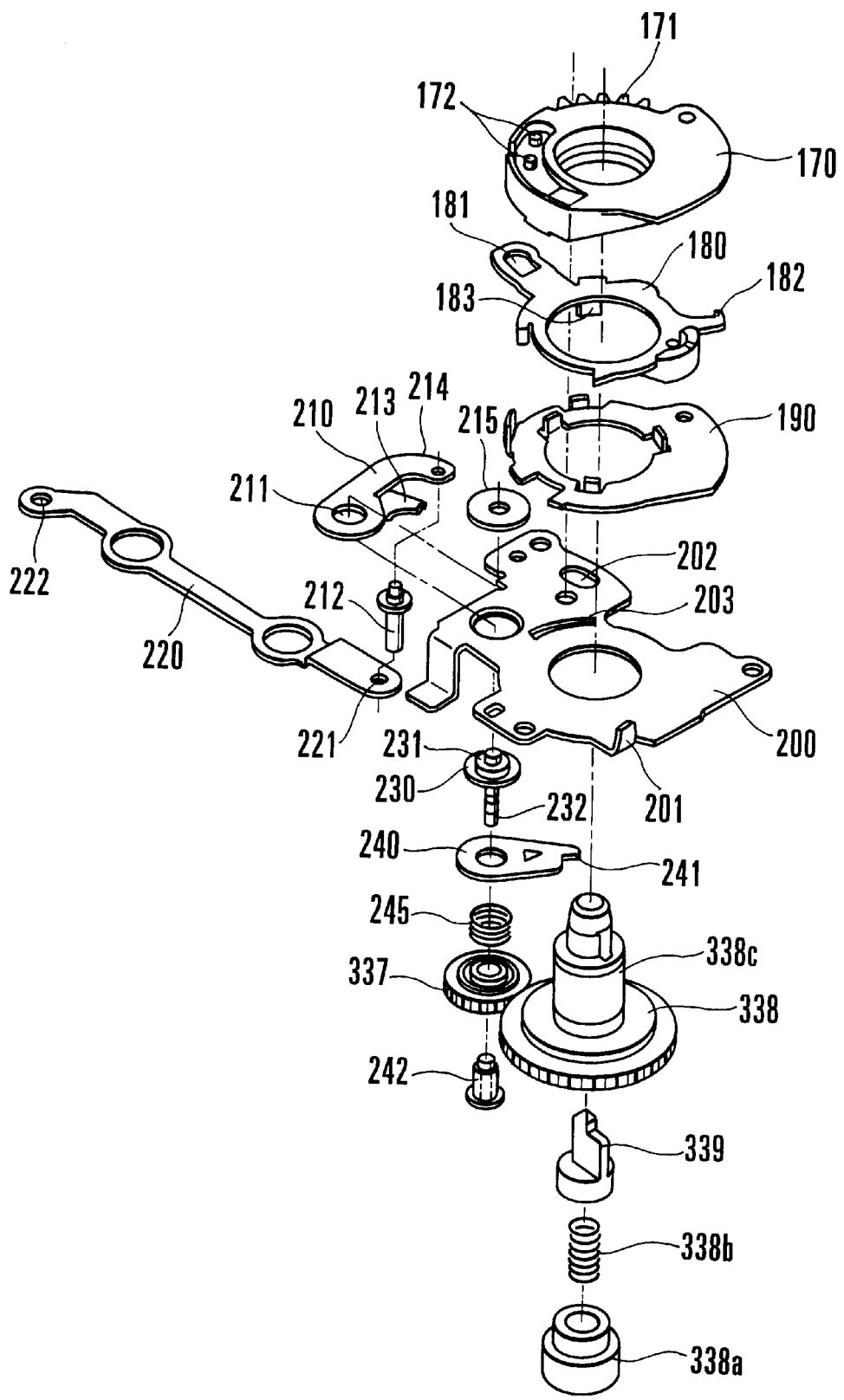
FIG. 5 is an exploded perspective view showing another portion of the cartridge loading mechanism incorporated in the camera according of FIG. 2 as viewed from the front side of the top right portion of the camera body.
Figure 6:
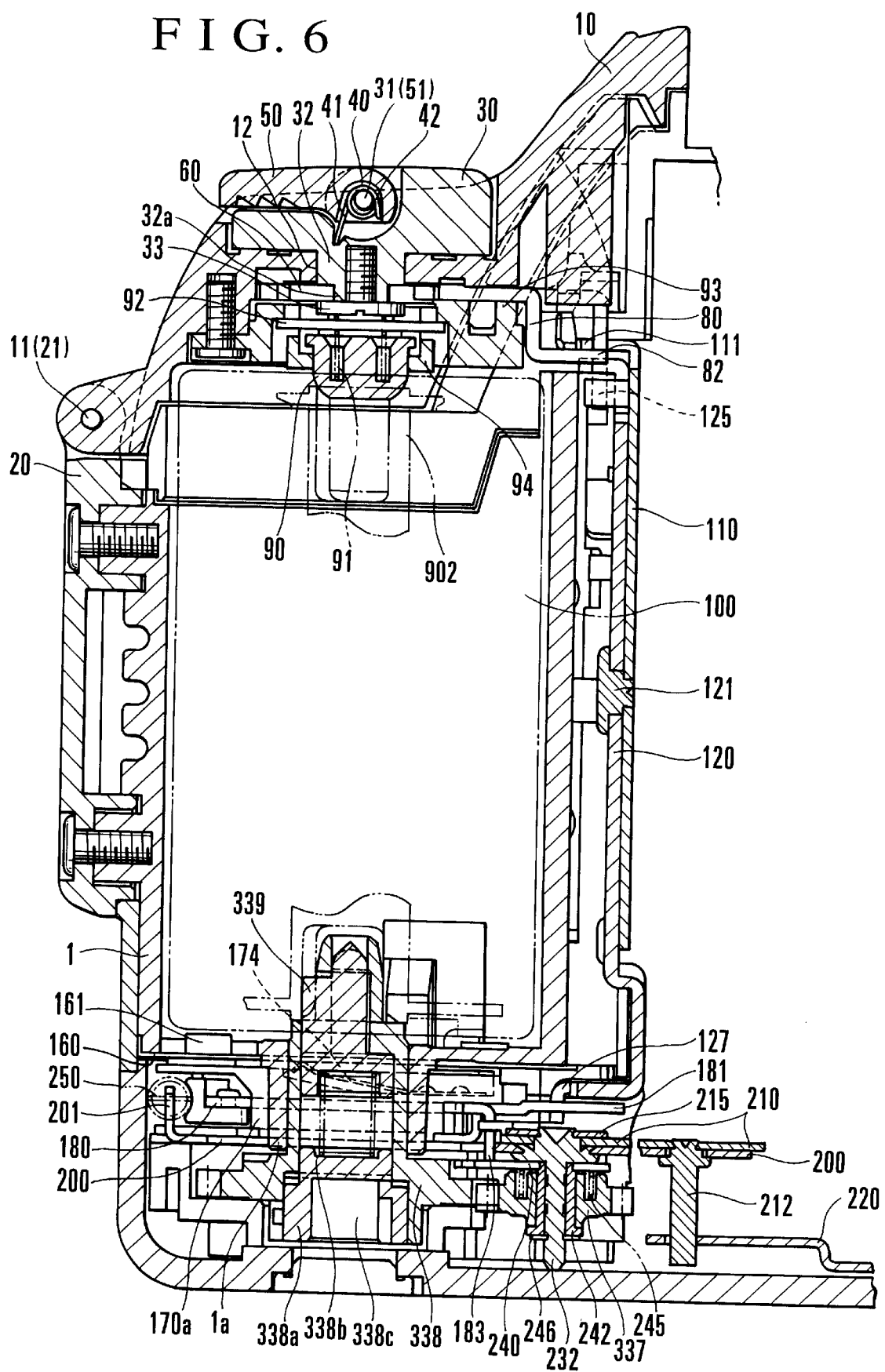
FIG. 6 is a vertical sectional view showing a cartridge chamber as viewed from the back of the camera body with a film cartridge being loaded in the camera according to the embodiment of the present invention.
Figure 8A:
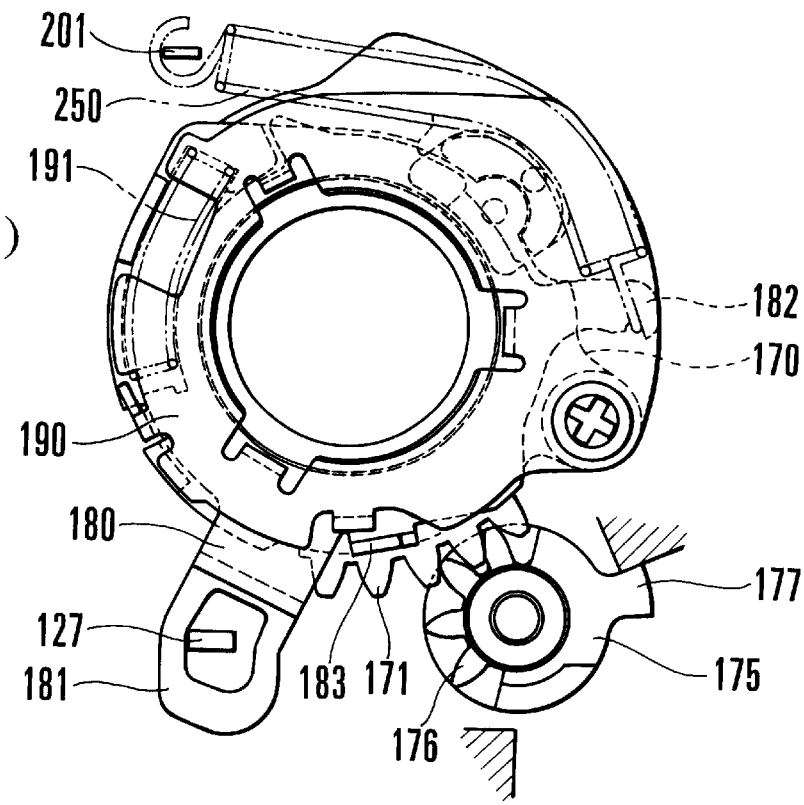
FIGS. 8(a) and 8(b) are views showing the state of operation of the essential portion with the cartridge chamber lid being opened before the film cartridge is loaded into the camera according to the embodiment of the present invention.
Figure 8B:
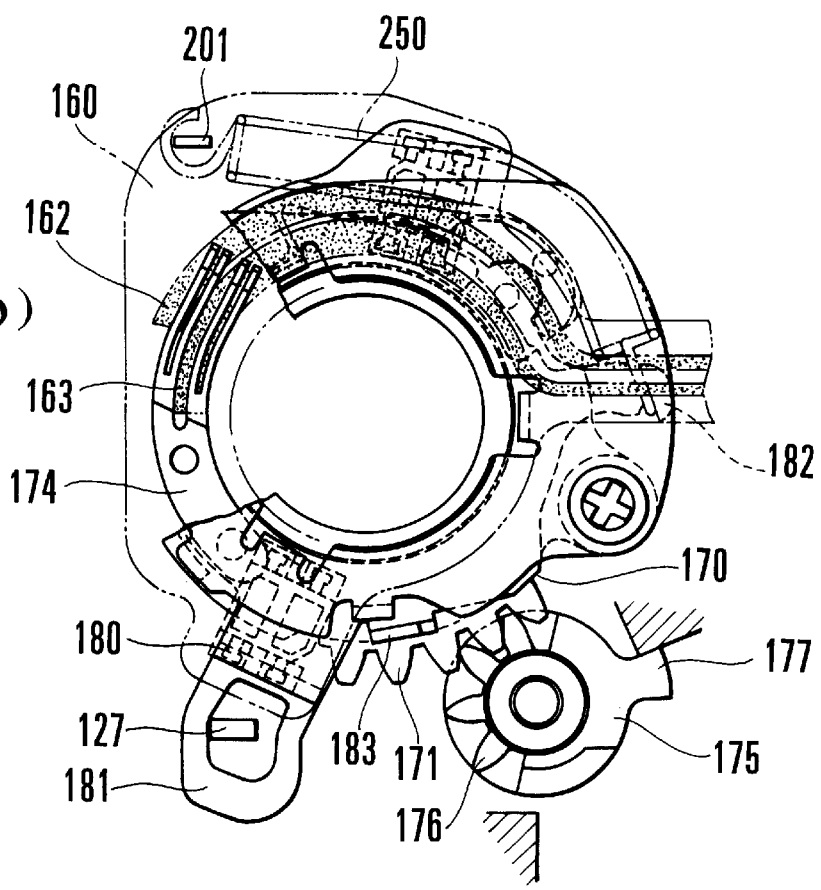
Figure 9A:
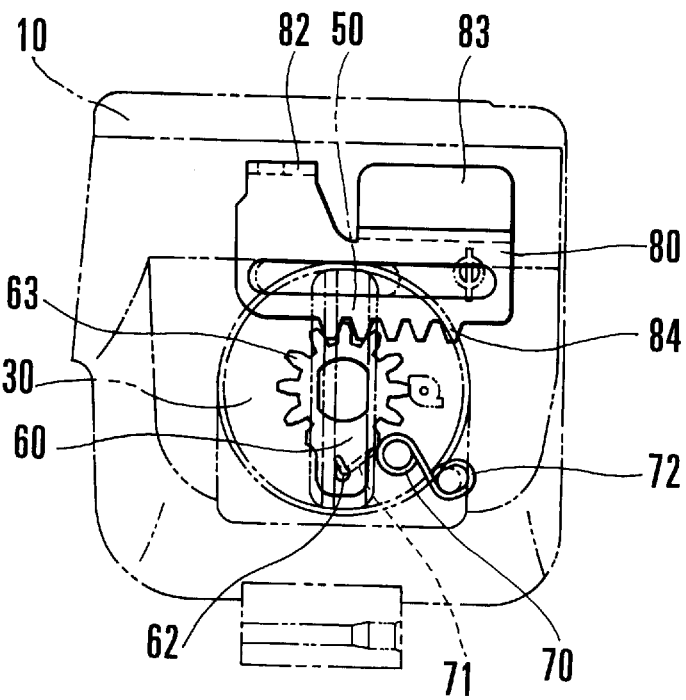
FIGS. 9(a) and 9(b) are views showing the state of operation of the essential portion immediately after the cartridge chamber lid is closed with the film cartridge being loaded in the camera according to the embodiment of the present invention.
Figure 9B:
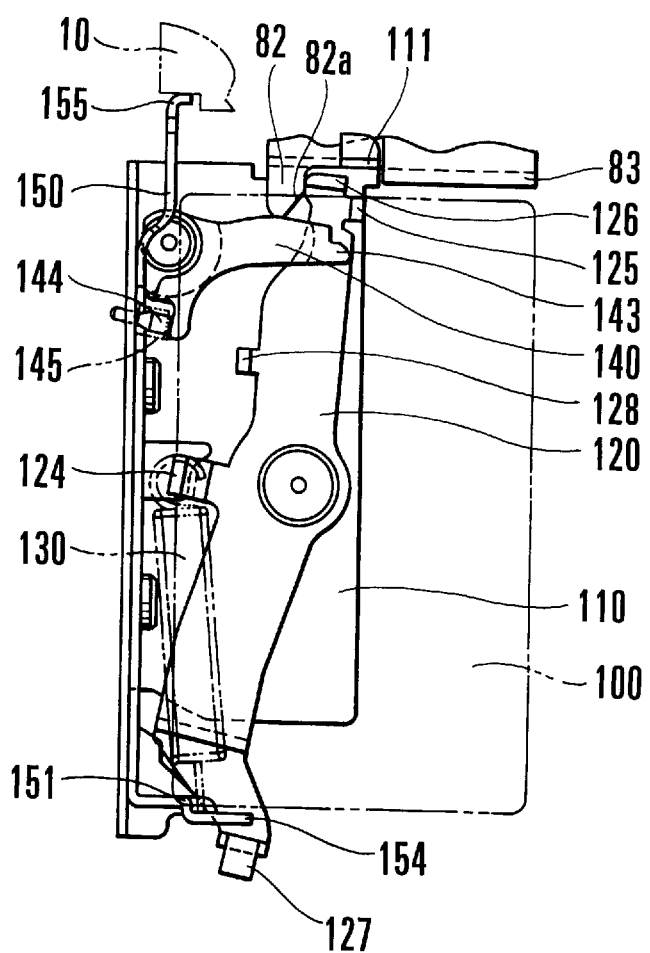

FIG. 3 is an exploded perspective view showing the construction of the cartridge chamber lid 10 and constituent elements associated therewith as viewed from above the front side of the top right portion of the camera body 1 in FIG. 2. FIGS. 4 and 5 are exploded perspective views showing a cartridge loading mechanism incorporated in the camera according to the embodiment of the present invention as viewed from the front side of the top right portion of the camera body 1 in FIG. 2. FIG. 6 is a vertical sectional view showing the cartridge chamber and the vicinity thereof as viewed from the back of the camera body 1 in which the film cartridge 100 is loaded. In FIG. 6, only particular portions are hatched for the sake of simplicity in illustration.

Referring to FIGS. 3 and 6, the strap holder 20 has a mounting portion 22 to which to secure a strap to be used in carrying the camera body 1. The opening/closing knob 50 is turnably supported on the cartridge chamber lid opening/closing shaft 30 by means of a hinge portion 31 and a hinge portion 51. An opening/closing spring 40 which is a torsion coil spring is supported on the opening/closing knob 50 with its coil axis being coaxial with the hinge portions 31 and 51, and one end 41 of the opening/closing spring 40 is hooked on the cartridge chamber lid opening/closing shaft 30, while another end 42 is hooked on the opening/closing knob 50. The opening/closing knob 50 is springily urged by the opening/closing spring 40 in the closing direction (in the counterclockwise direction about the hinge portion 31 (51) as viewed in FIG. 6).

The cartridge chamber lid opening/closing shaft 30 has a shaft portion 32 which extends through a rotating hole portion 12 of the cartridge chamber lid 10, and a rectangular shaft portion 32a formed at the tip portion of the shaft portion 32 and a rectangular hole portion 61 of a pinion plate 60 are brought into engagement with each other, thereby inhibiting the rotation of the pinion plate 60 and thereby securing the pinion plate 60 to the cartridge chamber lid opening/closing shaft 30 in a clamped state for turning movement with respect to the cartridge chamber lid 10 by means of a machine screw 33. The pinion plate 60 has a spring hooking portion 62 on which one end 71 of an opening/closing shaft urging spring 70 which is a torsion coil spring is hooked. Another end 72 of the opening/closing shaft urging spring 70 is turnably hooked on a spring shaft (not shown) which is disposed on the reverse side of the cartridge chamber lid 10.

The pinion plate 60 is provided with a pinion gear portion 63 which converts the rotating force of the cartridge chamber lid opening/closing shaft 30 into the sliding movement of a cartridge chamber lid engagement lever 80 which will be described later. The cartridge chamber lid engagement lever 80 serves to unopenably engage the cartridge chamber lid 10 with the camera body 1 and is fitted on a slide guide member (not shown) which is disposed on the reverse side of the cartridge chamber lid 10. The cartridge chamber lid engagement lever 80 includes a slide hole 81 which allows the cartridge chamber lid engagement lever 80 to slide, an engagement releasing portion 82 which releases the engagement of a connecting lever 120 (which will be described later) by a retention lever 140 when the cartridge chamber lid 10 is closed, an engagement claw 83 for unopenably engaging the cartridge chamber lid 10 with the camera body 1, and a rack gear portion 84 which meshes with the pinion gear portion 63 of the pinion plate 60.

A spool pressure member 90 serves to press and hold the supply spool 902 from above the film cartridge 100. The spool pressure member 90 is turnably held in a hole portion 94 of a lid cover plate 93 which will be described later, and is normally springily urged downward by a compression coil spring 91 which is disposed between the spool pressure member 90 and a spring pressure plate 92 which is secured to the lid cover plate 93. The lid cover plate 93 serves to cover the reverse side of the cartridge chamber lid 10, and integrally holds the spool pressure member 90, the compression coil spring 91 and the spring pressure plate 92 and is secured to the cartridge chamber lid 10 to hold the cartridge chamber lid engagement lever 80 on the cartridge chamber lid 10 for sliding movement with respect to the cartridge chamber lid 10.

FIGS. 4 and 5 are exploded perspective views showing the side and bottom mechanisms of the cartridge loading mechanism incorporated in the camera as viewed from above the front side of the top right portion of the camera body 1 in FIG. 2.

Referring to FIGS. 4, 5 and 6, a lever holding plate 110 is formed in an L-like shape for holding a mechanism disposed along the front and one side of the cartridge chamber provided in the camera body 1 and securing the mechanism to the camera body 1 in a positioned state by means of screw holes 112 and positioning holes 113. An engagement arm 111 is arranged to engage with the engagement claw 83 of the cartridge chamber lid engagement lever 80 when the cartridge chamber lid 10 is closed. The connecting lever 120 connects the cartridge chamber lid engagement lever 80 of the cartridge chamber lid 10 and a controller 180 which is disposed at the bottom of the cartridge chamber, and is turnably held on the lever holding plate 110 by a securing shaft 121 which is slidably fitted in a rotating slide hole 122. The connecting lever 120 also has a spring hooking portion 124 on which an ejecting spring 130 is hooked, and an engagement portion 125 to be engaged by the retention lever 140 for the purpose of holding the connecting lever 120 in an open position when the cartridge chamber lid 10 is opened.

A sliding portion 126 causes the connecting lever 120 to turn toward the open position in accordance with the sliding movement of the cartridge chamber lid engagement lever 80 while the cartridge chamber lid 10 is being opened. A driving arm 127 causes the controller 180 to turn in accordance with the operation of causing the connecting lever 120 to turn toward the open position in accordance with the sliding movement of the cartridge chamber lid engagement lever 80 while the cartridge chamber lid 10 is being opened. The driving arm 127 is slidably engaged with an engagement hole 181 of the controller 180 to rotationally drive the controller 180 counterclockwise and clockwise in accordance with the clockwise and counterclockwise rotations of the connecting lever 120.

The ejecting spring 130 is composed of a tension coil spring, and one end of the connecting lever 120 is hooked on the spring hooking portion 124 of the connecting lever 120, while the other end of the connecting lever 120 is hooked on a spring hooking portion 151 of an ejecting lever 150. The connecting lever 120 and the ejecting lever 150 are springily urged to pull each other, by the ejecting spring 130 in such a manner that the connecting lever 120 and the ejecting lever 150 are urged counterclockwise and upward, respectively. The retention lever 140 serves to engage the connecting lever 120 in the open position when the cartridge chamber lid 10 is opened, and is turnably held on the lever holding plate 110 by a securing shaft 141 which is slidably fitted in a rotating slide hole 142. A retention portion 143 serves to engage the engagement portion 125 for the purpose of engaging the connecting lever 120 in the open position when the cartridge chamber lid 10 is opened. The retention lever 140 has a spring guide shaft 144 on which an urging spring 145 composed of a compression coil spring is fitted, and the urging spring 145 serves to springily urge the retention lever 140 against the connecting lever 120 by imparting a counterclockwise turning force to the retention lever 140.

The ejecting lever 150 serves to eject the film cartridge 100 from the camera body 1 when the cartridge chamber lid 10 is opened. The ejecting lever 150 is held on the connecting lever 120 by two securing shafts 152 which are respectively slidably fitted in slide holes 153. The ejecting lever 150 also has an ejecting portion 154 which serves to force the bottom of the film cartridge 100 in the upward direction to eject the film cartridge 100, and an inward forcing arm 155 which is pressed by the reverse side of the cartridge chamber lid 10 when the cartridge chamber lid 10 is closed with the film cartridge 100 being loaded.

A flexible printed circuit board 160 has electrical elements for signal detection and an electrical circuit such as a switch pattern. A photoreflector 161 serves to read information from the data disk 904 disposed at the bottom of the film cartridge 100 to be used in the camera according to the embodiment of the present invention. Switch patterns 162 and 163 which constitute part of a cartridge chamber lid opening/closing switch are formed on the reverse side of the printed circuit board 160, and detect the rotational position of the controller 180, thereby detecting whether the cartridge chamber lid is opened or closed, as will be described later.

A driver driving plate 170 rotates integrally with the controller 180 to rotationally drive a D-driver 175 which will be described later, and has a sector gear portion 171 which meshes with a sector gear portion 176 provided on the D-driver 175. The driver driving plate 170 also has projections 172 which position and fix a contact piece 174 which is in slidable contact with the switch patterns 162 and 163 formed on the reverse side of the printed circuit board 160. If the driver driving plate 170 rotates while maintaining the contact piece 174 in contact with the switch patterns 162 and 163, the switch patterns 162 and 163 detect the rotation position of the controller 180 which is held integrally with the driver driving plate 170, thereby detecting whether the cartridge chamber lid is opened or closed. That is to say, the contact piece 174 and the switch patterns 162 and 163 constitute the cartridge chamber lid opening/closing switch.

The D-driver 175 serves to open and close the door portion 903*a* which shields the film egress/ingress slot of the film cartridge 100 from light.

The controller 180 has an engagement hole 181 which is slidably engaged with the driving arm 127 of the connecting lever 120, and a spring hooking portion 182 on which one end of a driving spring 250 is hooked. The driving spring 250 is a tension spring for urging the controller 180 to rotate clockwise, as shown in FIGS. 8(*a*), 8(*b*) and so on which will be described later. The controller 180 also has a controller lock claw 183 which extends through an arcuate hole 203 of a cover plate 200 into an area below the reverse side of the cover plate 200. The other end of the driving spring 250 is hooked on a spring hooking portion 201 of the cover plate 200. A controller pressure plate 190 is fixed to the driver driving plate 170 for the purpose of rotatably holding the controller 180 on the driver driving plate 170.

As shown in FIG. 6, the controller 180 slidably rotatably meshes with the outer circumference of a hollow rotating shaft 170*a* of the driver driving plate 170, and stoppers are disposed between the controller 180 and the driver driving plate 170 so that a small rotational play appears in the direction of rotation of the controller 180 and the driver driving plate 170. As shown in FIG. 8(*a*) and the like which will be described later, an overcharge spring 191 which is a compression coil spring is hooked between the controller 180 and the driver driving plate 170 to bias the rotational play of the controller 180 and the driver driving plate 170 in one direction, and even if the driver driving plate 170 stops its rotation, the controller 180 can further continue to rotate while charging the overcharge spring 191. The inner circumference of the hollow rotating shaft 170*a* of the driver driving plate 170 is rotatably slidably fitted on the outer circumference of a bearing portion 1*a* which is disposed at the bottom of the cartridge chamber of the camera body 1, and is held on the camera body 1 by the cover plate 200 being secured to the camera body 1.

A rotating shaft 230 of a transmission gear 337 which will be described later is fixed to the cover plate 200, and an upper rotating shaft 231 which projects from the top surface of the cover plate 200 is slidably rotatably fitted in a fitting hole 211 of a first lock lever 210 and the first lock lever 210 is secured by fixing a washer 215 to the top portion of the upper rotating shaft 231. As will be described later, when a first lock claw 213 rotates above the top surface of the cover plate 200 and enters the rotational locus of the controller lock claw 183 provided on the controller 180, the first lock claw 213 inhibits the counterclockwise rotation of the controller 180 with the film cartridge 100 being loaded in the camera and the cartridge chamber lid 10 being closed. A driving arm 214 which serves to rotationally drive the first lock lever 210 has a driving pin 212 fixed at its tip end, and the driving pin 212 extends through an approximately square hole portion 202 of the cover plate 200 and is slidably engaged with an engagement hole 221 formed at one end of a lock driving lever 220 for driving the first lock lever 210.

A bearing 242 which is rotatably fitted on a lower rotating shaft 232 of the rotating shaft 230 is fixed to a second lock lever 240, and the transmission gear 337 which is rotatably fitted on the bearing 242 and a friction spring 245 which is a compression coil spring are rotatably compressibly disposed between the bearing 242 and the second lock lever 240. Accordingly, a friction force is produced between the second lock lever 240 and the transmission gear 337 by the springy pressure of the friction spring 245 and the second lock lever 240 and the transmission gear 337 can be integrally rotated by the friction force. Even if the second lock lever 240 is in a stopped state, the transmission gear 337 can continue to rotate, because the opposite ends of the friction spring 245 are allowed to slip. An E-ring 246 which is a ring for preventing the bearing 242 from coming off is secured to the lower end of the bearing 242 (the tip end of the lower rotating shaft 232).

A second lock claw 241 is formed at the tip end of the second lock lever 240, and as will be described later, when the second lock claw 241 of the second lock lever 240 rotates below the bottom surface of the cover plate 200 owing to the rotation of the transmission gear 337 and moves into the rotational locus of the controller lock claw 183 provided on the controller 180, the second lock claw 241 inhibits the counterclockwise rotation of the controller 180 with the film cartridge 100 being loaded in the camera and the cartridge chamber lid 10 being closed.

Incidentally, the first lock lever 210 is arranged to engage the vicinity of the bent root of the controller lock claw 183 of the controller 180 above the top surface of the cover plate 200, thereby inhibiting the rotation of the controller 180, while the second lock lever 240 is arranged to engage the tip end of the controller lock claw 183 of the controller 180 which extends through the arcuate hole 203 of the cover plate 200 into an area below the bottom surface of the cover plate 200, thereby inhibiting the rotation of the controller 180.

A fork key 339 is inserted into the tip end of a fork gear 338 from the inside thereof, and the fork key 339 is forced upward by a key forcing spring 338*b* which is a compression coil spring. A cap 338*a* for integrally sealing the fork key 339 and the key forcing spring 338*b* in the fork gear 338 is fixed to the fork gear 338, and is arranged to rotate integrally with the fork gear 338. A rotating shaft portion 338*c* of the fork gear 338 is rotatably slidably fitted in and held by the inner circumference of the hollow bearing portion 1*a* disposed at the bottom of the cartridge chamber of the camera body 1.

The operation of loading the film cartridge 100 into the camera according to the embodiment of the present invention and closing the cartridge chamber lid 10 in the above-described construction will be described below with reference to FIGS. 7(*a*) and 7(*b*) to 12(*a*) and 12(*b*).

FIGS. 7(*a*), 7(*b*) and 8(*a*), 8(*b*) are views showing the state in which the cartridge chamber lid 10 is opened before the film cartridge 100 is loaded into the camera body 1. FIGS. 9(*a*), 9(*b*) and 10(*a*), 10(*b*) are views showing the state in which the cartridge chamber lid 10 is closed immediately after the film cartridge 100 is loaded into the camera body 1. FIGS. 11(*a*), 11(*b*) and 12(*a*), 12(*b*) are views showing the state in which the cartridge chamber lid 10 is closed in an engaged stage after the film cartridge 100 is loaded into the camera body 1.

Among these figures, FIGS. 7(*a*), 9(*a*) and 11(*a*) are views showing the interior of the cartridge chamber lid 10 as viewed from above the camera body 1, while FIGS. 7(*b*), 9(*b*) and 11(*b*) are views showing the operations of various levers held on the lever holding plate 110 as viewed from one side of the camera body 1 (the side of the camera body 1 to which the strap holder 20 is secured). FIGS. 8(*a*), 10(*a*) and 12(*a*) are views showing the operations of the controller 180, the driver driving plate 170 and the D-driver 175 as viewed from below the camera body 1, while FIGS. 8(*b*), 10(*b*) and 12(*b*) are views showing the states of changeover of the contact piece 174 and the switch patterns 162 and 163 which constitute the cartridge chamber lid opening/closing switch for detecting the operating states of the controller 180, the driver driving plate 170 and the D-driver 175 shown in FIGS. 8(*a*), 10(*a*) and 12(*a*).

When the camera is in the state shown in FIG. 7(*a*), the opening/closing knob 50 is pulled up with the cartridge chamber lid 10 being opened, and the cartridge chamber lid opening/closing shaft 30 is rotated clockwise so that the cartridge chamber lid engagement lever 80 is moved to the right on the surface of the sheet of FIG. 7(*a*). During this time, the pinion plate 60 is stopped in the state of being springily urged clockwise by the opening/closing shaft urging spring 70.

As shown in FIG. 7(*b*), the film cartridge 100 is not loaded, and the ejecting lever 150 is moved up to a standby position by the urging force of the ejecting spring 130. A counterclockwise rotating force is applied to the connecting lever 120 by the respective springy forces of the ejecting spring 130 and the driving spring 250 which will be described later, but the engagement portion 125 is engaged by the retention portion 143 of the retention lever 140 and the connecting lever 120 is placed in an open position. During this state, if a user erroneously depresses the retention lever 140 with stick-shaped matter having a sharp tip and rotates the retention lever 140 clockwise to release the engagement of the connecting lever 120, the connecting lever 120 rotates counterclockwise, but an erect portion 128 formed on the connecting lever 120 comes to a stop at a position below a stopper 156 of the ejecting lever 150. Accordingly, even if the user attempts to load the film cartridge 100, the stopper 156 of the ejecting lever 150 collides with the erect portion 128 and the ejecting lever 150 is not allowed to move downward, whereby, even in this case, the film cartridge 100 is not allowed to be loaded into the cartridge chamber.

As shown in FIGS. 8(*a*) and 8(*b*), the controller 180 is engaged by the connecting lever 120 in the state of charging the driving spring 250 against the counterclockwise urging force of the driving spring 250 (because the driving arm 127 is in engagement with the engagement hole 181). Accordingly, during this state, as described above with reference to FIG. 7(*b*), not only the spring force of the ejecting lever 150 but also that of the driving spring 250 is applied to the connecting lever 120 so that a rotating force which acts to rotate the connecting lever 120 counterclockwise is applied to the connecting lever 120. A stopper 177 of the D-driver 175 is brought into abutment with a stopper portion provided on the camera body 1, whereby the D-driver 175 is stopped at a position which brings the light-lock door 903 of the film cartridge 100 to a light-shielding position. Since the D-driver 175 is stopped by the stopper portion, the rotation of the driver driving plate 170 is stopped, but the controller 180 rotates through a rotating angle slightly larger than that of the driver driving plate 170 to charge the overcharge spring 191 between the driver driving plate 170 and the controller 180, thereby imparting a clockwise rotating force to the driver driving plate 170 and rotationally urging the D-driver 175 against the stopper portion by the clockwise rotating force. Accordingly, the D-driver 175 can be stopped at a position which reliably brings the light-lock door 903 to the light-shielding position. At this time, when the switch patterns 162 and 163 provided on the printed circuit board 160 are made to electrically conduct through the contact piece 174 fixed to the driver driving plate 170, i.e., the cartridge chamber lid opening/closing switch is turned on, a CPU which will be described later detects that the cartridge chamber lid 10 is opened.

As the film cartridge 100 is loaded into the camera body 1 and the cartridge chamber lid 10 is closed (refer to FIG. 9(*b*)), an ejecting portion 154 of the ejecting lever 150 is forced downward to a certain extent by the film cartridge 100 while the ejecting lever 150 is charging the ejecting spring 130, and, subsequently, the ejecting lever 150 is completely forced down by the reverse portion of the cartridge chamber lid 10. In addition, the engagement releasing portion 82 and the engagement claw 83 of the cartridge chamber lid engagement lever 80 are moved downward together with the cartridge chamber lid 10. As the cartridge chamber lid 10 moves downward, a tapered portion 82*a* of the engagement releasing portion 82 of the cartridge chamber lid engagement lever 80 comes into abutment with the sliding portion 126 of the connecting lever 120 to rotate the connecting lever 120 clockwise. In addition, the tip of the sliding portion 126 rotates the retention lever 140 clockwise against the urging force of the urging spring 145, thereby releasing the engagement between the retention portion 143 of the retention lever 140 and the engagement portion 125 of the connecting lever 120.

It is to be noted that the shape of taper of the tapered portion 82*a* of the engagement releasing portion 82 of the cartridge chamber lid engagement lever 80 is determined so that after the connecting lever 120 is rotated to a certain extent and a clearance is formed between the retention portion 143 of the retention lever 140 and the engagement portion 125 of the connecting lever 120, the tip of the tapered portion 82*a* comes into abutment with and presses the retention lever 140.

As the connecting lever 120 is rotated clockwise, the controller 180 is rotated further clockwise while charging the driving spring 250 (refer to FIGS. 10(*a*)). However, since the D-driver 175 and the driver driving plate 170 remain stopped at the position, shown in FIG. 8(*a*), which brings the light-lock door 903 to the light-shielding position, the controller 180 further charges the driving spring 250. Accordingly, immediately before the cartridge chamber lid 10 is closed after the film cartridge 100 is loaded, the spring force of the ejecting spring 130, the spring force of the driving spring 250 and the spring force of the overcharge spring 191 are applied to the connecting lever 120, whereby a large rotating force which acts to rotate the connecting lever 120 counterclockwise is applied to the connecting lever 120.

As described previously, during either of the states shown in FIGS. 9(*a*), 9(*b*) and 10(*a*), 10(*b*), since the D-driver 175 and the driver driving plate 170 are stopped at the position, shown in FIG. 8(*a*), which brings the light-lock door 903 to the light-shielding position, the contact piece 174 fixed to the driver driving plate 170 holds the switch patterns 162 and 163 provided on the printed circuit board 160 in an electrically conducting state, i.e., holds the cartridge chamber lid opening/closing switch in an ON state. Accordingly, even when the cartridge chamber lid 10 is in an incompletely closed state, the CPU which will be described later detects that the cartridge chamber lid 10 is open, and does not execute a subsequent operational sequence.

Figure 11A:
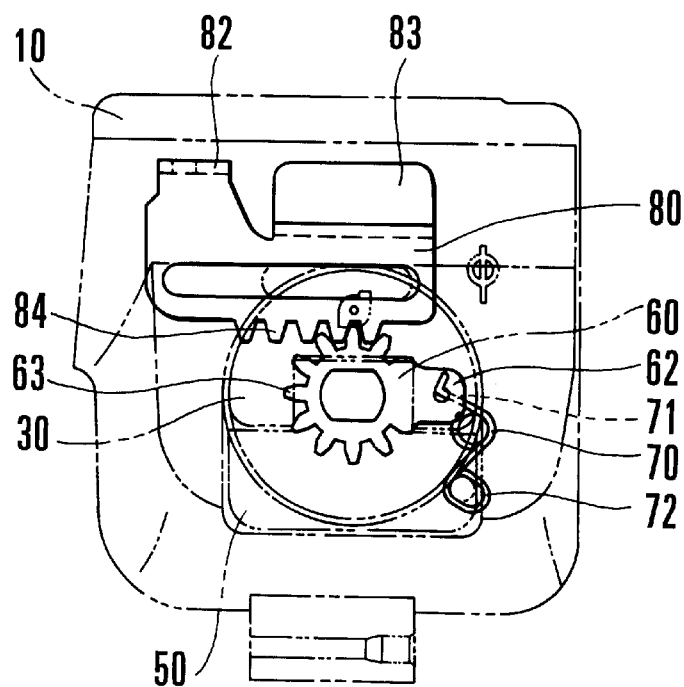
FIGS. 11(a) and 11(b) are views showing the state of operation of the essential portion in which the cartridge chamber lid is closed in an engaged stage after the film cartridge is loaded into the camera body.
Figure 11B:
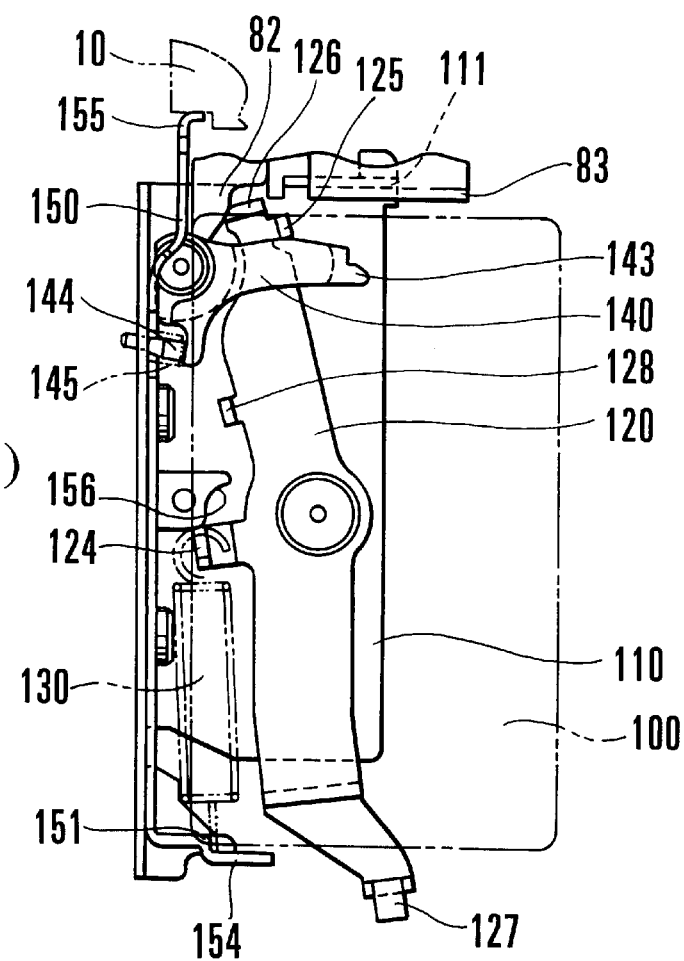

If the cartridge chamber lid 10 is held in a completely closed state (refer to FIGS. 11(*a*), 11(*b*) and 12(*a*), 12(*b*)), the connecting lever 120 rotates counterclockwise by the spring forces of the ejecting spring 130, the driving spring 250 and the overcharge spring 191. During this time, since the sliding portion 126 of the connecting lever 120 presses the engagement releasing portion 82 of the cartridge chamber lid engagement lever 80 toward the left as viewed in FIG. 11(a), the cartridge chamber lid engagement lever 80 slides to the left so that the engagement claw 83 slides into an area below the engagement arm 111 of the lever holding plate 110 to inhibit the cartridge chamber lid 10 from opening (moving upward as viewed in FIG. 11(a)) and engage and hold the cartridge chamber lid 10 in a closed position.

During this time, as the result of the release of the engagement of the connecting lever 120, the controller 180 is rotated counterclockwise by the spring force of the driving spring 250 while pressing the driving arm 127 of the connecting lever 120 (refer to FIG. 10(a)→FIG. 12(a)). As the controller 180 rotates in this manner, the controller lock claw 183 provided on the controller 180 rotates counterclockwise and stops at a position which the controller lock claw 183 can be engaged by the first lock lever 210 and the second lock lever 240.

Meanwhile, the driver driving plate 170 releases its overcharging state relative to the controller 180 and rotates counterclockwise integrally with the controller 180. As the driver driving plate 170 rotates counterclockwise, the D-driver 175 rotates clockwise, and when the D-driver 175 reaches a position which brings the light-lock door 903 of the film cartridge 100 to an open position, the D-driver 175 is stopped by the action of the stopper 177 and the respective rotations of the controller 180 and the driver driving plate 170 are stopped. During this time, the contact piece 174 fixed to the driver driving plate 170 slides counterclockwise on the switch patterns 162 and 163 provided on the printed circuit board 160. However, the switch pattern 162 is arranged to be out of contact with the contact piece 174 as shown in FIG. 12(b) when the D-driver 175 is placed in the position which brings the light-lock door 903 of the film cartridge 100 to the open position. Accordingly, during the state shown in FIGS. 11(a), 11(b) and 12(a), 12(b), since the conduction of the switch patterns 162 and 163 by the contact piece 174 is cut off, i.e., the cartridge chamber lid opening/closing switch is turned off, the CPU which will be described later detects that the cartridge chamber lid 10 is completely closed and the film cartridge 100 is ready for preliminary winding which precedes photography, and starts a subsequent operational sequence in preparation for photography.

After the completion of photography followed by film rewinding, if the user is to take the film cartridge 100 out of the camera body 1, the operations described with reference to FIGS. 7(a) and 7(b) to 12(a) and 12(b) are performed in reverse order. Specifically, during the state shown in FIG. 11(a), if the user pulls up the opening/closing knob 50 and rotates the cartridge chamber lid opening/closing shaft 30 clockwise, the engagement releasing portion 82 of the cartridge chamber lid engagement lever 80 rotates the connecting lever 120 clockwise while charging the ejecting spring 130.

At the same time, the controller 180 rotates clockwise by the action of the connecting lever 120 while charging the driving spring 250, and causes the driver driving plate 170 to rotate the D-driver 175 up to a position which brings the light-lock door 903 of the film cartridge 100 to a closed position, thereby bringing the light-lock door 903 of the film cartridge 100 into a light-shielding state.

When the cartridge chamber lid opening/closing shaft 30 is rotated clockwise up to a position which makes it possible to release the engagement between the engagement claw 83 of the cartridge chamber lid engagement lever 80 and the engagement arm 111 of the lever holding plate 110 (refer to FIGS. 9(a), 9(b) and 10(a), 10(b)), the engagement portion 125 of the connecting lever 120 is rotated clockwise up to a position where the engagement portion 125 can be engaged by the retention lever 140. During this state, if the cartridge chamber lid 10 is moved toward the open position, first, the retention lever 140 rotates counterclockwise toward the position where the retention lever 140 can engage the connecting lever 120, by the spring force of the urging spring 145, according as the tip of the engagement releasing portion 82 of the cartridge chamber lid engagement lever 80 moves upward. In addition, as the tapered portion 82a of the engagement releasing portion 82 of the cartridge chamber lid engagement lever 80 moves upward, the connecting lever 120 gradually rotates counterclockwise.

It is to be noted that the shapes of the tapered portion 82a and the engagement releasing portion 82 of the cartridge chamber lid engagement lever 80 are determined so that after the retention lever 140 rotates to and stops at the position where the retention lever 140 can engage the connecting lever 120, the engagement portion 125 of the connecting lever 120 comes into abutment with the retention portion 143 of the retention lever 140 and the engagement portion 125 of the connecting lever 120 is engaged to hold the connecting lever 120 in the open position (refer to FIGS. 7(a), 7(b) and 8(a), 8(b)).

When the cartridge chamber lid 10 is opened with the connecting lever 120 being held in the open position, the film cartridge 100 is ejected from the cartridge chamber of the camera body 1 by the ejecting lever 150 urged by the spring force of the ejecting spring 130, whereby the user becomes able to take the film cartridge 100 out of the cartridge chamber.

A driving transmission system which includes a film transporting mechanism of the camera having the above-described construction will be described below.

Figure 14:
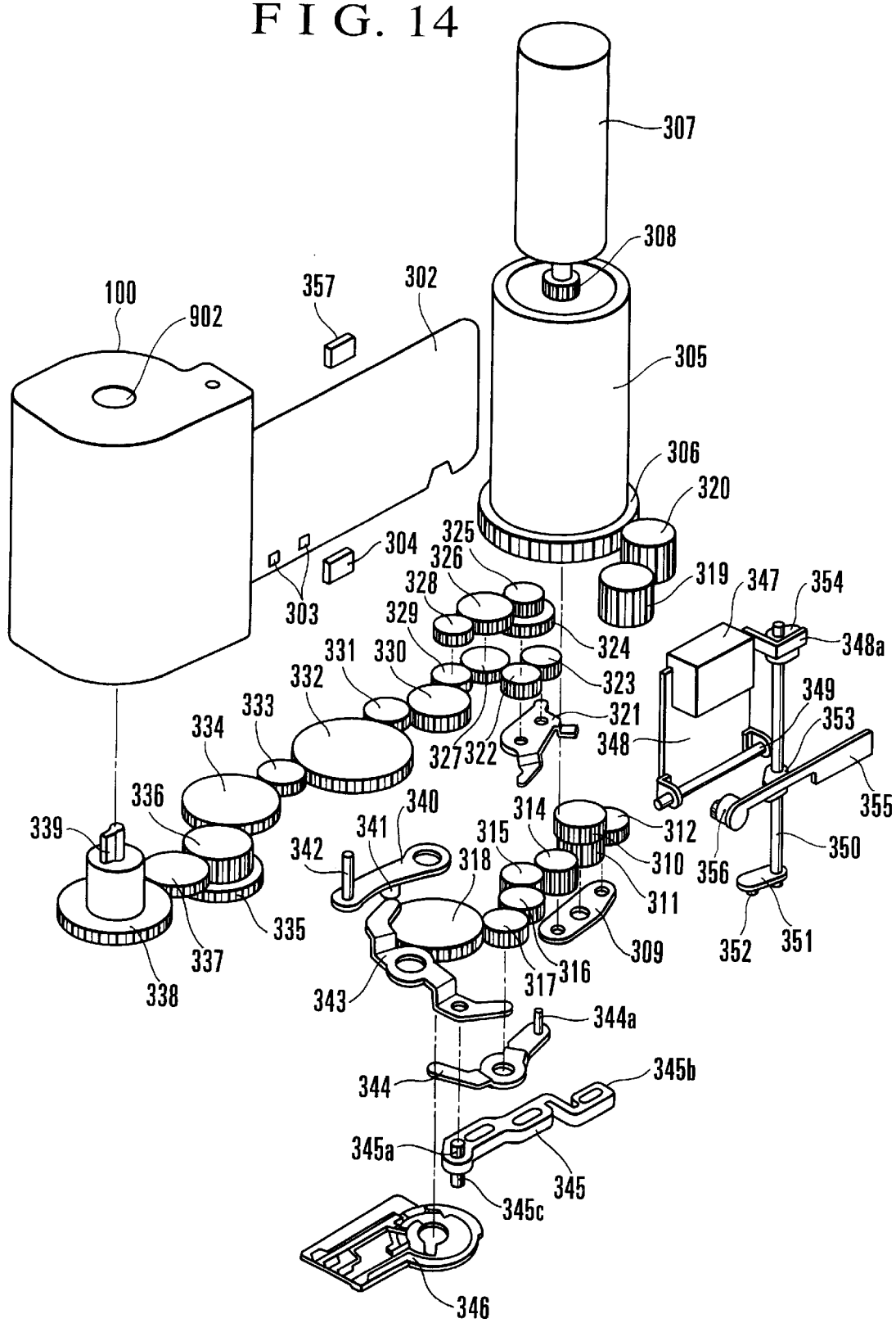
FIG. 14 is an exploded perspective view of a driving transmission system which includes a film transporting mechanism of the camera according to the embodiment of the present invention.

FIG. 14 is an exploded perspective view of the driving transmission system which includes the film transporting mechanism of the above-described camera as viewed from a back-lid side.

Referring to FIG. 14, the film cartridge 100 has a film 302 in which positioning perforations 303 are formed, and an optical sensor 304 is disposed as a perforation detector for detecting the perforations 303.

The film 302 is accommodated in the film cartridge 100 in the state of being wound around the supply spool 902, and if the fork key 339 which will be described later rotates the supply spool 902, the film 302 is fed out of the film cartridge 100. If the supply spool 902 is rotated in the opposite direction, the film 302 is rewound into the film cartridge 100. The optical sensor 304 detects the perforations 303, and the CPU which will be described later executes position control of the film 302 on the basis of the output from the optical sensor 304.

A take-up spool 305 is provided integrally with a spool gear 306, and a motor 307 is accommodated in the take-up spool 305 and a pinion gear 308 is secured to the output shaft of the motor 307.

Sun gears 310 and 311, which are integrally formed, and planetary gears 312 and 314 are rotatably supported by a planetary arm 309, and constitute a known planetary clutch. The sun gear 310 meshes with a pinion gear 308, and the output of the motor 307 is transmitted from the pinion gear 308 to the planetary gears 312 and 314 through the sun gears 310 and 311. Gears 315, 316 and 317 are cam transmission gears, respectively, and a gear 318 is a cam gear.

Figure 15A:
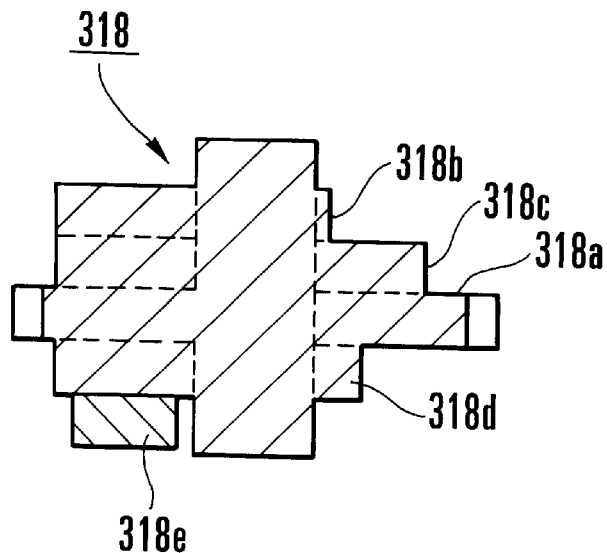
FIGS. 15(a) and 15(b) are side and plan views showing the cam gear shown in FIG. 14, respectively.
Figure 15B:
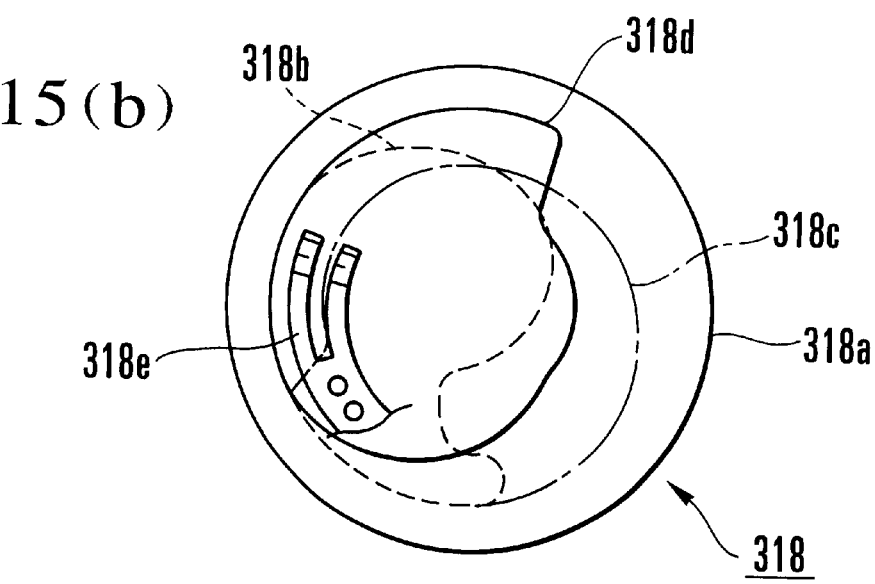

FIGS. 15(a) and 15(b) show the construction of the cam gear 318. FIG. 15(a) is a cross-sectional view of the cam gear 318, and FIG. 15(b) shows the shape of the cam gear 318 as viewed from the bottom of the cam gear 318 shown in FIG. 15(a).

As shown in FIGS. 15(a) and 15(b), the cam gear 318 includes a gear portion 318a, a charging cam 318b for driving a charging lever 340, a driving cam 318c for driving a driving lever 343, a rewinding cam 318d for driving a rewinding lever 344, and a phase contact piece 318e for detecting the phase of the cam gear 318 through a phase circuit board 346.

Figure 16:
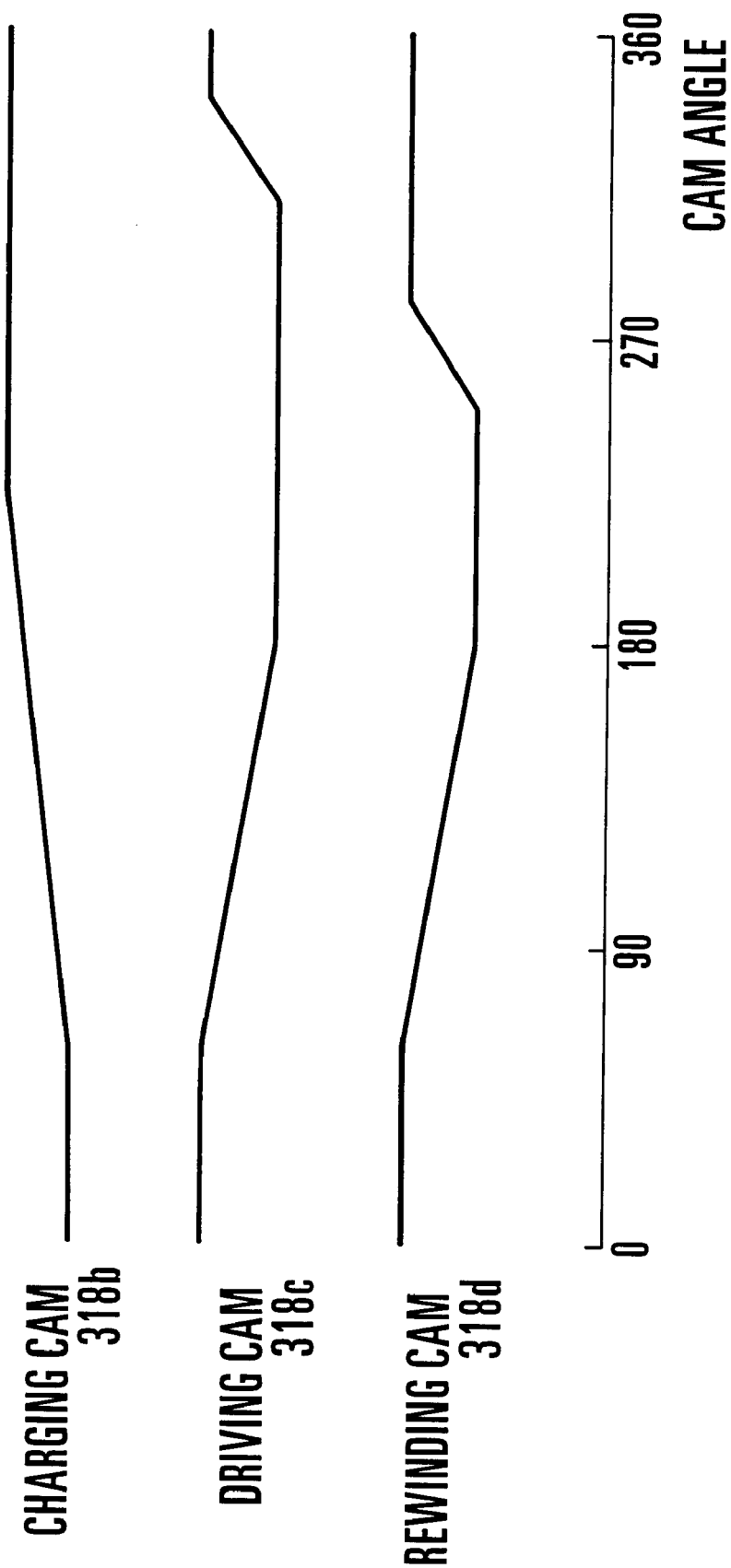
FIG. 16 is a cam diagram of each of the cams shown in FIG. 15.

As shown in FIG. 15(a), in the cam gear 318, the charging cam 318b, the driving cam 318c, the gear portion 318a and the rewinding cam 318d are fixedly stacked in that order. The phase contact piece 318e is secured to the bottom of the rewinding cam 318d. In FIG. 15(b), the dashed line shows the cam shape of the charging cam 318b, the chain line shows the cam shape of the driving cam 318c, and the solid line shows the cam shape of the rewinding cam 318d. FIG. 16 is a cam diagram of each of the cams 318b, 318c and 318d.

As shown in FIG. 14, the planetary gear 314, the cam transmission gears 315, 316 and 317 and the cam gear 318 are serially meshed in that order so as to rotate the cam gear 318. Gears 319 and 320 are spool driving gears which constitute a film driving mechanism together with the take-up spool 305. The planetary gear 314, the spool driving gears 319 and 320 and the spool gear 306 are serially meshed in that order so as to rotate the take-up spool 305. A sun gear 322, a rewinding planetary gear 323 and transmission gears 324 and 325 are supported by a rewinding planetary arm 321. The transmission gears 324 and 325 are integrally formed. The sun gear 322 and the transmission gears 324 and 325 are coaxially supported, but no rotation is transmitted between the sun gear 322 and the transmission gears 324 and 325. Transmission gears 326 and 327 are coaxially supported, but no rotation is transmitted between them. Gears 328 and 329 are clutch gears.

Figure 17:
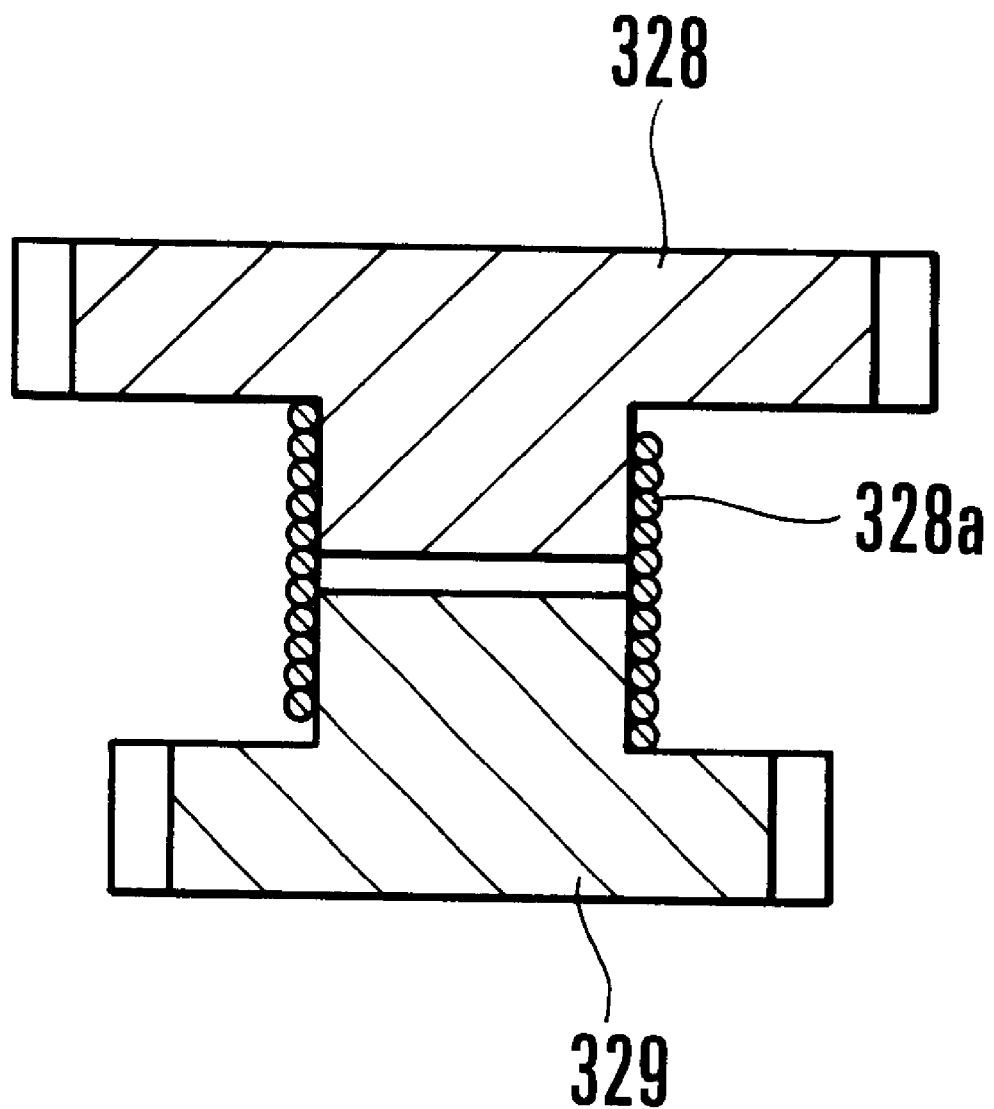
FIG. 17 is a vertical sectional view of the clutch gears shown in FIG. 14.

As shown in FIG. 17, the clutch gears 328 and 329 and a clutch spring 328a constitute a known one-way clutch mechanism. If the clutch gear 328 rotates clockwise as viewed from below in FIG. 17, the clutch spring 328a is tightly wound and the rotation of the clutch gear 328 is transmitted to the clutch gear 329. While the clutch gears 328 and 329 are rotating clockwise as viewed from below in FIG. 17, if the speed of rotation of the clutch gear 329 becomes faster than that of the clutch gear 328, the clutch spring 328a is loosened and a slip takes place between the clutch gears 328 and 329, i.e., the clutch gears 328 and 329 become disengaged.

Returning to FIG. 14, gears 330, 331, 332, 333, 334, 335, 336 and 337 are transmission gears. As shown in FIGS. 5 and 6, the second lock lever 240 is turnably supported on the transmission gear 337 via the bearing 242 coaxially and integrally with the rotating shaft 230 of the transmission gear 337. Since the transmission gear 337 and the second lock lever 240 are arranged integrally with each other with the friction spring 245 being sandwiched between the transmission gear 337 and the second lock lever 240 as described previously, a friction force is produced between the transmission gear 337 and the second lock lever 240 so that the second lock lever 240 can turn with the rotation of the transmission gear 337.

The fork key 339 is formed integrally with the fork gear 338. If the fork key 339 rotates in the winding direction in the state of being engaged with the key groove 902b (refer to FIG. 13(b)) of the supply spool 902 of the film cartridge 100, the film 302 is fed out of the film cartridge 100, whereas if the fork key 339 rotates in the opposite direction, the film 302 is rewound into the film cartridge 100.

The charging lever 340 has a charging roller 341 which is rotatably supported by the charging lever 340, and a charging pin 342 which is secured to the charging lever 340. As will be described later, the charging lever 340 is pivotally moved by the charging cam 318b and performs a shutter charging operation as well as mirror-up and mirror-down operations (the operations of moving up and down the movable mirror 4 shown in FIG. 2). The driving lever 343 is pivotally moved by the driving cam 318c and performs a winding stopping operation, a perforation engaging operation, the operation of moving a magnetic head backward and forward, and the operation of opening or locking the cartridge chamber lid 10, in a manner which will be described later.

The rewinding lever 344 is pivotally moved by the rewinding cam 318d and changes over the rewinding planetary arm 321 from one position to another, in a manner which will be described later. A winding stopping lever 345 constitutes a winding stopping mechanism, and is driven by the driving lever 343, as will be described later, so that an engagement toothed portion 345b provided at one end of the winding stopping lever 345 engages the spool driving gear 319 as well as drives the lock driving lever 220 (shown in FIG. 5 and others) connected to a shaft portion 345c, thereby operating the first lock lever 210 to open or lock the cartridge chamber lid 10.

The phase circuit board 346 detects the phase of the cam gear 318 through the phase contact piece 318e secured to the cam gear 318. A mirror-up phase, a film winding phase, a film rewinding phase and a standby phase are detected.

A magnetic head 347 for performing at least either one of the recording of information on the film 302 and the reading of information from the film 302 is secured to a head holder 348 which is supported by a head holder shaft 349. A pad 357 is fixed to the camera body 1 and serves as a pressure member. The head holder shaft 349 is secured to a pressure plate of the camera body 1. The head holder 348 is urged by a pressure spring (not shown) in the direction of pressing the magnetic head 347 against the pad 357. The head holder 348 pivots on the head holder shaft 349, so that the magnetic head 347 is moved backward and forward.

A retracting lever 351 is secured to a connecting shaft 350, and a retracting lever pin 352 is secured to the retracting lever 351. An engagement cam 353 is secured to the connecting shaft 350, and an engagement claw 356 which serves as a film travel preventing member and film engagement means is secured to a leaf spring 355. A head retracting cam 354 is secured to the connecting shaft 350.

As shown in FIG. 14, the connecting shaft 350 is placed in a first state (the state in which the magnetic head 347 is moved to a position for abutment with the surface of the film 302) by the action of a return spring (not shown). During the first state, the engagement cam 353 presses the leaf spring 355 and the engagement claw 356 is located at a position where the engagement claw 356 is disengaged from the perforation 303. The head retracting cam 354 is out of abutment with an abutment portion 348a of the head holder 348, and the magnetic head 347 is placed in a first position in which the magnetic head 347 is pressed against the pad 357 by the pressure spring (not shown).

FIGS. 18(a), 18(b) and 19(a), 19(b) are views showing one example of mirror driving and one example of shutter charging driving which are performed in the camera. In these figures, reference numeral 450 denotes a mirror lever, reference numeral 451 denotes a mirror driving spring which urges the mirror lever 450 clockwise, reference numeral 452 denotes a mirror-down urging spring which urges a mirror driving pin 453b (which will be described later) in a mirror-down direction (clockwise about a hinge shaft 453a), reference numeral 453 denotes a mirror receiving plate, and reference numeral 454 denotes a shutter charging lever which is provided in a shutter mechanism (not shown) for the purpose of charging the shutter mechanism.

FIGS. 18(a) and 19(a) are views showing a mirror-down state and the state assumed by the charging cam 318b during the mirror-down state. In this mirror-down state, the charging roller 341 provided on the charging lever 340 is located at the cam top position of the charging cam 318b, the charging lever 340 is located at the mirror-down position shown in FIG. 18(a), and the charging pin 342 of the charging lever 340 is in abutment with one end 450a of the mirror lever 450. The mirror lever 450 is located at the mirror-down position shown in FIG. 18(a) against the clockwise rotating force produced by the mirror driving spring 451. At this time, the mirror-down spring 452 produces a spring force by being charged clockwise by the driving pin 453b provided on the mirror receiving plate 453, and presses the driving pin 453b down to a mirror-down position.

FIGS. 18(b) and 19(b) are views showing a mirror-up state and the state assumed by the charging cam 318b during the mirror-up state.

To start a mirror-up operation, the cam gear 318 is made to rotate clockwise from the state shown in FIG. 19(a) by a method which will be described later. When the charging roller 341 comes off the cam top of the charging cam 318b, the charging lever 340 becomes free and the mirror lever 450 rotates about a shaft 450c in the clockwise direction by the action of the mirror driving spring 451. When the mirror lever 450 rotates clockwise, one end 450d of the mirror lever 450 comes into abutment with the driving pin 453b of the mirror receiving plate 453 and presses the driving pin 453b upward. Thus, the mirror receiving plate 453 rotates counterclockwise about a hinge shaft 453a, whereby the mirror receiving plate 453 is moved upward. When the mirror-up operation is performed, another end 450a of the mirror lever 450 which is turning presses the charging pin 342 and the charging roller 341 comes into abutment with the cam bottom of the charging cam 318b, as shown in FIG. 19(b), whereby the charging lever 340 is placed into its mirror-up position.

To start a mirror-down operation and a shutter charging operation, the cam gear 318 is made to rotate clockwise from the state shown in FIG. 19(b) by a method which will be described later. As the cam gear 318 rotates clockwise, the charging roller 341 rotates the charging lever 340 counterclockwise in accordance with the charging cam 318b, as shown in FIG. 19(a). Thus, the charging pin 342 provided at one turning end of the charging lever 340 comes into abutment with the end 450a of the mirror lever 450, thereby driving the mirror lever 450 counterclockwise. When the mirror lever 450 turns counterclockwise, a pin 450b provided on the mirror lever 450 shown in FIG. 18(a) presses the shutter charging lever 454 downward to charge a shutter charging mechanism (not shown), thereby performing shutter charging. On the other hand, if the mirror lever 450 rotates counterclockwise, the mirror lever 450 presses downward the driving pin 453b provided on the mirror receiving plate 453, via the mirror-down urging spring 452, thereby starting the mirror-down operation. Thus, the mirror receiving plate 453 is placed into the mirror-down state shown in FIGS. 18(a) and 19(a).

The operation of the above-described driving transmission system will be described below with reference to FIGS. 20(a), 20(b) to 27.

FIGS. 20(a), 20(b) to 27 are views showing the operation of the driving transmission system of FIG. 14 as viewed from its bottom side.

Figure 20A:
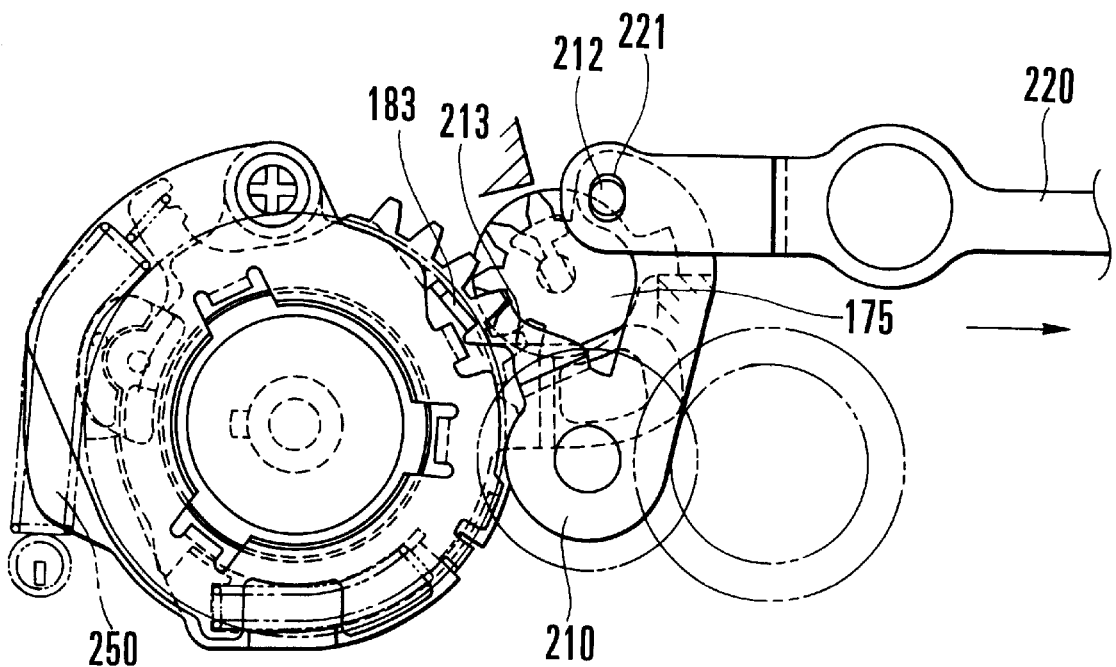
FIGS. 20(a) and 20(b) are plan views showing the state of operation of each member of the essential portion of the driving transmission system shown in FIG. 14 during the forward operation of a motor.
Figure 20B:
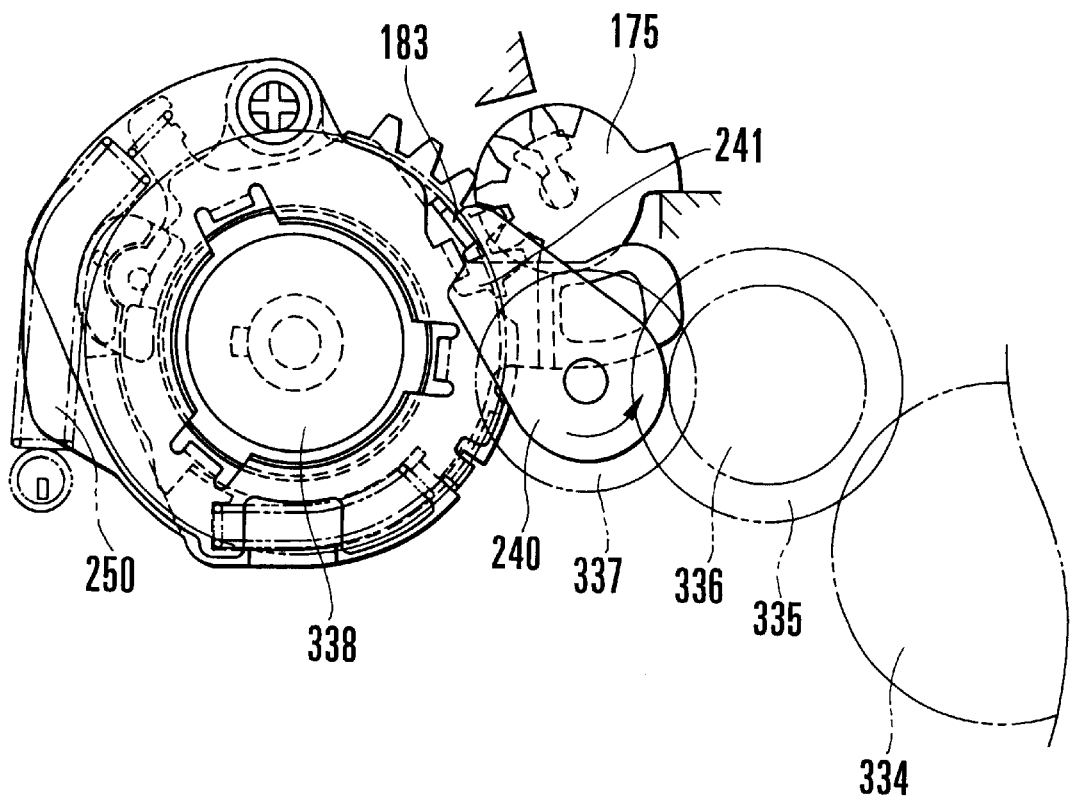
Figure 21:
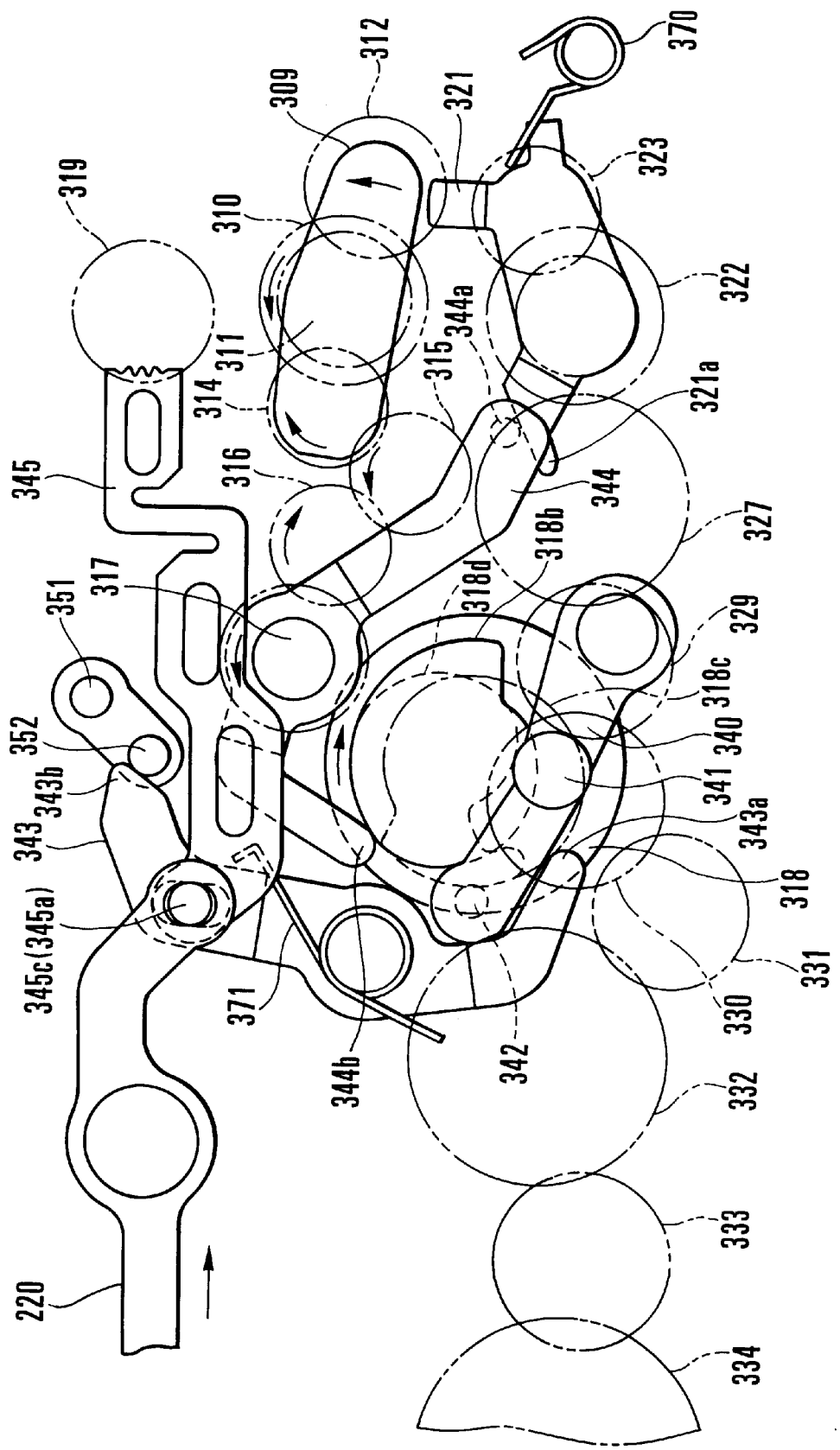
FIG. 21 is a plan view showing the state of operation of each member of the essential portion of the driving transmission system shown in FIG. 20 during the forward operation of the motor.
Figure 22A:
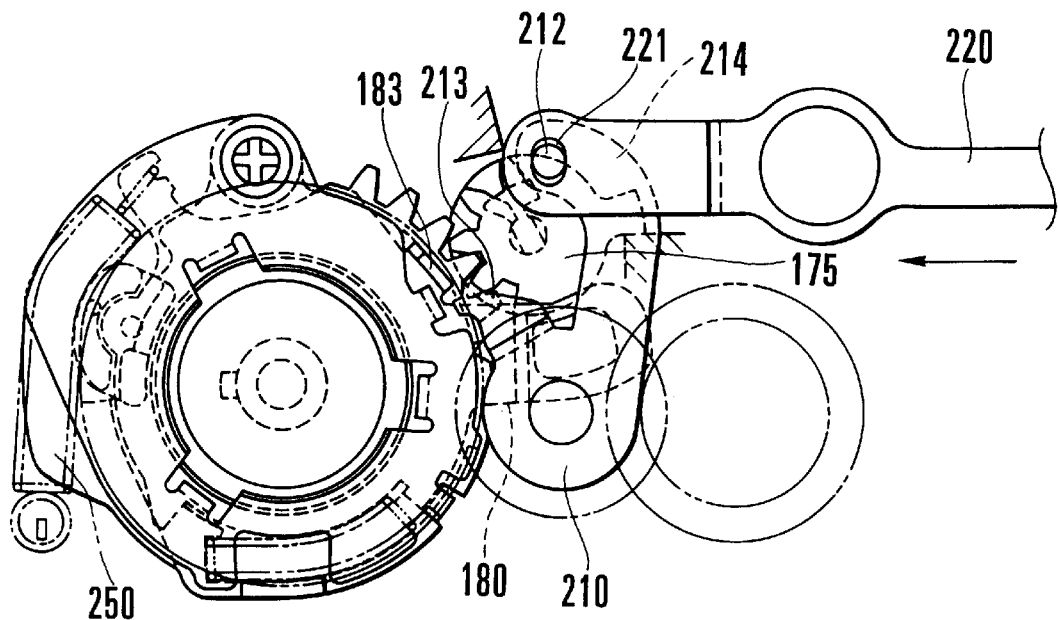
FIGS. 22(a) and 22(b) are plan views showing the state of operation of each member when the motor is reversed from the state shown in FIGS. 20(a), 20(b) and 21.
Figure 22B:
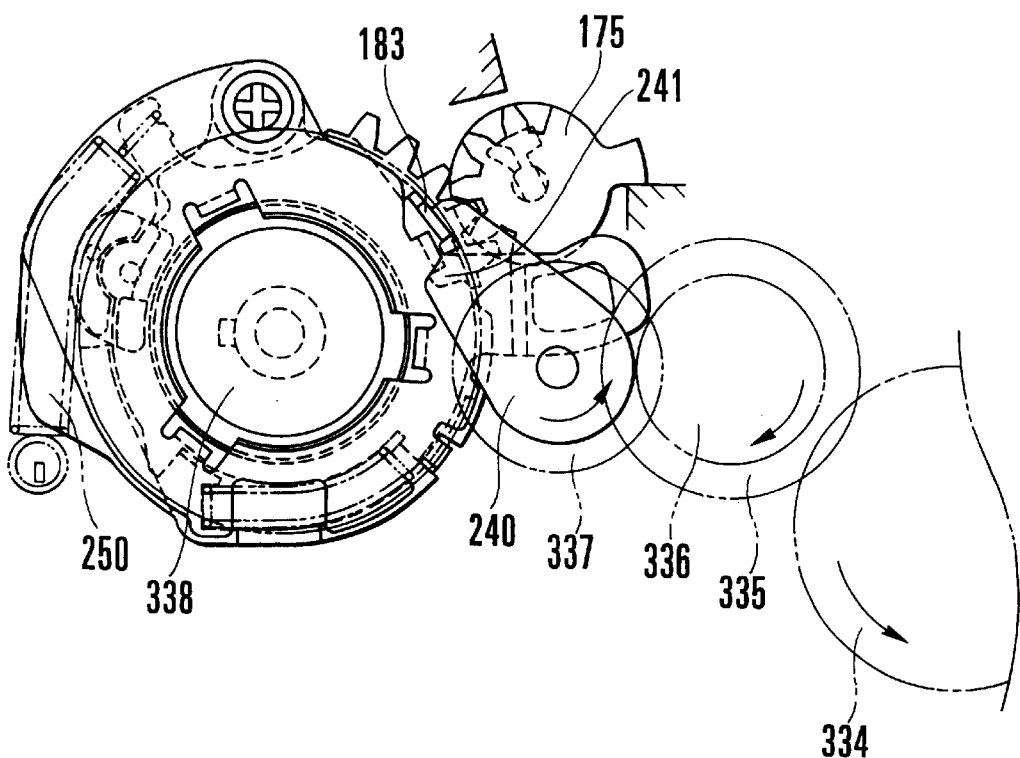
Figure 23:
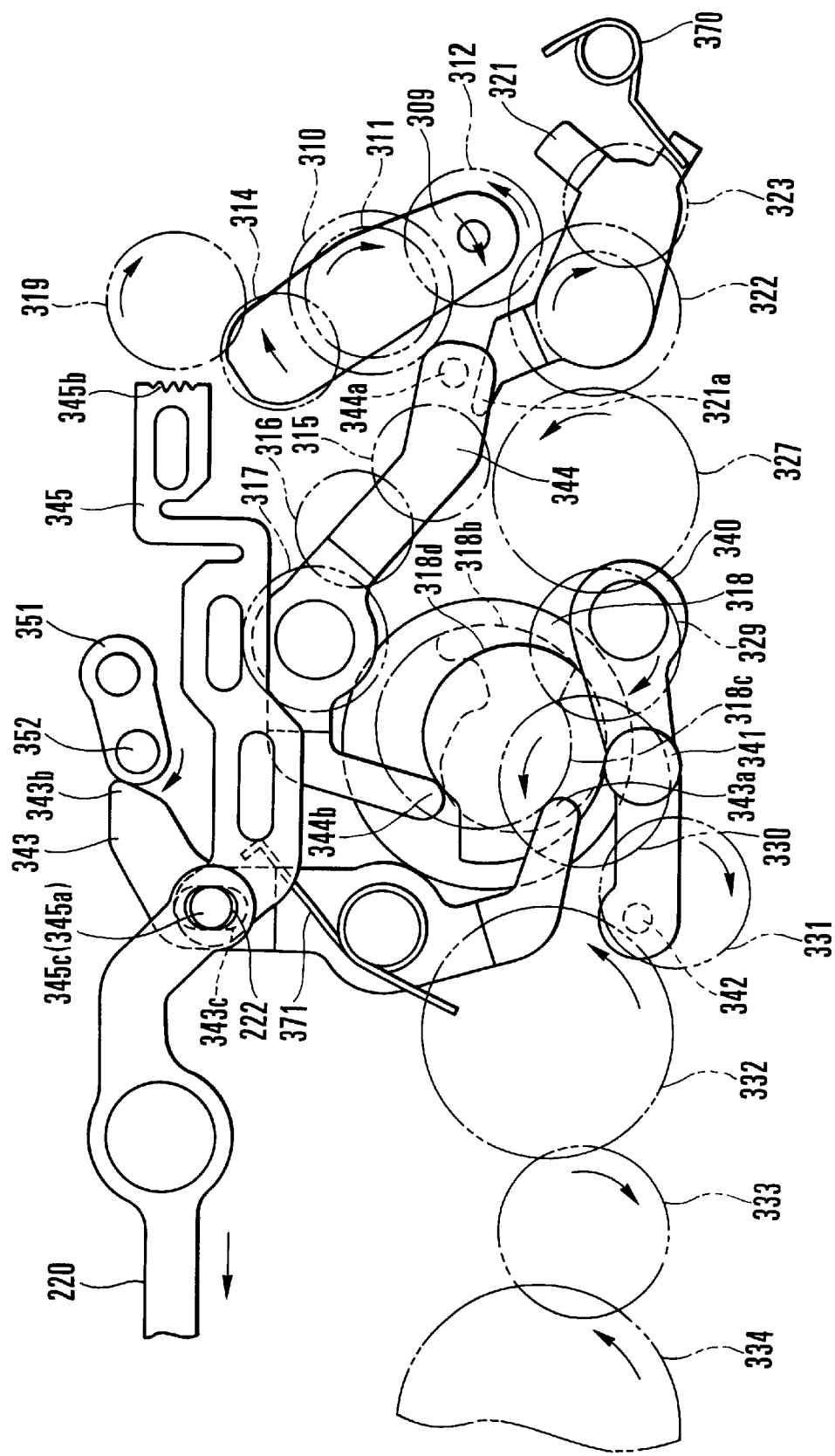
FIG. 23 is a plan view showing the state of operation of each member connected to the driving transmission system shown in FIGS. 22(a) and 22(b) during the reverse operation of the motor.
Figure 24A:
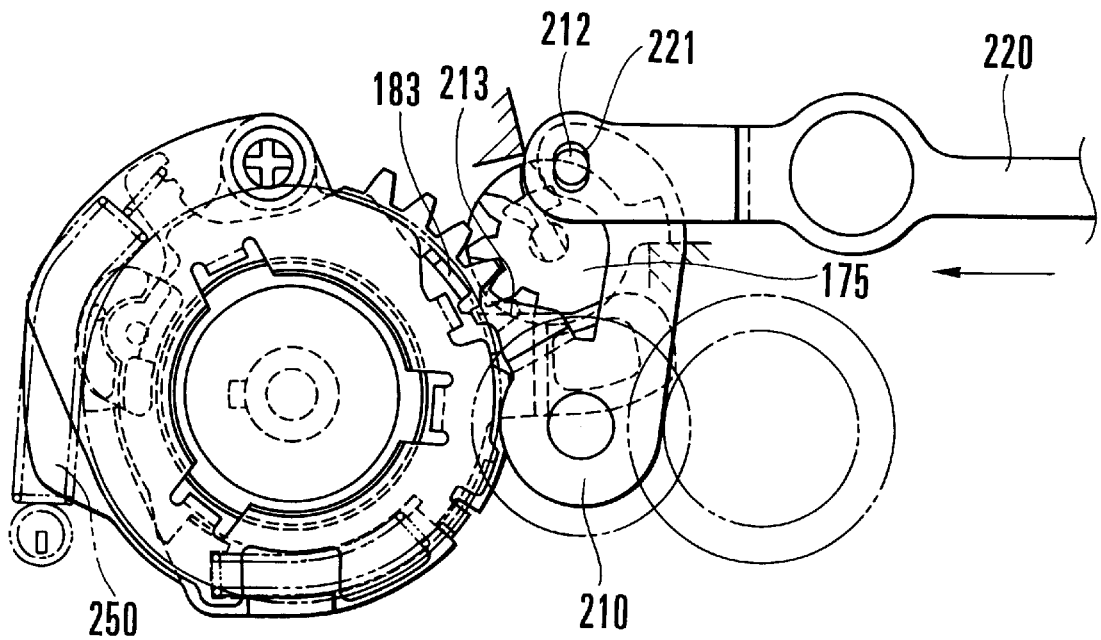
FIGS. 24(a) and 24(b) are plan views showing the state of operation of each member when the motor is reversed further from the state shown in FIGS. 22(a), 22(b) and 23.
Figure 24B:
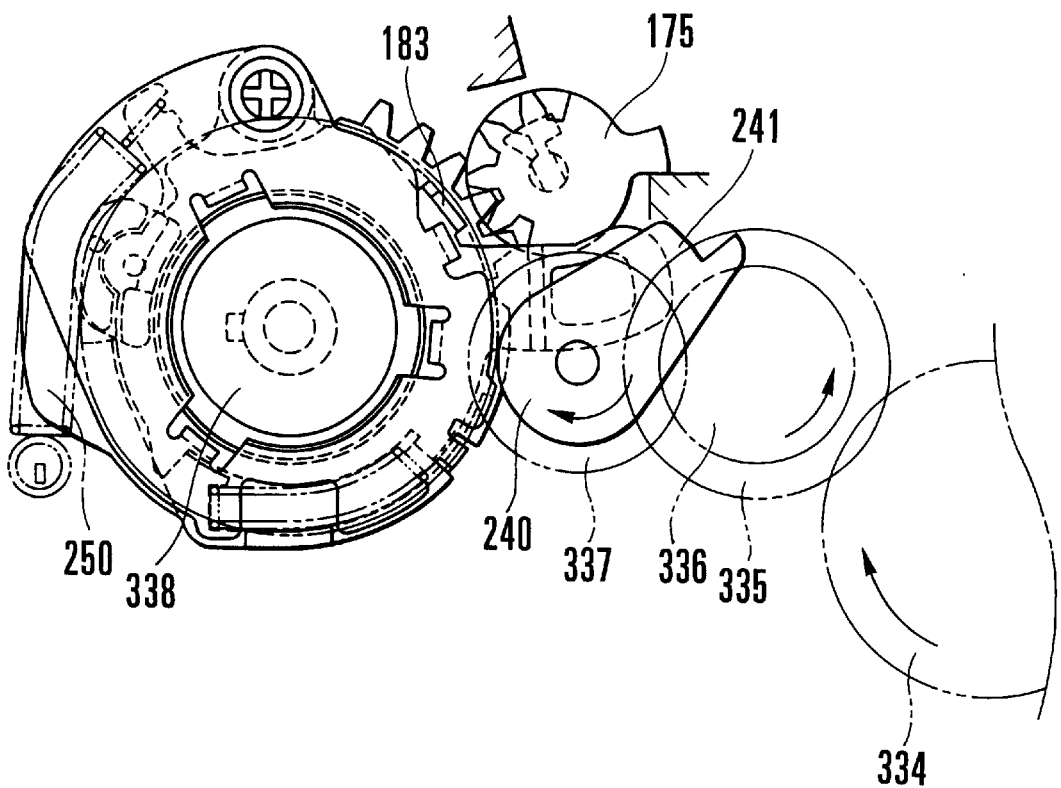
Figure 25:
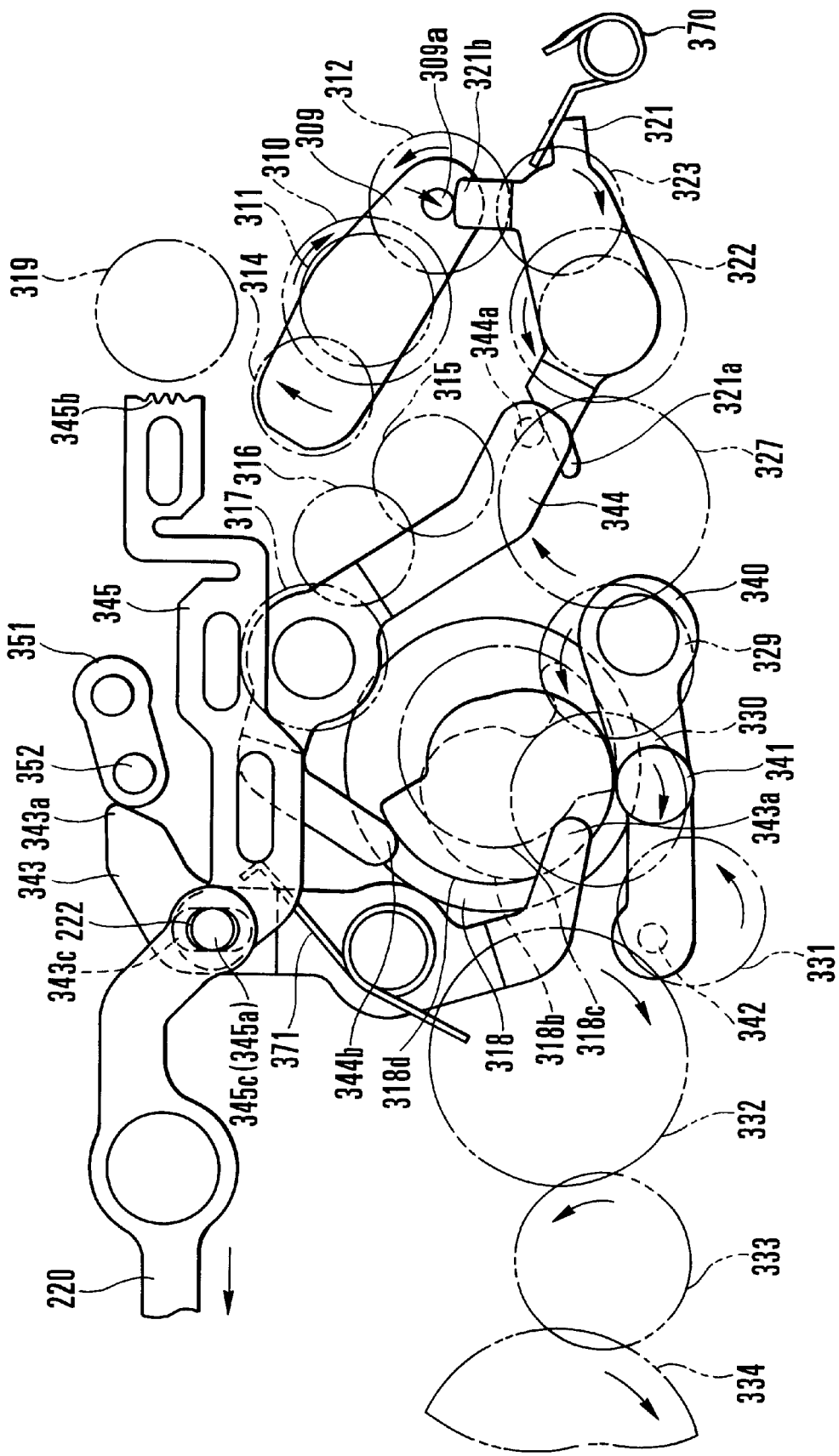
FIG. 25 is a plan view showing the state of operation of each member connected to the driving transmission system shown in FIGS. 24(a) and 24(b) during the reverse operation of the motor.
Figure 26A:
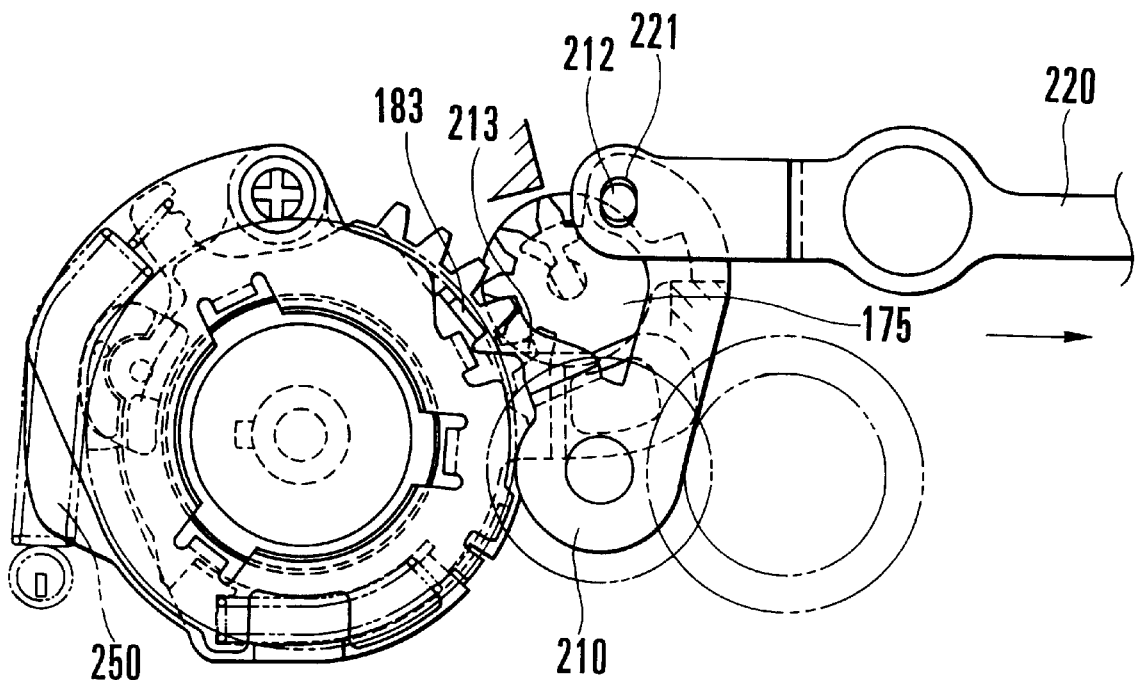
FIGS. 26(a) and 26(b) are plan views showing the state of operation of each member when the motor is reversed further from the state shown in FIGS. 24(a), 24(b) and 25.
Figure 26B:
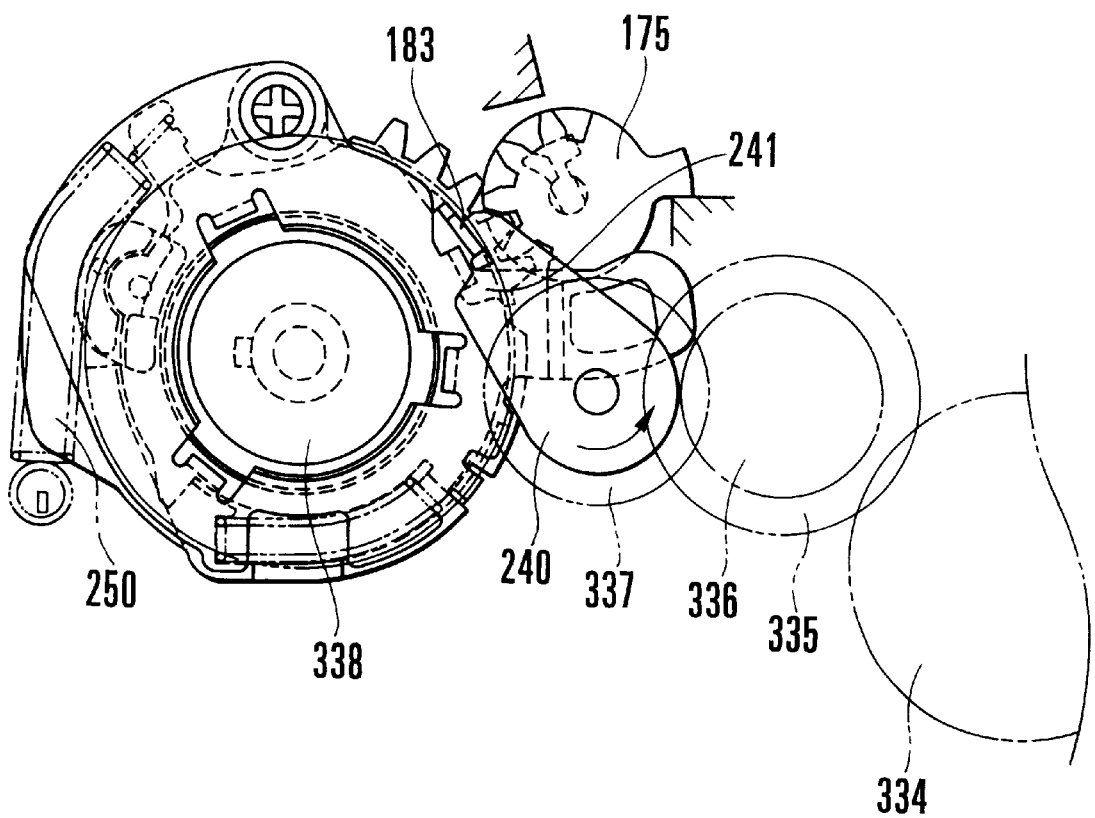
Figure 27:
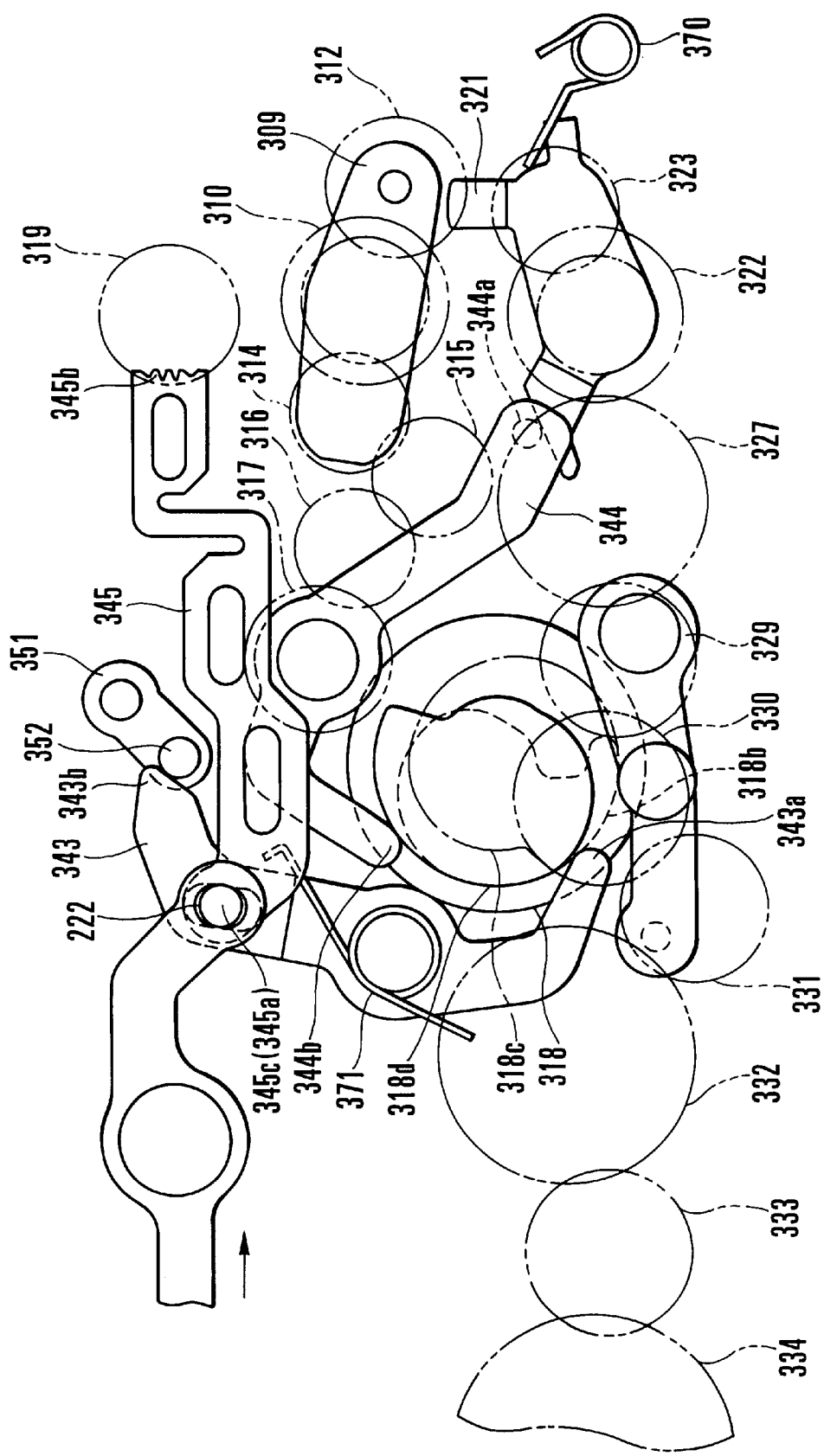
FIG. 27 is a plan view showing the state of operation of each member connected to the driving transmission system shown in FIGS. 26(a) and 26(b) during the reverse operation of the motor.

As is apparent from FIG. 14, the members shown in FIGS. 20(b) and 21, the members shown in FIGS. 22(b) and 23, the members shown in FIGS. 24(b) and 25, and the members shown in FIGS. 26(b) and 27 constitute a series of connected members, but are separately shown in two figures for the sake of clarifying the movements of the respective members and the like. In FIGS. 21, 23, 25 and 27, gears are respectively shown by two-dot chain lines, and the other members are respectively shown by solid lines. Each of FIGS. 20(a), 22(a), 24(a) and 26(a) is a plan view taken at a position which differs from the corresponding one of FIGS. 20(b), 22(b), 24(b) and 26(b) as viewed in the direction perpendicular to the sheet surface of each of the figures.

In these figures, reference numeral 370 denotes a return spring for urging the rewinding planetary arm 321 in the clockwise direction, and reference numeral 371 denotes a driving-lever return spring for urging the driving lever 343 in the counterclockwise direction.

FIGS. 20(a), 20(b) and 21 are views showing the state of performing shutter charging, mirror driving and phase changeover. When the motor 307 shown in FIG. 14 is rotated clockwise, the pinion gear 308 also rotates clockwise, and the sun gears 310 and 311, which mesh with the pinion gear 308 as a double gear, rotate counterclockwise as shown in FIG. 21 and the planetary arm 309 rotates counterclockwise accordingly. The planetary gear 314 meshes with the cam transmission gear 315 and the rotation of the planetary gear 314 is transmitted to the cam gear 318 via the cam transmission gears 315, 316 and 317, so that the cam gear 318 rotates clockwise. During this time, the planetary gear 312 is located at a neutral position where it meshes with nothing.

With the rotation of the cam gear 318, the charging lever 340, the rewinding lever 344 and the driving lever 343 turn in accordance with the charging cam 318b, the rewinding cam 318d and the driving cam 318c, respectively. This operation is performed when the film cartridge 100 is loaded, in order to rotate the bar code disk of the film cartridge 100 and read film information and the like.

When the cam gear 318 is made to rotate clockwise by the clockwise rotation of the motor 307, the charging lever 340 turns in the direction in which the aforesaid shutter charging and mirror driving are performed as described previously with reference to FIGS. 18(a), 18(b) and 19(a), 19(b), and the rewinding lever 344 and the driving lever 343 perform operations which will be described later.

FIGS. 22(a), 22(b) and 23 are views showing the state of the thrust operation of performing film winding and feeding the film 302 from the film cartridge 100.

When the motor 307 rotates clockwise to a further extent in the state of FIGS. 20(a), 20(b) and 21 the clockwise rotation of the cam gear 318 continues, the film winding phase is detected through the phase contact piece 318e and the phase circuit board 346, and the rotation of the motor 307 is stopped. FIGS. 22(a), 22(b) and 23 show this state.

In the shown state for film transportation, the charging roller 341 is located at the cam top of the charging cam 318b, and the charging lever 340 is placed in its shutter-charging completion state and its mirror-down state. The driving lever 343 is urged counterclockwise by the driving-lever return spring 371, and one end 343a of the driving lever 343 is positioned in abutment with the cam bottom of the driving cam 318c. A projection 345a which is formed at one end of the winding stopping lever 345 connected to the driving lever 343 is engaged with a slot 343c of the driving lever 343, and the toothed portion 345b formed at the other end of the winding stopping lever 345 is located at a position where it is not engaged with the spool driving gear 319 which meshes with the spool gear 306 of the take-up spool 305 of the camera body 1. The retracting lever pin 352 for retracting the magnetic head 347 and its associated parts is not in contact with one end 343b of the driving lever 343, so that the retracting lever 351 is located at the first position shown in FIG. 14 by being rotated clockwise as viewed in FIG. 21 by a return spring (not shown). Accordingly, the magnetic head 347 is pressed against the pad 357 and the engagement claw 356 shown in FIG. 14 is located at a position where it is disengaged from the perforation 303. In other words, the winding of the film 302 is possible.

During this time, the lock driving lever 220 slides toward the left because the shaft portion 345c, which is formed coaxially with the projection 345a on the reverse side (the obverse surface of the sheet of FIG. 21) of the winding stopping lever 345 connected to the driving lever 343, is engaged with a slot 222 which is formed at one end of the lock driving lever 220. The other end of the lock driving lever 220 has a slot 221 which is engaged with the driving pin 212 provided at the driving arm 214 of the first lock lever 210 shown in FIG. 22(a), and as the lock driving lever 220 slides toward the left, the first lock lever 210 rotates counterclockwise and the first lock claw 213 enters the rotational locus of the controller lock claw 183 of the controller 180 and inhibits the clockwise rotation of the controller 180. In other words, even if the user pulls up the opening/closing knob 50 and attempts to rotate the cartridge chamber lid opening/closing shaft 30 in the opening direction of the cartridge chamber lid 10 to open the cartridge chamber lid 10 while the film 302 is being transported from the film cartridge 100 loaded in the camera body 1, the rotational operation of the connecting lever 120 which interlocks with the controller 180 is also inhibited, and the connecting lever 120 is inhibited from sliding in the direction in which the connecting lever 120 releases the engagement of the cartridge chamber lid engagement lever 80 shown in FIG. 3 (toward the right as viewed in FIGS. 8(a) to 11(a)). Accordingly, the connecting lever 120 is not allowed to release the engagement between the cartridge chamber lid engagement lever 80 and the engagement arm 111 of the lever holding plate 110 and inhibits the rotation of the cartridge chamber lid opening/closing shaft 30, thereby inhibiting the opening operation of the cartridge chamber lid 10.

Referring to FIG. 21, the rewinding planetary arm 321 is urged clockwise by the return spring 370 and is located at a retracted position where the rewinding planetary gear 323 and the planetary gear 312 do not mesh with each other. Then, when the cam gear 318 rotates clockwise from the state of FIG. 21, as the rewinding cam 318d turns from the cam top to the cam bottom, a pin 344a of the rewinding lever 344 is pressed by a lever portion 321a of the rewinding planetary arm 321 so that the rewinding lever 344 is rotated counterclockwise. Thus, the rewinding lever 344 is placed into a retracted position where its one end 344b is in abutment with the cam bottom of the rewinding cam 318d.

After the shown mechanism proceeds from the state shown in FIG. 21 to the state shown in FIG. 23 and the rotation of the motor 307 is stopped, if the clockwise rotation of the motor 307 is reversed to cause the motor 307 to rotate counterclockwise, the pinion gear 308 also rotates counterclockwise. By the counterclockwise rotation of the pinion gear 308, the sun gears 310 and 311, which mesh with the pinion gear 308 as a double gear, rotate clockwise.

Thus, the planetary arm 309 rotates clockwise, and the planetary gear 314 meshes with the spool driving gear 319 which is present on the revolution locus of the planetary gear 314. The rotation of the planetary gear 314 is transmitted to the spool gear 306 shown in FIG. 14 via the spool driving gears 319 and 320, and the take-up spool 305 is rotated in the counterclockwise winding direction as viewed from the top portion of the sheet of FIG. 14.

In addition, the other planetary gear 312 secured to the planetary arm 309 meshes with the transmission gear 324 shown in FIG. 14, and the rotation of the planetary gear 312 is transmitted to the clutch gear 328 via the transmission gears 324, 325 and 326. Since the clutch gear 328 rotates clockwise, the clutch spring 328a is tightly wound (refer to FIG. 17) and the rotation of the clutch gear 328 is transmitted to the clutch gear 329. The rotation is further transmitted to the fork gear 338 via the clutch gear 329 and the transmission gears 330, 331, 332, 333, 334, 335, 336 and 337 all of which are shown in FIGS. 14, 23 and 22(b), so that the fork key 339 rotates in the counterclockwise film feeding direction (counterclockwise as viewed from the top portion of the sheet of FIG. 14. Thus, the key groove 902b formed in the supply spool 902 of the film cartridge 100 engages with the fork key 339 and rotates in the film feeding direction, so that the film 302 is fed out from the film cartridge 100 as shown in FIG. 14. When the leading end of the film 302 reaches the take-up spool 305, the film 302 is wound around the take-up spool 305 by a known automatic loading mechanism (not shown). In this case, the relationship between a velocity V1 at which the film 302 is fed out from the film cartridge 100 and a velocity V2 at which the film 302 is wound around the take-up spool 305 is selected to be V2>V1. Accordingly, when the film 302 is wound around the take-up spool 305, since the rotational speed of the clutch gear 329 is faster than that of the clutch gear 328, the clutch spring 328a becomes loose and a slip takes place between the clutch gears 328 and 329, so that the clutch gears 328 and 329 are disengaged.

During this time, as shown in FIG. 22(b), as the transmission gear 337 rotates counterclockwise, the second lock lever 240 is rotated counterclockwise by the friction force of the friction spring 245 and the second lock claw 241 enters the rotational locus of the controller lock claw 183 of the controller 180 and inhibits the clockwise rotation of the controller 180. In other words, even if the user pulls up the opening/closing knob 50 and attempts to rotate the cartridge chamber lid opening/closing shaft 30 in the opening direction of the cartridge chamber lid 10 to open the cartridge chamber lid 10 while the film 302 is being transported from the film cartridge 100 loaded in the camera body 1, the rotational operation of the connecting lever 120 which interlocks with the controller 180 is also inhibited, and the connecting lever 120 is inhibited from sliding in the direction in which the connecting lever 120 releases the engagement of the cartridge chamber lid engagement lever 80 (toward the right as viewed in FIGS. 8(a) to 11(a)). Accordingly, the connecting lever 120 is not allowed to release the engagement between the cartridge chamber lid engagement lever 80 and the engagement arm 111 of the lever holding plate 110 and inhibits the rotation of the cartridge chamber lid opening/closing shaft 30, thereby inhibiting the opening operation of the cartridge chamber lid 10.

In this manner, when the film 302 is being transported with the film cartridge 100 being loaded in the camera body 1, two lock mechanisms, i.e., the first lock lever 210 and the second lock lever 240, can be operated to reliably inhibit the cartridge chamber lid 10 from being opened with the film 302 being transported.

FIGS. 24(a), 24(b) and 25 are views showing the state of performing rewinding.

The state shown in FIGS. 24(a), 24(b) and 25 is such that the cam gear 318 is rotated clockwise from the state of FIGS. 20(a), 20(b) and 21 and the film rewinding phase is detected through the phase contact piece 318e and the phase circuit board 346 so that the motor 307 is stopped.

The charging roller 341 of the charging lever 340 is located at the cam top of the charging cam 318b, and the shutter charging operation and the mirror-down operation are completed. The driving lever 343 is urged counterclockwise by the driving-lever return spring 371, and the end 343a of the driving lever 343 is positioned in abutment with the cam bottom of the driving cam 318c. In this state, the projection 345a of the winding stopping lever 345 connected to the driving lever 343 is engaged with the slot 343c of the driving lever 343, and the toothed portion 345b is positioned out of engagement with the spool driving gear 319. The retracting lever pin 352 is not in contact with the end 343b of the driving lever 343, so that the retracting lever 351 is located at the first position shown in FIG. 14 by being rotated clockwise from the position shown in FIGS. 20(a) and 20(b) by the return spring (not shown). Accordingly, the magnetic head 347 is pressed against the pad 357 by a pressure spring (not shown) and the engagement claw 356 is located at the position where it is disengaged from the perforation 303.

During this time, the lock driving lever 220 slides toward the left because the shaft portion 345c, which is formed coaxially with the projection 345a on the reverse side (the obverse surface of the sheet of FIG. 25) of the winding stopping lever 345 connected to the driving lever 343, is engaged with the slot 222 which is formed at one end of the lock driving lever 220. The other end of the lock driving lever 220 has the slot 221 which is engaged with the driving pin 212 provided at the driving arm 214 of the first lock lever 210, and as the lock driving lever 220 slides toward the left, the first lock lever 210 rotates counterclockwise and the first lock claw 213 enters the rotational locus of the controller lock claw 183 of the controller 180 and inhibits the clockwise rotation of the controller 180.

In other words, as described previously in connection with the state in which the film 302 is being transported, even if the user pulls up the opening/closing knob 50 and attempts to rotate the cartridge chamber lid opening/closing shaft 30 in the opening direction of the cartridge chamber lid 10 to open the cartridge chamber lid 10 while the film 302 is being rewound into the film cartridge 100 loaded in the camera body 1, the rotational operation of the connecting lever 120 which interlocks with the controller 180 is also inhibited, and the connecting lever 120 is inhibited from sliding in the direction in which the connecting lever 120 releases the engagement of the cartridge chamber lid engagement lever 80 (toward the right as viewed in FIGS. 8(a) to 11(a)). Accordingly, the connecting lever 120 is not allowed to release the engagement between the cartridge chamber lid engagement lever 80 and the engagement arm 111 of the lever holding plate 110 and inhibits the rotation of the cartridge chamber lid opening/closing shaft 30, thereby inhibiting the opening operation of the cartridge chamber lid 10.

The end 344b of the rewinding lever 344 is pressed by the rewinding cam 318d, so that the rewinding lever 344 is rotated clockwise and the end 344b is positioned at the cam top of the rewinding cam 318d. The pin 344a provided on the rewinding lever 344 presses the lever portion 321a of the rewinding planetary arm 321 to rotate the rewinding planetary arm 321 counterclockwise against the force of the return spring 370. Thus, the rewinding planetary arm 321 is located at a rewinding position. When the motor 307 is rotated counterclockwise, the pinion gear 308 also rotates counterclockwise and the sun gears 310 and 311, which mesh with the pinion gear 308 as a double gear, rotate clockwise. Thus, the planetary arm 309 shown in FIG. 25 rotates clockwise, and the pin 309a provided on the planetary arm 309 and the stopper portion 321b provided on the rewinding planetary arm 321 come into abutment with each other, so that the planetary gear 312 and the rewinding planetary gear 323 mesh with each other with a correct axis-to-axis distance retained therebetween. In this state, the rotation is transmitted from the rewinding planetary gear 323 to the fork gear 338 through the sun gear 322, the transmission gear 327, the one-way clutch gear 329 and the transmission gears 330, 331, 332, 333, 334, 335, 336 and 337, so that the fork key 339 rotates in the counterclockwise film rewinding direction (as viewed from the top portion of the sheet of FIG. 14).

During this time, since the spool driving gear 319 does not mesh with the planetary gear 314, the take-up spool 305 rotates with a small load. The key groove 902b provided on the supply spool 902 is engaged with the fork key 339, and the film 302 is rewound into the film cartridge 100 by the rotation of the film spool in the film rewinding direction.

During this time, as the transmission gear 337 shown in FIG. 24(b) rotates clockwise, the second lock lever 240 is rotated clockwise by the friction force of the friction spring 245, and the second lock claw 241 rotationally moves out of the rotational locus of the controller lock claw 183 of the controller 180, so that the second lock claw 241 comes to a stop and is retained at a position where the second lock claw 241 does not inhibit the clockwise rotation of the controller lock claw 183 of the controller 180. Although the rotation of the controller 180 becomes unable to be inhibited, the rotational operation of the controller 180 is inhibited by the first lock lever 210 as described previously, and even if the user attempts to open the cartridge chamber lid 10, the rotational operation of the connecting lever 120 which interlocks with the controller 180 is also inhibited and the connecting lever 120 is inhibited from sliding in the direction in which the connecting lever 120 releases the engagement of the cartridge chamber lid engagement lever 80 (toward the right as viewed in FIGS. 8(a) to 11(a)). Accordingly, the connecting lever 120 is not allowed to release the engagement between the cartridge chamber lid engagement lever 80 and the engagement arm 111 of the lever holding plate 110 and inhibits the rotation of the cartridge chamber lid opening/closing shaft 30, thereby inhibiting the opening operation of the cartridge chamber lid 10.

FIGS. 26(a), 26(b) and 27 show a standby state in which the film 302 is fed out of the loaded film cartridge 100 and preparation for photography is completed.

The state shown in FIGS. 26(a), 26(b) and 27 is such that the cam gear 318 is rotated clockwise from the state of FIGS. 20(a), 20(b) and 21 and the standby phase is detected through the phase contact piece 318e and the phase circuit board 346 so that the motor 307 is stopped. The charging lever 340 is placed in the shutter-charging completion state and the mirror-down state similar to those shown in FIG. 21 described previously. The rewinding lever 344 and the rewinding planetary arm 321 are placed in the rewinding state similar to that shown in FIG. 25 described previously. The driving lever 343 is rotated clockwise by the end 343a being pressed by the driving cam 318c, and the end 343a is located at the cam top position of the driving cam 318c. The projection 345a of the winding stopping lever 345 connected to the driving lever 343 is engaged with the slot 343c of the driving lever 343 and is pressed toward the right, so that the toothed portion 345b is positioned in engagement with the spool driving gear 319. A bent portion 345c of the winding stopping lever 345 has elasticity and plays the role of absorbing a stroke when the teeth of the toothed portion 345b strike the teeth of the spool driving gear 319, so that an excessive force is prevented from acting on the toothed portion 345b and the spool driving gear 319. Since the spool driving gear 319 is engaged by the toothed portion 345b, even if a vibration is applied to the take-up spool 305, the take-up spool 305 does not move and the film 302 does not travel in the film rewinding direction.

The end 343b of the driving lever 343 presses the retracting lever pin 352, so that the retracting lever 351 rotates clockwise as viewed from the top portion of the sheet of FIG. 14 (counterclockwise as viewed in FIG. 27). Accordingly, the head retracting cam 354 is rotated by the connecting shaft 350 in the clockwise direction as viewed from the top portion of the sheet of FIG. 14, and the head retracting cam 354 comes into abutment with the abutment portion 348a of the head holder 348. The head retracting cam 354 presses the abutment portion 348a, so that the magnetic head 347 is retracted against the pressure spring (not shown) to a second position where the magnetic head 347 is out of contact with the film 302. Incidentally, even if photography is performed during this state, the problem of impairing the flatness of the film 302 does not occur, because the magnetic head 347 is not in contact with the film 302.

Since the above-described state is set as the standby state, the magnetic head 347 is prevented from being in contact with the film 302 for a long time, so that it is possible to prevent occurrence of the problem that the film 302 sticks to the magnetic head 347.

Figure 28:
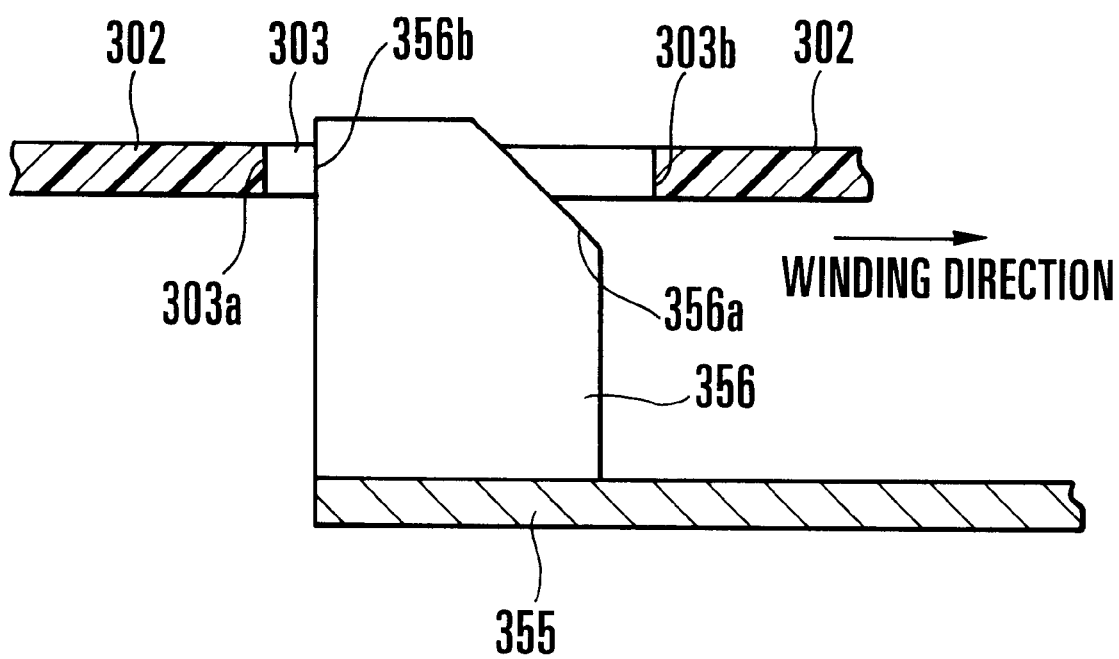
FIG. 28 is a view showing the state of engagement between a perforation and the engagement claw shown in FIG. 14.

In the meantime, the engagement cam 353 is released from the abutment with the leaf spring 355 by being rotated by the connecting shaft 350 in the clockwise direction as viewed from the top portion of the sheet of FIG. 14. Accordingly, the engagement claw 356 is inserted into the perforation 303 by the leaf spring 355 and engages the film 302. FIG. 28 is a cross-sectional view, taken from the top portion of the sheet of FIG. 14, showing the state in which the film 302 is engaged by the engagement claw 356.

The engagement claw 356 is inserted into the perforation 303 of the film 302 to engage the film 302. As shown in FIG. 28, the engagement claw 356 has an engagement portion 356b on the side of the film cartridge 100 so that the engagement portion 356b can engage the film 302. In addition, the engagement claw 356 has an inclined surface 356a on the side of the take-up spool 305 so as not to engage the film 302. Accordingly, if the film 302 travels in the film winding direction, i.e., toward the right as viewed in FIG. 28, by the application of a vibration, the engagement portion 356b of the engagement claw 356 comes into abutment with one side 303a of the perforation 303, so that the film 302 is prevented from travelling in the film winding direction.

During this time, the lock driving lever 220 slides toward the right because the shaft portion 345c, which is formed coaxially with the projection 345a on the reverse side (the obverse surface of the sheet of FIG. 27) of the winding stopping lever 345 connected to the driving lever 343, is engaged with the slot 222 which is formed at one end of the lock driving lever 220. The other end of the lock driving lever 220 has the slot 222 which is engaged with the driving pin 212 provided at the driving arm 214 of the first lock lever 210, and as the lock driving lever 220 slides toward the right, the first lock lever 210 rotates clockwise and the first lock claw 213 retracts from the rotational locus of the controller lock claw 183 of the controller 180 and enables the rotation of the controller 180. However, as described previously with reference to FIGS. 24(a), 24(b) and 25, while the film 302 is being wound, the transmission gear 337 rotates clockwise and the second lock lever 240 is rotated counterclockwise by the friction force of the friction spring 245, and the second lock claw 241 rotationally moves into the rotational locus of the controller lock claw 183 of the controller 180, so that the second lock claw 241 comes to a stop and is retained at a position where the second lock claw 241 inhibits the rotation of the controller lock claw 183 of the controller 180. Accordingly, by further holding the second lock claw 241 in the state shown in FIGS. 26(a), 26(b) and 27, it becomes possible to inhibit the rotation of the controller 180 and it becomes possible to inhibit accidental opening of the cartridge chamber lid 10 as described previously.

It is to be noted that, during the state shown in FIGS. 24(a), 24(b) and 25, if the cam gear 318 is rotated clockwise without stopping the motor 307, the driving transmission system passes through the film rewinding phase and can be set to the standby state shown in FIGS. 26(a), 26(b) and 27.

The engagement cam 353, the head retracting cam 354 and the retracting lever 351 of the connecting shaft 350 as well as the winding stopping lever 345 are arranged so that, during the changeover from the state of FIGS. 24(a), 24(b) and 25 to the state of FIGS. 26(a), 26(b) and 27, operations (i), (ii) and (iii) can be performed in the following order:

(i) the toothed portion 345b of the winding stopping lever 345 engages the spool driving gear 319;

(ii) the engagement claw 356 engages the film 302; and (iii) the magnetic head 347 is retracted.

This arrangement provides the following effects.

(a) If the driving transmission system is in a phase in which a projecting portion of the toothed portion 345b of the winding stopping lever 345 and a tooth edge of the spool driving gear 319 are opposed to each other, the projecting portion of the toothed portion 345b may come into abutment with the tooth edge of the spool driving gear 319 and cause the spool driving gear 319 to rotate by one tooth, so that the film 302 may travel. In this case, if the engagement claw 356 engages the film 302, an unnecessary force will be applied to the film 302. This problem can be prevented by the above arrangement.

(b) The operation of the driving transmission system can be guaranteed so that the retracted state of the magnetic head 347 and the disengaged state of each of the winding stopping lever 345 and the engagement claw 356 do not occur at the same time, whereby even if the camera becomes inoperative by the consumption of battery power or the like, a moving force can be surely applied to the film 302 and the film 302 can be prevented from becoming free to travel by the application of a vibration or the like.

FIGS. 29(a) to 29(d) are views showing the positional relationship between the perforation 303 of the film 302 and the engagement claw 356 with respect to the film feeding direction. It is assumed here that, during winding, the film 302 travels from the left to the right as viewed in FIGS. 29(a) to 29(d) (in the direction indicated by the shown arrow).

Figure 29A:
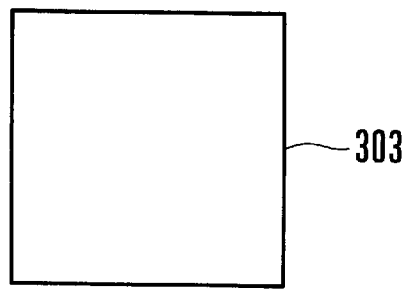
FIGS. 29(a) to 29(d) are views showing the positional relation between the perforation and the engagement claw shown in FIG. 14.
Figure 29B:
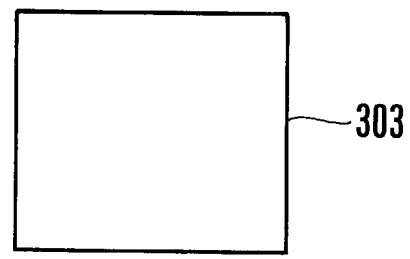

The state shown in FIG. 29(a) corresponds to the case in which when the motor 307 is stopped, the film 302 stops without overrunning, and the perforation 303 is located on the leftmost side, as viewed in FIGS. 29(a) to 29(d). The state shown in FIG. 29(b) corresponds to the case in which when the motor 307 is stopped, the film 302 stops after overrunning to the greatest extent. Accordingly, the perforation 303 is located within a range Δ1, depending on a variation in the stop position of the film 302. The state shown in FIG. 29(c) corresponds to the case in which the perforation 303 is located on the rightmost side which is allowable in terms of the positional relationship between the perforation 303 and each photographed picture. In this case, if the film 302 travels from the state of FIG. 29(c) toward the right by the application of a vibration or the like, a problem will occur, such as an overlap between the pictures of adjacent frames.

From the above description, it is apparent that if the perforation 303 is located within a range Δ2, such problem can be solved.

Figure 29C:
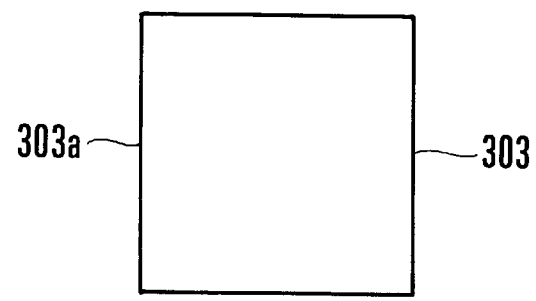
Figure 29D:
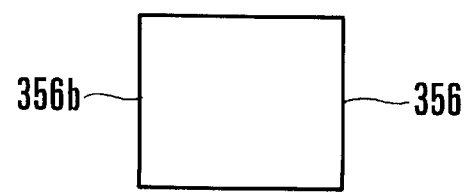

FIG. 29(d) is a view showing the position of the engagement claw 356, and the engagement portion 356b of the engagement claw 356 is located at the same position as the left end face 303a of the perforation 303 in the state shown in FIG. 29(c).

Figure 30A:
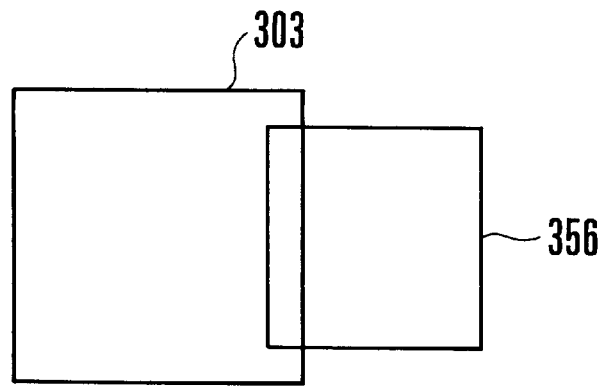
FIGS. 30(a) to 30(c) are views showing the positional relation between the perforation and the engagement claw shown in FIG. 14.
Figure 30B:
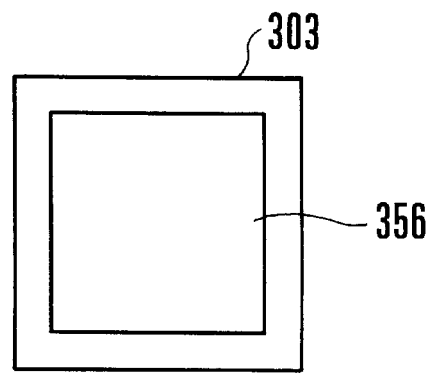
Figure 30C:
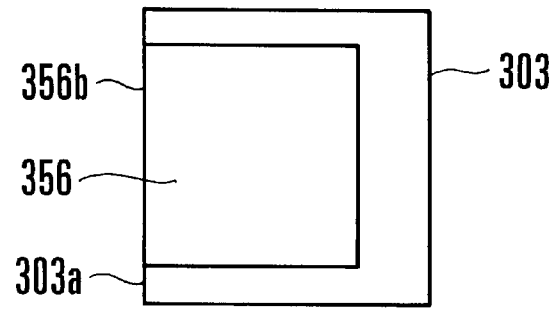

FIGS. 30(a) to 30(c) are views showing the state in which the engagement claw 356 is inserted into the perforation 303 after the film 302 is stopped. The respective positions of the perforation 303 in the states shown in FIGS. 30(a), 30(b) and 30(c) are the same as those of the perforation 303 in the states shown in FIGS. 29(a), 29(b) and 29(c).

In the case of the state shown in FIG. 30(a), a portion of the engagement claw 356 is superposed on the perforation 303, and the remaining portion of the engagement claw 356 is superposed on the film 302. In the case of the state shown in FIG. 30(b), the engagement claw 356 is completely inserted in the perforation 303. Neither of the states shown in FIGS. 30(a) and 30(b) has a problem because the perforation 303 is located within the range Δ2, as described above with reference to FIGS. 29(a) to 29(d).

In the case of each of the states shown in FIGS. 30(a) and 30(b) or in the case of an intermediate state between the states shown in FIGS. 30(a) and 30(b), if a vibration is applied to the camera, the film 302 travels not in the film rewinding direction but in the film winding direction, i.e., toward the right as viewed in FIGS. 30(a) to 30(c), because the take-up spool 305 is engaged. Then, the engagement portion 356b of the engagement claw 356 and the side 303a of the perforation 303 come into abutment with each other, so that the film 302 travels no further toward the right. This state is the state shown in FIG. 30(c).

Incidentally, the state shown in FIG. 30(c) has no problem since the perforation 303 is located within the range Δ2, as described above with reference to FIGS. 29(a) to 29(d). In the above-described manner, the engagement of the winding stopping lever 345 with the spool driving gear 319 and the engagement of the engagement claw 356 with the perforation 303 make it possible to prevent the film 302 from travelling in either of the film winding and rewinding directions by the application of a vibration.

Figure 31:
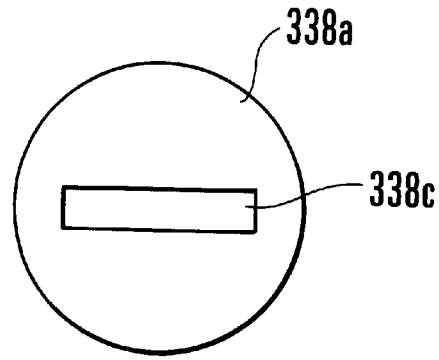
FIG. 31 is a bottom view of the fork gear shown in FIG. 14.

FIG. 31 is a view showing the fork gear 338 as viewed from below in FIG. 14. A key groove 338c is formed in the cap 338a fixed to the fork gear 338.

If the camera becomes inoperative by the consumption of a power-source battery or the like, the user inserts a key into the key groove 338c and rotates the fork gear 338, thereby manually rewinding the film 302. In this case, the film 302 travels from the right toward the left as viewed in FIGS. 20 to 27(a), 27(b). At this time, although another side 303b of the perforation 303 comes into abutment with the inclined surface 356a of the engagement claw 356, the leaf spring 355 is deformed by a force acting on the inclined surface 356a because the inclined surface 356a is inclined as shown in FIG. 28, so that the engagement claw 356 is retracted from the film 302 and the film 302 is rewound without being engaged by the engagement claw 356. In addition, since the bent portion 345c of the winding stopping lever 345 is deformed, the toothed portion 345b is released from the engagement with the spool driving gear 319, so that the rotation of the take-up spool 305 becomes possible. Incidentally, the strength of deformation of the bent portion 345c is set to the strength at which the toothed portion 345b is not released from the engagement with the spool driving gear 319 by the application of a vibration and, while the film 302 is being rewound by an external force, the toothed portion 345b is released from such engagement.

If the cam gear 318 is rotated clockwise from the state shown in FIGS. 26(a), 26(b) and 27, the charging roller 341 rotates clockwise in accordance with the charging cam 318b, so that the charging lever 340 performs the above-described mirror-up operation. During this time, the respective cam portions of the driving cam 318c and the rewinding cam 318d other than the charging cam 318b make steady rotations which do not turn the driving lever 343 and the rewinding lever 344, respectively. Both the driving lever 343 and the rewinding lever 344 travel while they are held in the state shown in FIG. 21, and when a mirror-up position is detected through the phase contact piece 318e and the phase circuit board 346 and the motor 307 is stopped, the driving transmission system is brought into the state shown in 20(a), 20(b) and 21.

Figure 32:
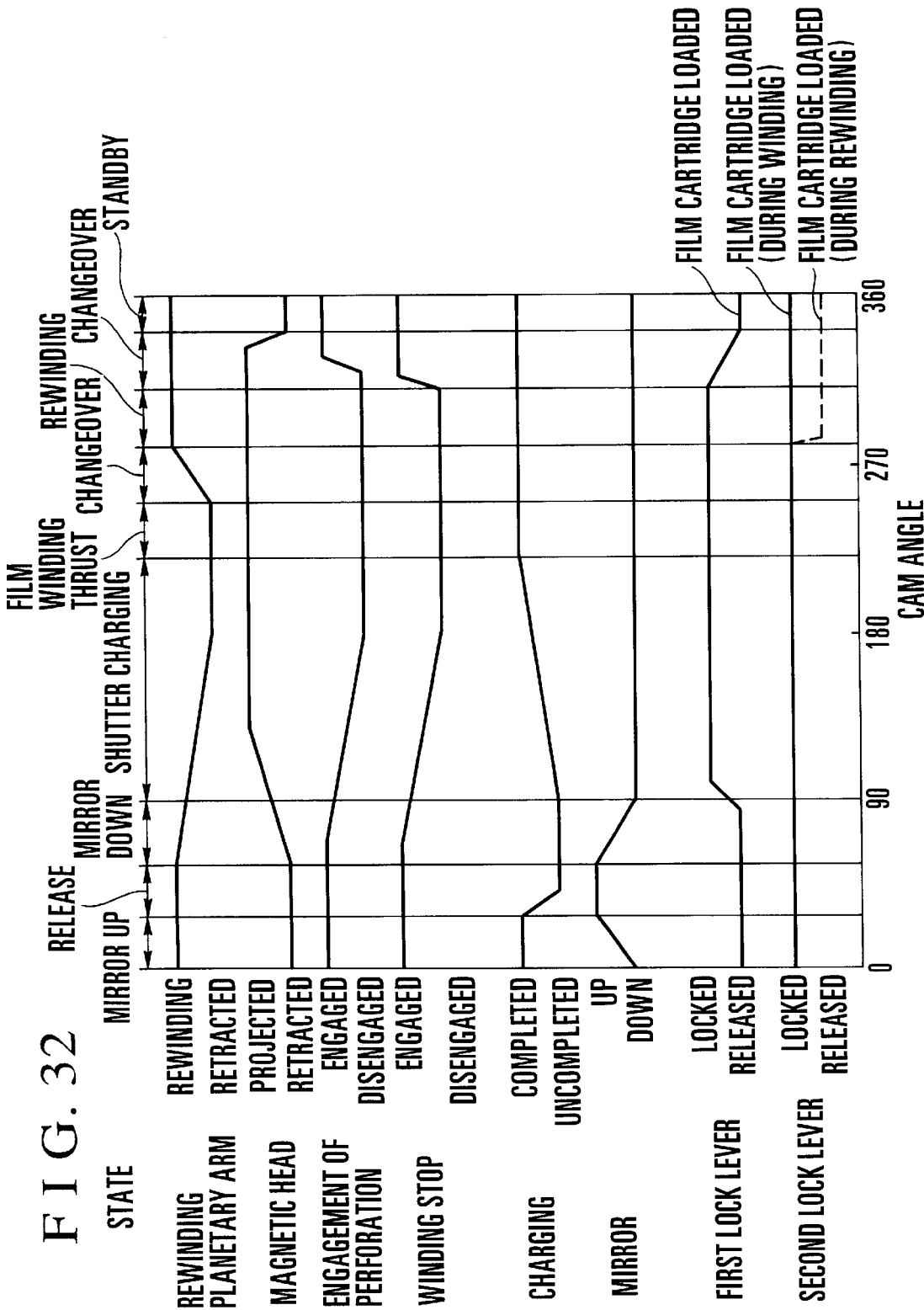
FIG. 32 is a graphic representation showing the operation of each cam of the cam gear shown in FIG. 16 and the operation of each part of the camera.

FIG. 32 is a graphic representation showing the above-described operation according to the cam diagram of FIG. 16.

Figure 33:
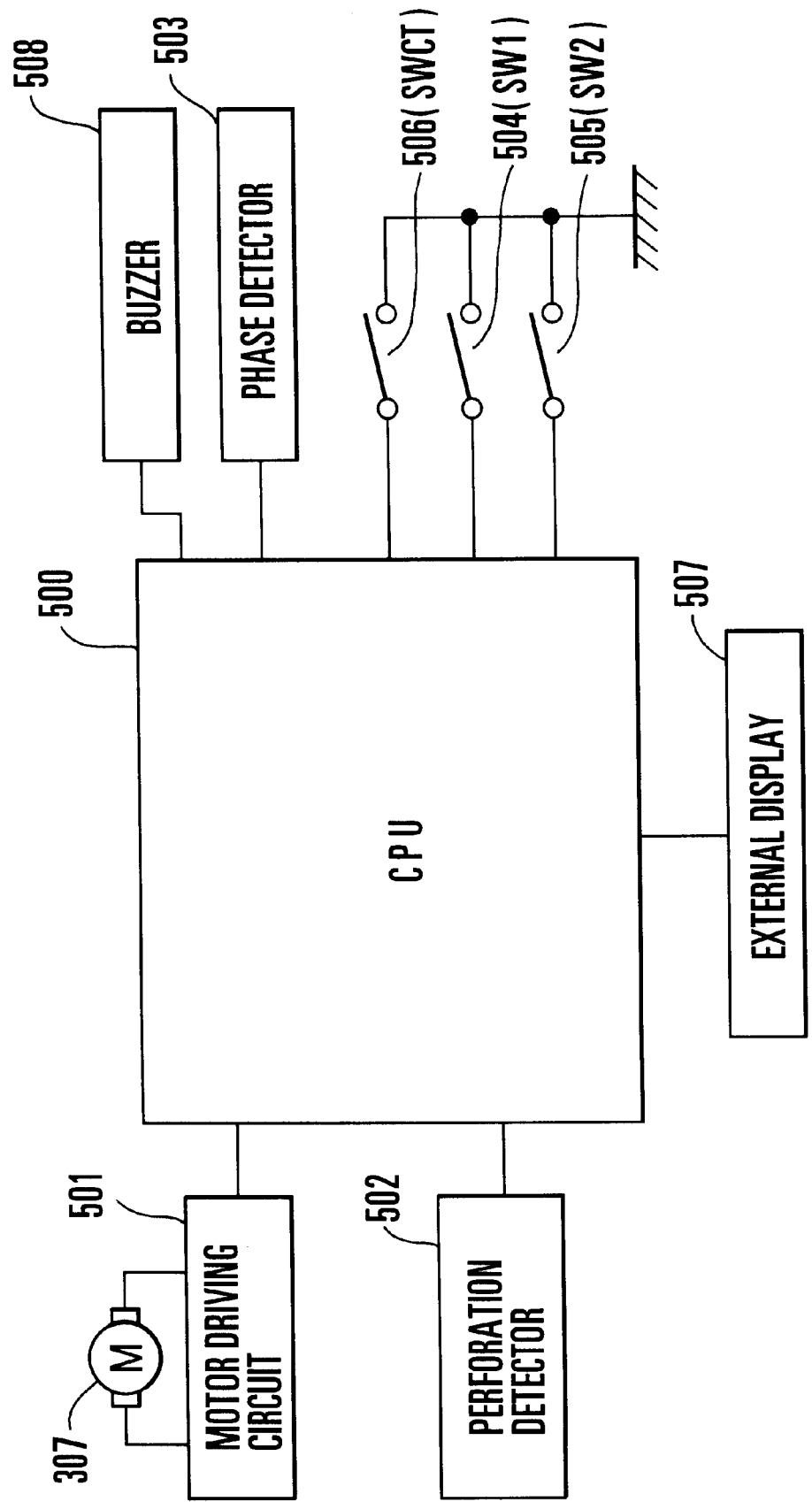
FIG. 33 is a block diagram showing the electrical arrangement of the essential portion of the camera according to the embodiment of the present invention.

FIG. 33 is a block diagram showing the essential portion of the electrical arrangement of the camera having the above-described mechanical construction.

The electrical arrangement shown in FIG. 33 includes a CPU 500 for executing various kinds of control of the camera, a motor driving circuit 501, and a perforation detector 502 for detecting the perforation 303 of the film 302. The perforation detector 502 includes the optical sensor 304. Incidentally, the film 302 accommodated in the film cartridge 100 to be loaded into the camera according to the present embodiment has two perforations 303 per frame as shown in FIG. 14, and if the perforation detector 502 detects two perforations 303, it indicates that the film 302 is advanced by one frame. The shown electrical arrangement also includes a phase detector 503 composed of the phase circuit board 346 and the phase contact piece 318e, and a switch (SW1) 504 which is turned on when the release button 2 is depressed to the first stroke position. If the switch (SW1) 504 is turned on, the camera starts light measurement in preparation for photography, and if the camera has an automatic focus detecting device, the camera activates the automatic focus detecting device and performs a focus detecting operation followed by a lens driving (focus adjusting) operation. When the release button 2 is depressed to the second stroke position, a switch (SW2) 505 is turned on, and the camera starts a photography starting sequence.

Figure 37:
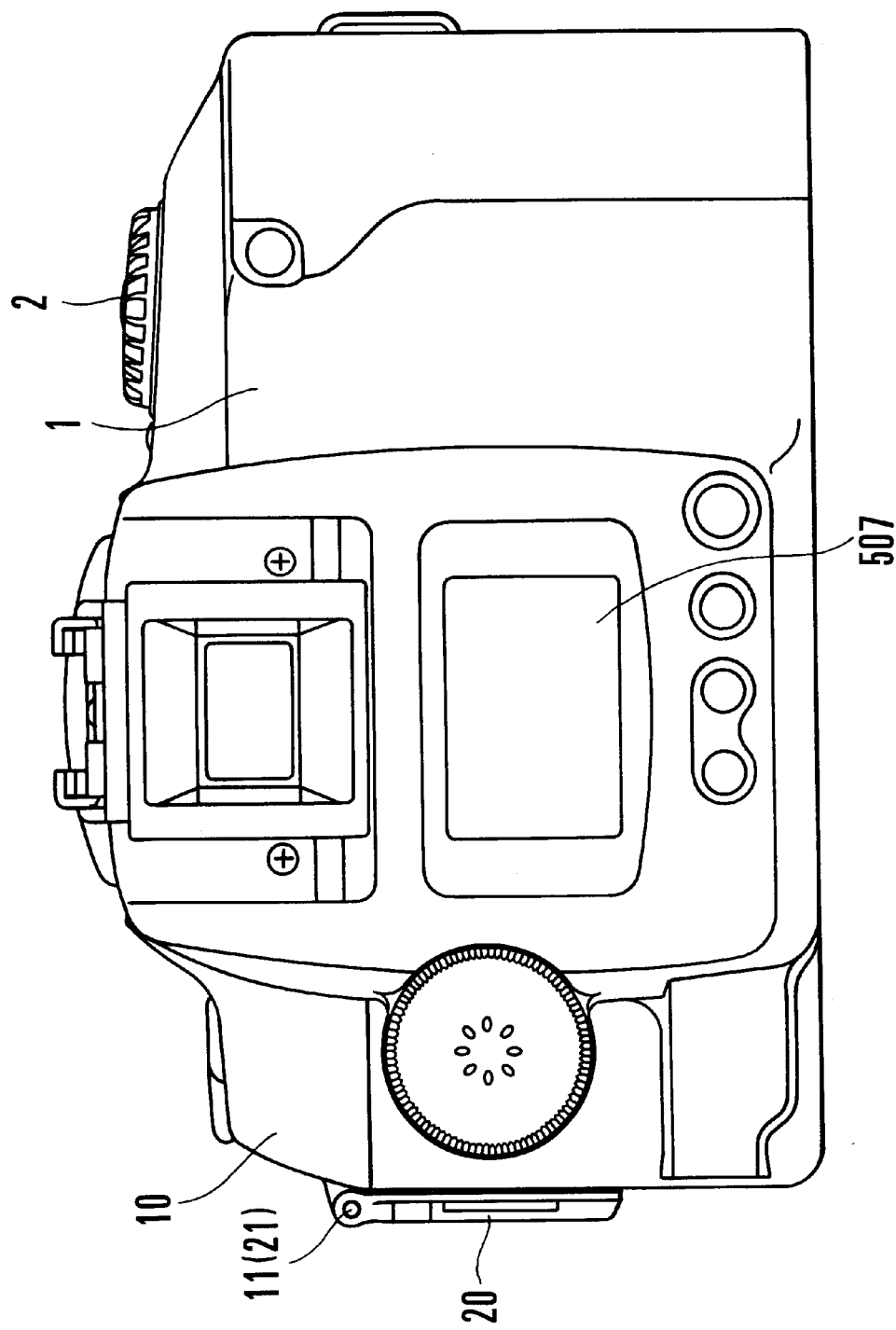
FIG. 37 is a back side view of the camera according to the embodiment of the present invention.

A cartridge chamber lid opening/closing detector 506 is provided for detecting whether the cartridge chamber lid 10 is opened or closed, and corresponds to a cartridge chamber lid opening/closing switch (SWCT) which includes the contact piece 174 fixed to the driver driving plate 170 and the switch patterns 162 and 163 formed on the printed circuit board 160. An external display 507 is provided on the back of the camera body 1 shown in FIG. 37, and displays various kinds of information such as photography information and setting information, or a warning when the CPU 500 determines that the user has performed an inappropriate manipulation. A buzzer 508 produces an in-focus sound for informing the user that the photographing lens is in focus, and or a warning sound when the CPU 500 determines that the user has performed an inappropriate manipulation.

Figure 34:
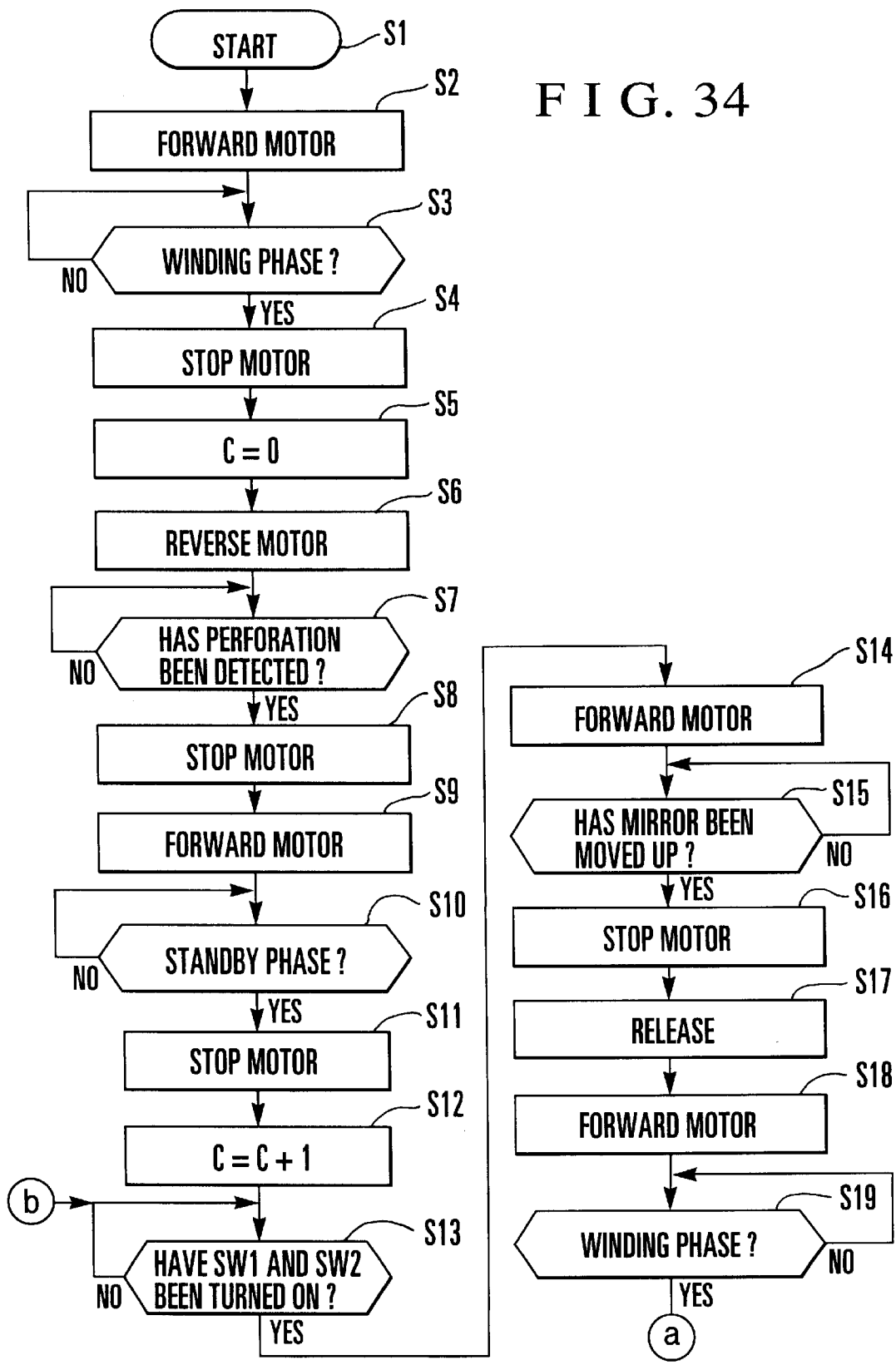
FIG. 34 is a flowchart showing part of the operation of the controlling microcomputer (CPU) shown in FIG. 33.
Figure 35:
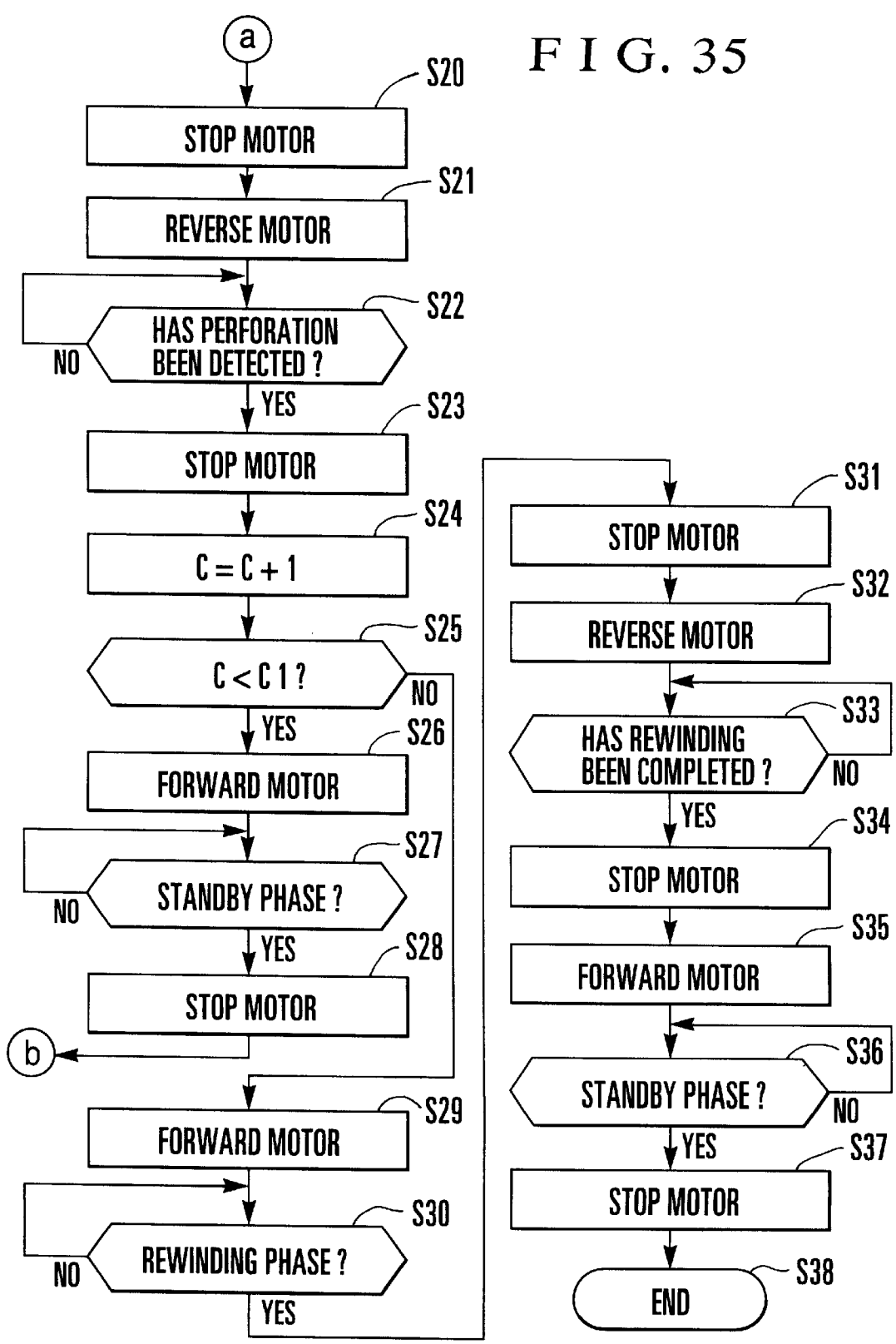
FIG. 35 is a flowchart showing a continuation of the operation shown in FIG. 34.

The operation of the CPU 500 will be described below with reference to the flowcharts shown in FIGS. 34 and 35. In the following description, the clockwise and counterclockwise rotations of the motor 307 as viewed from below in FIG. 14 will be referred to as "forward rotation" and "reverse rotation", respectively.

In Step S1, if the CPU 500 detects through the cartridge chamber lid opening/closing detector 506 that the cartridge chamber lid 10 has been closed, the CPU 500 determines that the film cartridge 100 has been correctly loaded, and advances the process to Step S2. Incidentally, at the point of time of Step S1, the driving transmission system normally is in the film rewinding phase. Then, in Step S2, the CPU 500 causes the motor driving circuit 501 to drive the motor 307 forward, and starts the operation of rotating the cam gear 318 to change over the driving transmission system from the film rewinding phase to the film winding phase. Thus, the film spool 902 in the film cartridge 100 rotates in the film winding direction, and during this time, various kinds of film information are read from the data disk 904. During this state, the first lock lever 210 and the second lock lever 240 for inhibiting the opening of the cartridge chamber lid 10 are retained in a standby state at a position outside the rotational locus of the controller lock claw 183 of the controller 180, so that neither of the first lock lever 210 and the second lock lever 240 can inhibit the opening of the cartridge chamber lid 10.

In Step S3, the CPU 500 detects through the phase detector 503 whether the driving transmission system is in the film winding phase. If the CPU 500 detects through the phase detector 503 that the driving transmission system is in the film winding phase, the CPU 500 advances the process to Step S4, in which the CPU 500 temporarily stops the motor 307 and hence the cam gear 318 for the purpose of automatic loading. In this step, as described previously, as the driving lever 343 turns, the lock driving lever 220 slides toward the left, while the first lock lever 210 turns counterclockwise, so that the first lock claw 213 turns into and is retained in the rotational locus of the controller lock claw 183 of the controller 180, thereby inhibiting the rotation of the controller 180 and hence the opening of the cartridge chamber lid 10.

In Step S5, the CPU 500 resets a built-in film counter C. Then, in Step S6, the CPU 500 causes the motor driving circuit 501 to reverse the motor 307. At this time, since the driving transmission system is in the film rewinding phase shown in FIGS. 22(a), 22(b) and 23, the fork key 339 and the take-up spool 305 rotate so that the film 302 is fed out of the film cartridge 100 and is then wound around the take-up spool 305, thereby effecting automatic loading.

As the transmission gear 337 rotates clockwise, the second lock lever 240 is rotated counterclockwise by the friction force of the friction spring 245, and the second lock claw 241 rotationally moves into the rotational locus of the controller lock claw 183 of the controller 180, so that the second lock claw 241 comes to a stop and is retained at a position where the second lock claw 241 inhibits the rotation of the controller lock claw 183 of the controller 180 (refer to FIG. 22(b)). Thus, it becomes possible to inhibit the opening of the cartridge chamber lid 10. In Step S5 as well as Step S4, since the first lock lever 210 continues to inhibit the rotation of the controller lock claw 183 of the controller 180, two lock mechanisms, i.e., the first lock lever 210 and the second lock lever 240, are operated as a double lock to inhibit the opening of the cartridge chamber lid 10.

In Step S7, the CPU 500 waits for the perforation 303 to be detected by the perforation detector 502, and if the perforation 303 is detected by the perforation detector 502, the CPU 500 determines that the film 302 has been correctly advanced by one frame, the process proceeds to Step S8. In Step S8, the CPU 500 stops the motor 307, thereby stopping the travel of the film 302. In Step S9, the CPU 500 causes the motor driving circuit 501 to drive the motor 307 forward to rotate the cam gear 318, thereby starting to change over the driving transmission system to the standby phase. Then, in Step S10, if the CPU 500 detects through the phase detector 503 that the driving transmission system is in the standby phase, the process proceeds to Step S11, in which the CPU 500 stops the motor 307 and hence the cam gear 318.

During this time, since the driving transmission system is in the standby phase, the magnetic head 347 is retracted and the winding stopping lever 345 and the engagement claw 356 are respectively engaged with the spool driving gear 319 and the film 302. As shown in FIGS. 26(a), 26(b) and 27, the first lock lever 210 retracts from the rotational locus of the controller lock claw 183 of the controller 180 and releases the inhibition of the opening of the cartridge chamber lid 10, but the second lock lever 240, which is held in the rotational locus of the controller lock claw 183 of the controller 180, can inhibit the opening of the cartridge chamber lid 10.

In Step S12, the CPU 500 performs the calculation of C=C+1 and increments the value of the film counter C by one. In step S13, the CPU 500 detects whether the switch (SW1) 504 and the switch (SW2) 505 are turned on through the first and second strokes of the release button 2. It the CPU 500 detects the on states of the switch (SW1) 504 and the switch (SW2) 505, the CPU 500 performs the driving of the photographing lens by means of light measuring and automatic focus adjusting devices. Then, the process proceeds to Step S14.

In Step S14, the CPU 500 causes the motor driving circuit 501 to rotate the motor 307 forward, thereby rotating the cam gear 318 to start a mirror-up operation. Then, in Step S15, the CPU 500 detects through the phase detector 503 whether the mirror-up operation has been completed. If the CPU 500 detects that the mirror-up operation has been completed, the process proceeds to Step S16, in which the CPU 500 causes the motor driving circuit 501 to stop the motor 307, thereby stopping the cam gear 318. Then, in Step S17, the CPU 500 operates a shutter, a diaphragm and the like (not shown) to perform a known release operation.

After the release operation is completed, the process proceeds to Step S18, in which the CPU 500 causes the motor driving circuit 501 to drive the motor 307 forward, thereby rotating the cam gear 318 to perform a mirror-down operation and a shutter charging operation. While the mirror-down operation and the shutter charging operation are being performed, the magnetic head 347 moves from a retracted position to a projected position for recording or reading information on or from the film 302, and the winding stopping lever 345 and the engagement claw 356 are released from the engagements with the spool driving gear 319 and the film 302, respectively.

During this time, as the transmission gear 337 rotates clockwise, the lock driving lever 220 slides toward the left, while the first lock lever 210 rotates counterclockwise, and the first lock claw 213 turns into and is retained in the rotational locus of the controller lock claw 183 of the controller 180, thereby again inhibiting the rotation of the controller 180 and hence the opening of the cartridge chamber lid 10. In Step S18, the second lock lever 240, which started inhibiting the opening of the cartridge chamber lid 10 in Step S6, continues to inhibit the opening of the cartridge chamber lid 10 and, during this film winding as well, makes the aforesaid double lock function to inhibit accidental opening of the cartridge chamber lid 10. That is to say, the driving transmission system is placed in the state shown in FIGS. 22(a) and 22(b).

In Step S19, the CPU 500 detects through the phase detector 503 whether the driving transmission system is in the film winding phase. If the CPU 500 detects that the driving transmission system is in the film winding phase, the process proceeds to S20 of FIG. 35, in which the CPU 500 stops the motor 307 and hence the cam gear 318. Then, in Step S21, the CPU 500 causes the motor driving circuit 501 to reverse the motor 307. At this time, since the driving transmission system is in the film winding phase shown in FIGS. 22(a), 22(b) and 23, the CPU 500 causes the take-up spool 305 to perform a film winding operation. In Step S22, the CPU 500 performs detection of the perforation 303 through the perforation detector 502, and after the perforation 303 is detected, the process proceeds to Step S23, in which the CPU 500 determines that the film 302 has been advanced by one frame, and the CPU 500 stops the motor 307 and hence the transportation (winding) of the film 302. Then, in Step S24, the CPU 500 stops the motor 307 and performs the calculation of C=C+1 and increments the value of the film counter C by one.

In Step S25, the CPU 500 determines whether the value of the film counter C is smaller than a predetermined value C1. If the relationship between the values C and C1 is C<C1, the process proceeds to Step S26, in which the CPU 500 causes the motor driving circuit 501 to drive the motor 307 forward, thereby rotating the cam gear 318 to start to change over the driving transmission system to the standby phase. Then, in Step S27, the CPU 500 detects through the phase detector 503 whether the driving transmission system is in the standby phase, and the process proceeds to Step S28, in which the CPU 500 stops the motor 307 and hence the cam gear 318. At this time, since the driving transmission system is in the standby phase, the process returns to Step S13 in which the magnetic head 347 is retracted and the winding stopping lever 345 and the engagement claw 356 are respectively engaged with the spool driving gear 319 and the film 302. In Step S13, the process waits for execution of a shutter release operation.

At this time, the first lock lever 210 again retracts from the rotational locus of the controller lock claw 183 of the controller 180 to release the inhibition of the opening of the cartridge chamber lid 10, but since the second lock lever 240 is retained in the rotational locus of the controller lock claw 183 of the controller 180, the second lock lever 240 can inhibit accidental opening of the cartridge chamber lid 10. That is to say, the driving transmission system is in the state shown in FIGS. 26(a) and 26(b).

If the CPU 500 determines in Step S25 that the relationship between the values C and C1 is not C<C1, it indicates that all the frames have been exposed, and the process proceeds to Step S29, in which the CPU 500 causes the motor driving circuit 501 to drive the motor 307 forward, thereby rotating the cam gear 318 to change over the driving transmission system to the film rewinding phase. Then, in Step S30, when the CPU 500 detects through the phase detector 503 that the driving transmission system is in the film rewinding phase, the process proceeds to Step S31, in which the CPU 500 stops the motor 307 and hence the cam gear 318.

Then, in Step S32, the CPU 500 causes the motor driving circuit 501 to reverse the motor 307. At this time, since the driving transmission system is in the film rewinding phase shown in FIGS. 26(a), 26(b) and 27, when the motor 307 is reversed, the fork key 339 is rotated and the film 302 is rewound into the film cartridge 100.

At this time, as the transmission gear 337 rotates clockwise, the second lock lever 240 retracts from the rotational locus of the controller lock claw 183 of the controller 180 and releases the inhibition of the engagement of the cartridge chamber lid 10, but since the first lock lever 210 is retained in the rotational locus of the controller lock claw 183 of the controller 180, the first lock lever 210 can inhibit accidental opening of the cartridge chamber lid 10. That is to say, the driving transmission system is in the state shown in FIGS. 24(a), 24(b).

In Step S33, the CPU 500 determines through the perforation detector 502 whether the film rewinding operation has been completed. If the CPU 500 detects through the perforation detector 502 that the film 302 has been completely rewound into the film cartridge 100 by a known method, the process proceeds to Step S34, in which the CPU 500 stops the motor 307 and hence the film rewinding operation. Then, in Step S35, the CPU 500 causes the motor driving circuit 501 to drive the motor 307 forward to rotate the cam gear 318, thereby changing over the driving transmission system to the standby phase.

At this time, since the first lock lever 210 retracts from the rotational locus of the controller lock claw 183 of the controller 180, the first lock lever 210 releases the inhibition of the engagement of the cartridge chamber lid 10, i.e., the driving transmission system assumes the state shown in FIGS. 20(a), 20(b). Accordingly, since the first lock lever 210 and the second lock lever 240 are released from the inhibition of the opening of the cartridge chamber lid 10, the user can open the cartridge chamber lid 10 by rotating the cartridge chamber lid opening/closing shaft 30 of the cartridge chamber lid 10 and take the film cartridge 100 out of the camera body 1.

Then, in Step S36, the CPU 500 detects through the phase detector 503 whether the driving transmission system is in the standby phase. If the CPU 500 detects that the driving transmission system is in the standby phase, the process proceeds to Step S37, in which the CPU 500 stops the motor 307. Then, in Step S38, the CPU 500 brings the above-described series of operations to an end.

The following description is given in connection with a warning and the like to be given to the user by the external display 507 or the buzzer 508 when the user accidentally performs the manipulation of opening or closing the cartridge chamber lid 10.

Figure 36:
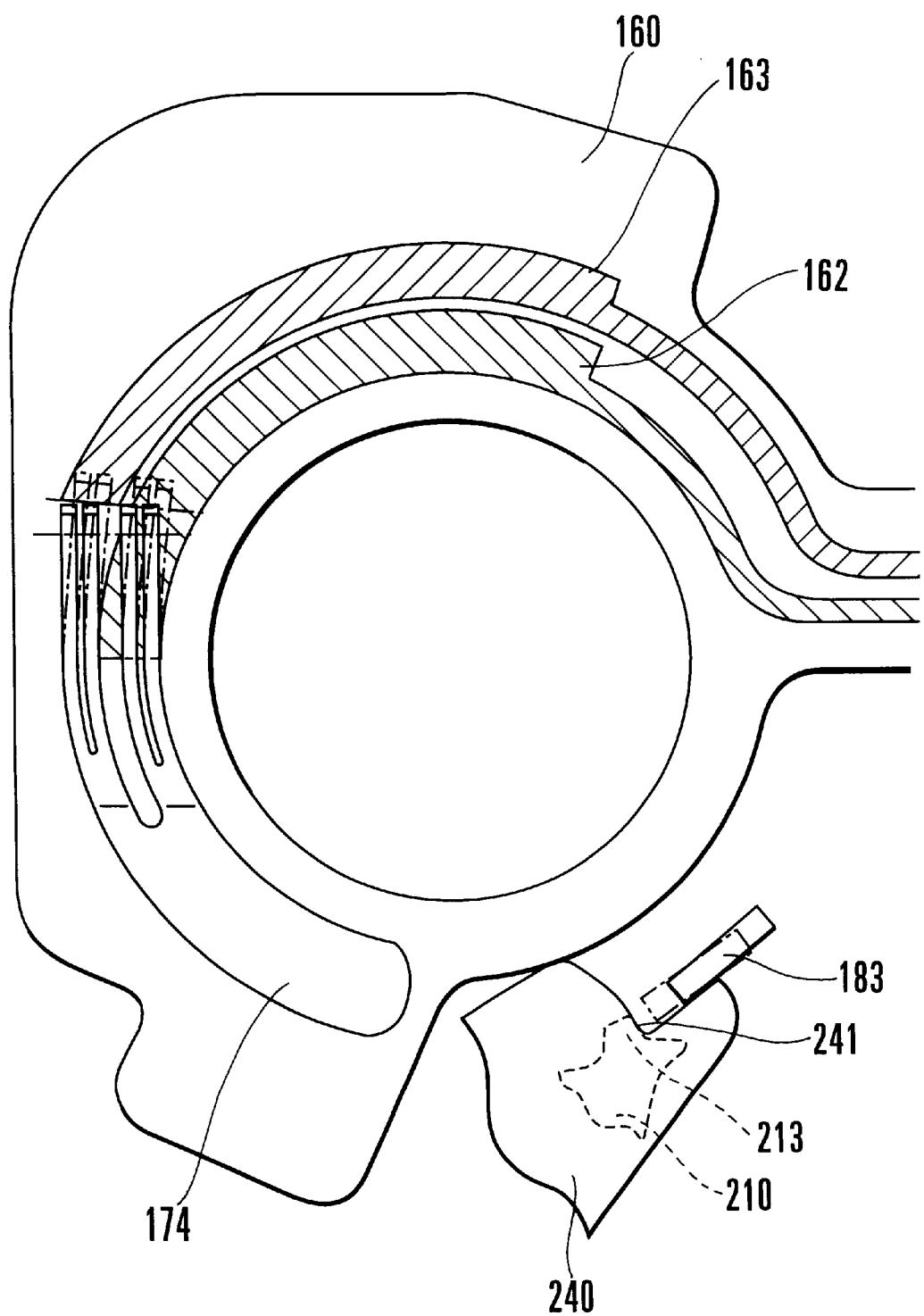
FIG. 36 is a partial enlarged view showing the state in which a printed circuit board and a contact piece, a controller lock claw and a first lock claw as well as a second lock claw are located in a lockable state during the state shown in FIGS. 12(a) and 12(b)

FIG. 36 shows the state in which the cartridge chamber lid 10 is completely closed with the film cartridge 100 being loaded in the cartridge chamber. FIG. 36 is a partial enlarged view showing the switch patterns 162 and 163 provided on the printed circuit board 160, the contact piece 174 fixed to the driver driving plate 170, the first lock claw 213 (shown by a dashed line) of the first lock lever 210 and the second lock claw 241 of the second lock lever 240, all of which constitute an essential portion, i.e., the cartridge chamber lid opening/closing switch SWCT (506), which is in a state similar to that shown in FIGS. 12(a), 12(b).

Referring to FIG. 36, if the film cartridge 100 is loaded into the cartridge chamber and the film 302 is fed out of the film cartridge 100, the second lock claw 241 of the second lock lever 240 is moved to a position where the second lock claw 241 can lock the controller lock claw 183, by the rotation of the transmission gear 337, and is placed into a standby state at that position.

During the standby state, if the user accidentally manipulates the opening/closing knob 50 of the cartridge chamber lid 10 and the cartridge chamber lid opening/closing shaft 30 is turned in the opening direction, the cartridge chamber lid engagement lever 80 interlockingly drives the connecting lever 120 to rotate the controller 180. Since the controller 180 rotates integrally with the driver driving plate 170 as described previously, the contact piece 174 fixed to the driver driving plate 170 and the controller lock claw 183 of the controller 180 rotate clockwise as shown by two-dot chain lines in FIG. 36, and the switch patterns 162 and 163 provided on the printed circuit board 160 are made to conduct by the contact piece 174 so that the cartridge chamber lid opening/closing switch SWCT (506) changes from an off state to an on state. At this time, a small clearance is formed between the controller lock claw 183 and the first lock claw 213 as well as the second lock claw 241, the controller lock claw 183 can be locked, but is not locked.

When the cartridge chamber lid opening/closing switch SWCT (506) changes over from the off state to the on state, the CPU 500 determines whether a photographing sequence or a film rewinding sequence is being currently performed. If the photographing sequence or the film rewinding sequence is being currently performed, the CPU 500 determines that the user is performing an abnormal manipulation, and causes the buzzer 508 to warn the user with sound and also gives a visual warning to the user by providing the warning display "CLOSE" indicated at 507a in FIG. 38, by using the external display 507 shown in FIG. 37. Incidentally, the CPU 500 stops the subsequent operation of the camera (but continues to execute a sequence which is already in progress, in view of the following processing). This is because the stoppage of the operation of the camera becomes a kind of warning, and also because if the camera continues to be operated while an excessive load is being applied to each member by the manipulation of the user, a problem such as the breakage of a driving mechanism may occur.

If the user further manipulates the opening/closing knob 50 of the cartridge chamber lid 10 in the opening direction so that the cartridge chamber lid opening/closing shaft 30 is turned in the opening direction, the controller lock claw 183 comes into abutment with the first lock claw 213 and the second lock claw 241 because the first lock claw 213 and the second lock claw 241 are located at the positions shown in FIG. 36. Thus, the controller lock claw 183 inhibits the turning of the cartridge chamber lid opening/closing shaft 30 in the opening direction, thereby inhibiting the opening of the cartridge chamber lid 10. Incidentally, during this time as well, the CPU 500 continues to give the user a warning with sound and provide the warning display "CLOSE" by means of the external display 507.

During this time, if the user removes his/her hand from the opening/closing knob 50 of the cartridge chamber lid 10, the controller 180 is restored to the state shown in FIGS. 12(a), 12(b) by the operating force of the connecting lever 120 due to the spring force of the driving spring 250 as well as the spring force of the ejecting spring 130. In addition, since the cartridge chamber lid opening/closing switch SWCT (506) is turned off, the CPU 500 turns off the warning using the sound of the buzzer 508 and the warning display "CLOSE" using the external display 507, and changes over the display of the external display 507 to a display indicative of the state in which preparation for photography is completed.

Figure 38:
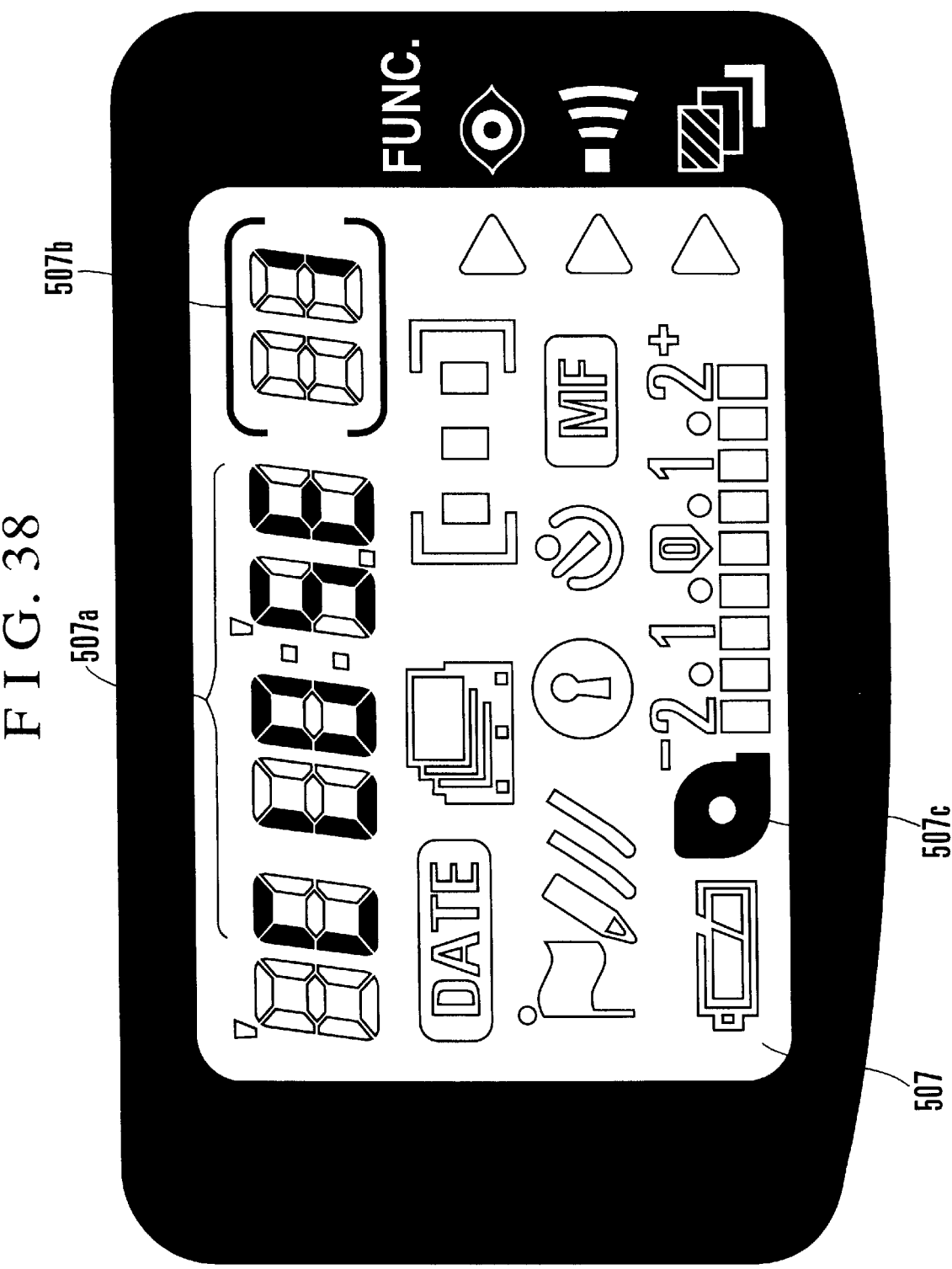
FIG. 38 is a view showing a warning display which is provided by an external display of the camera according to the embodiment of the present invention.

FIG. 38 is a view showing the state in which the warning display 507a, "CLOSE", is provided by the external display 507 which is provided on the back of the camera body 1 as described above (refer to FIG. 37).

In FIG. 38, black-painted mark portions are portions which are displayed in dark visible states, and the warning display 507a, "CLOSE", is provided by using a shutter time display portion and aperture value display segments. In FIG. 38, reference numeral 507b denotes a film counter display portion, and reference numeral 507c denotes a cartridge mark. In FIG. 38, outlined mark portions are portions which are placed in invisible states.

Figure 39:
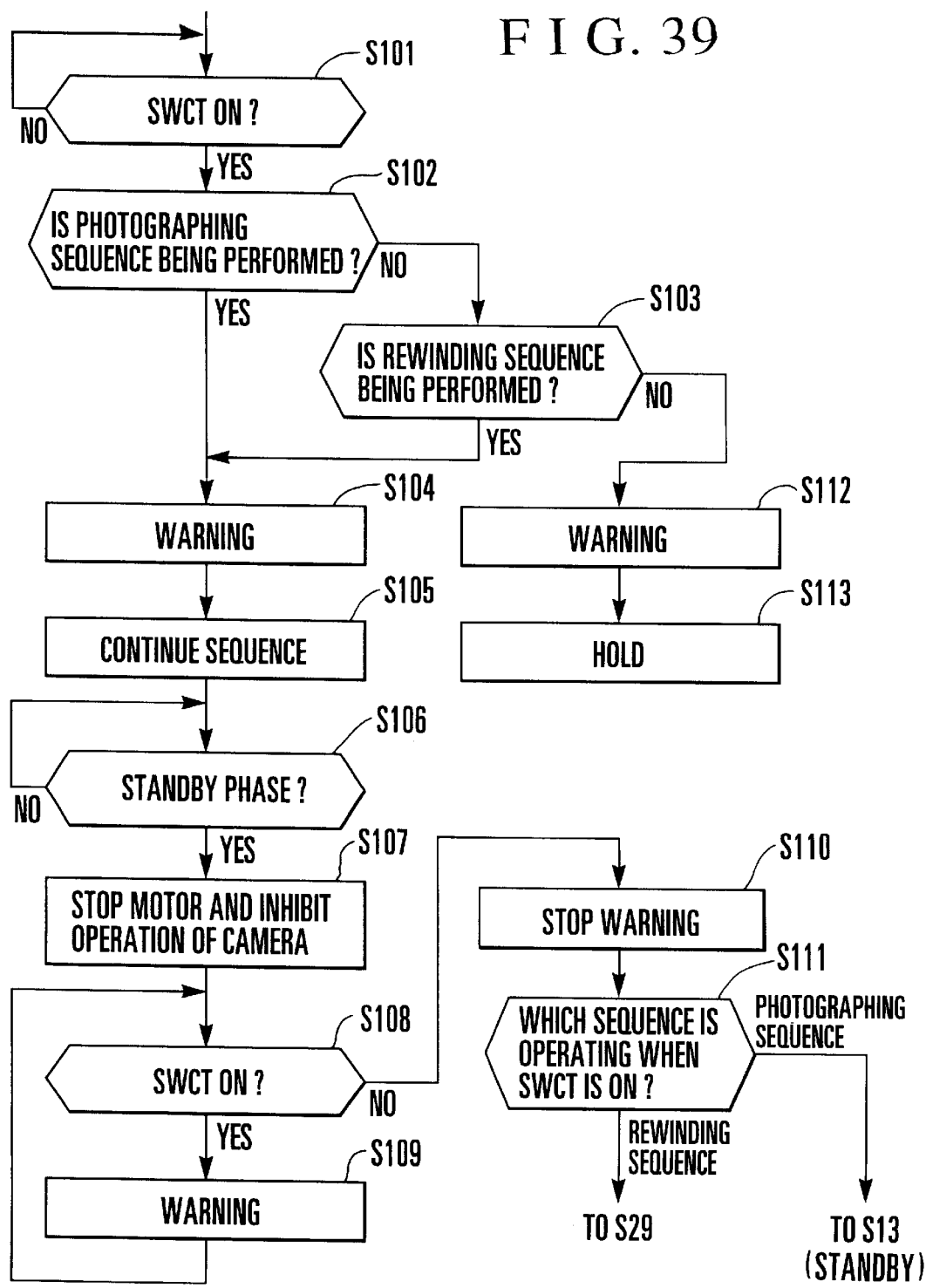
FIG. 39 is a flowchart showing an operation to be executed by the controlling microcomputer (CPU) when an opening/closing knob is abnormally manipulated.

FIG. 39 is a flowchart showing an operation to be executed by the CPU 500 when the user accidentally manipulates the opening/closing knob 50 of the cartridge chamber lid 10. Incidentally, this operation is started by the cartridge chamber lid opening/closing switch SWCT (506) being turned on while the operation shown in FIGS. 34 and 35 is being performed.

In Step S101, the CPU 500 detects whether the cartridge chamber lid opening/closing switch SWCT (506) has been turned on. If the CPU 500 detects that the cartridge chamber lid opening/closing switch SWCT (506) has been turned on, the process proceeds to Step S102, in which the CPU 500 determines whether the photographing sequence is being performed. If the photographing sequence is being performed, the CPU 500 determines that the user has accidentally manipulated the opening/closing knob 50 and turned the cartridge chamber lid opening/closing shaft 30 in the opening direction so that the cartridge chamber lid opening/closing switch SWCT (506) has been turned on, i.e., the user has performed an abnormal manipulation, and the process proceeds to Step S104. On the other hand, if the photographing sequence is not being performed, the process proceeds to Step S103, in which the CPU 500 determines whether the film rewinding sequence is being performed. If the film rewinding sequence is being performed, the CPU 500 determines that the user has performed an abnormal manipulation, as in the case of the photographing sequence, and the process proceeds to Step S104.

If the CPU 500 determines through Steps S102 and S103 that neither the photographing sequence nor the film rewinding sequence is being performed, the process proceeds from Step S103 to Step S112 because an abnormal state may occur. In Step S112, the CPU 500 provides a warning using, for example, the buzzer 508 alone, (i.e., a warning different from the warning provided at the time of the abnormal manipulation), and in Step S113, brings the camera to a held state.

If the CPU 500 determines that the user has performed an abnormal manipulation as described above, the process proceeds to Step S104, in which the CPU 500 gives a warning using the sound of the buzzer 508 and also gives a visual warning to the user by providing the warning display "CLOSE" 507a by using the external display 507. Then, in Step S105, the CPU 500 continues to execute a sequence which is already in progress at the time of completion of photography or film winding. Then, in Step S106, the process waits until the standby phase which is a phase to be taken at the time of completion of photography or film rewinding is detected by the phase detector 503. If the CPU 500 detects that the driving transmission system is in the standby phase, the process proceeds to Step S107, in which the CPU 500 stops the motor 307 and hence the cam gear 318, thereby inhibiting the subsequent operation of the camera.

Then, in Steps S108 and S109, the CPU 500 continues to give the aforesaid warnings as long as the cartridge chamber lid opening/closing switch SWCT (506) remains on.

Then, if the user notices the aforesaid warnings and removes his/her hand from the opening/closing knob 50, the controller 180 is restored to the state shown in FIGS. 12(a), 12(b) by the spring force of the driving spring 250 and the operating force of the connecting lever 120 due to the spring force of the ejecting spring 130, whereby the cartridge chamber lid opening/closing switch SWCT (506) is turned off. Then, the CPU 500 proceeds from Step S108 to Step S110, in which the CPU 500 turns off the warnings using the buzzer 508 and the external display 507. Then, in Step S111, the CPU 500 determines whether the operational sequence which was being performed when the cartridge chamber lid opening/closing switch SWCT (506) was turned on is the photographing sequence or the film rewinding sequence. In the case of the photographing sequence, the CPU 500 changes over the display of the external display 507 to a display indicative of the state in which preparation for photography is completed, and returns the process to Step S13 of FIG. 34, i.e., the standby state. On the other hand, if the film rewinding sequence is being performed, the CPU 500 changes over the display of the external display 507 to a display indicative of the state in which exposure of all the frames are completed, and returns the process to Step S29 of FIG. 35. This flow is intended to again perform a film rewinding operation in order to confirm the completion of film rewinding and in order to cause the first lock lever 210 and the second lock lever 240 to perform their release operations (reliably perform their release operations), if the film rewinding sequence is being performed when the cartridge chamber lid opening/closing switch SWCT (506) is turned on.

According to the above-described embodiment, there is provided a lock mechanism which is provided with the first lock lever 210 which interlocks with the operation of releasing the film take-up spool of the camera from its winding stoppage state and the operation of bringing the magnetic head into contact with the film to magnetically record information on the film, and the lock mechanism is arranged so that the cartridge chamber lid 10 is locked by the first lock lever 210 while the film is being wound or rewound or magnetic information is being recorded on the film. The lock mechanism is also provided with the second lock lever 240 which interlocks with the rotation of a gear which constitutes part of a film transporting gear train of the camera, and the cartridge chamber lid 10 is locked by the second lock lever 240. Accordingly, the lock mechanism has the following effects and advantages.

1) The lock mechanism can inhibit accidental opening of the cartridge chamber lid 10 without the need for a dedicated actuator even if the opening/closing knob of the cartridge chamber lid 10 is manipulated.

2) The lock mechanism can be realized with a reduced number of components at a low cost because the first and second lock levers 210 and 240 are operated by power transmitted via an existing power dividing mechanism or gear train.

3) The lock mechanism can be realized as a reliable lock mechanism which can withstand vibration or falling.

4) The lock mechanism can be easily manipulated by the user of the camera because the cartridge chamber lid 10 can be prevented from opening accidentally but can be opened or closed in a conventional way.

5) The lock mechanism can automatically engage or disengage a lock according to the mechanical movement of the camera.

6) In the lock mechanism, since the first and second first lock levers 210 and 240 interlock with members which open and close the light-lock door of the film cartridge 100, it is possible to prevent the problem that a light-shielding plate provided in the film cartridge 100 (the film egress/ingress slot) moves due to an accidental opening manipulation of the cartridge chamber lid 10 and scratches the film 302.

7) Unlike conventional arrangements, since it is not necessary to provide a forced rewinding switch together with the cartridge chamber lid opening/closing knob 50, the design of the camera is not greatly restricted.

8) Since the cartridge chamber lid 10 is double-locked by the first and second first lock levers 210 and 240 during film winding, accidental opening of the cartridge chamber lid 10 can be inhibited more reliably.

9) Even if the first lock lever 210 does not lock the cartridge chamber lid 10 (during a winding stoppage state or the like), the second lock lever 240 operates to lock the cartridge chamber lid 10, whereby it is possible to reliably effect an operation such as the inhibition of accidental opening of the cartridge chamber lid 10.

10) When the cartridge chamber lid 10 is double-locked during a photography-ready state with the film cartridge 100 being loaded, if the opening operation of the cartridge chamber lid 10 is inhibited by a malfunction of the lock levers, the film cartridge 100 may become unable to be removed from the camera. However, the above-described embodiment is arranged so that only the second lock lever 240 locks the cartridge chamber lid 10 during the photography-ready state with the film cartridge 100 being loaded, whereby it is possible to comparatively easily take a countermeasure for removing the film cartridge 100 when the opening operation of the cartridge chamber lid 10 is inhibited by a malfunction of the lock levers.

During the state shown in FIGS. 26(a), 26(b), i.e., when the second lock lever 240 is held in the rotational locus of the controller lock claw 183 and the opening of the cartridge chamber lid 10 is inhibited, if the opening/closing knob 50 is accidentally manipulated and the cartridge chamber lid opening/closing shaft 30 is turned in the opening direction, the CPU 500 determines that the user has performed an abnormal manipulation, and gives a warning using both the buzzer 508 and the external display 507 so that the user can notice his/her abnormal manipulation and remove his/her hand from the opening/closing knob 50. Accordingly, unlike conventional lock mechanisms, it is possible to reliably prevent the problem that the second lock lever 240 is not allowed to retract from and is forcedly retained in the rotational locus of the controller lock claw 183 during film rewinding, and after the completion of film rewinding, the cartridge chamber lid 10 becomes unable to be opened so that the film cartridge 100 becomes unable to be removed from the cartridge chamber lid 10. In addition, it is possible to reliably prevent the problem that the opening/closing knob 50, the second lock lever 240 and the controller lock claw 183 as well as the driving mechanism connected to these members 50, 240 and 183 are damaged or malfunction as the result of the application of an excessive force.

Furthermore, if the user performs an abnormal manipulation on the opening/closing knob 50, the operational sequence of the camera becomes unable to proceed, whereby it is possible to reliably prevent malfunction of the camera.

The individual components shown in schematic or block form in the drawings are all well-known in the camera arts and their specific construction and operation are not critical to the operation or best mode for carrying out the invention.

While the present invention has been described with respect to what is presently considered to be the preferred embodiment, it is to be understood that the invention is not limited to the disclosed embodiment. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

For example, although in the above-described embodiment both the buzzer and the visual display are used to warn the user of an abnormal manipulation of the opening/closing knob, either one of the buzzer and the visual display may be used.

In the flowchart of FIG. 39, if the user performs an abnormal manipulation on the opening/closing knob, an operational sequence which is currently being performed (a photographing sequence intended for a particular frame which is being exposed during photography, or a film rewinding sequence) continues to be executed. However, only a warning may be given until the abnormal manipulation is released.

Although in the above-described embodiment the magnetic head is moved backward and forward, the present invention can be applied to an arrangement in which the pad is moved backward and forward.

In addition, although in the above-described embodiment the take-up spool is engaged to stop winding, the present invention can be applied to an arrangement in which another positioning member such as a sprocket of a film transporting device is engaged to provide a winding stoppage state.

In addition, although the above-described embodiment is applied to an arrangement which winds a film frame by frame each time one frame of the film is exposed during photography, the present invention can be applied to a camera of a so-called prewind type which winds up a film by a length equivalent to all the frames and allows photography to be performed frame by frame during the rewinding of the film. According to the above-described embodiment, this type of camera can be easily realized, as by reversing the rotating direction of the planetary clutch mechanism.

In addition, although the above-described embodiment has a construction in which the cartridge chamber lid is locked by the first and second lock levers in an indirect manner, i.e., via a manipulating member for opening and closing the cartridge chamber lid, the present invention is not necessarily limited to such a construction and can also be applied to a construction in which the cartridge chamber lid is directly locked.

The present invention can also be applied to a film cartridge which differs in type from that used in the above-described embodiment, or to a cartridge having an image recording medium other than a film.

The present invention can also be carried out by combining technical elements of the above-described embodiment, as required.

The present invention can also be applied to various types of cameras such as a single-lens reflex camera, a lens shutter camera or a video camera.

What is claimed is:

1. A camera comprising:
   (A) a cartridge chamber;
   (B) a cartridge chamber lid which opens and closes said cartridge chamber;
   (C) a holding device (180,183) which holds said cartridge chamber lid in closed state;
   (D) a first engagement device which keeps said holding device in a locked state, with said cartridge chamber lid being held by said holding device; and
   (E) a second engagement device which keeps said holding device in a locked state when said first engagement device keeps said holding device in a locked state.

2. A camera according to claim 1, wherein both said first and second engagement devices operate during winding of an image recording medium.

3. A camera according to claim 1, further comprising an image recording medium transporting device, said first engagement device operating in interlocking relation to an operation of said image recording medium transporting device.

4. A camera according to claim 1, further comprising an image recording medium transporting device, said first and second engagement devices operating in interlocking relation to an operation of said image recording medium transporting device.

5. A camera according to claim 1, further comprising an image recording medium transporting device, said first engagement device operating in interlocking relation to a completion of an image recording medium transporting operation of said image recording medium transporting device.

6. A camera according to claim 5, wherein said second engagement device operates in interlocking relation to the image recording medium transporting operation of said image recording medium transporting device.

7. A camera according to claim 1, wherein said second engagement device operates in interlocking relation to an image recording medium transporting operation of said image recording medium transporting device in a winding direction.

8. A camera according to claim 1, further comprising an image recording medium transporting device, said second engagement device operating in interlocking relation to an image recording medium transporting operation of said image recording medium transporting device.

9. A camera according to claim 1, further comprising an image recording medium transporting device, said second engagement device operating in interlocking relation to an image recording medium transporting operation of said image recording medium transporting device in a winding direction.

10. A camera according to claim 1, further comprising a head moving device for moving a head which performs at least one of recording of information on an image recording medium and reading of information from the image recording medium, said first engagement device operating in interlocking relation to an operation of said head moving device.

11. A camera according to claim 1, further comprising a manipulating device for manipulating said cartridge chamber lid to cause said cartridge chamber lid to open, at least one of said first and second engagement devices disabling a function of said manipulating device.

12. A camera according to claim 1, further comprising a manipulating device for manually manipulating said cartridge chamber lid to cause said cartridge chamber lid to open, at least one of said first and second embodiment devices disabling a function of said manipulating device.

13. A camera according to claim 12, further comprising a driving device for driving a film egress part of a film cartridge to be loaded into said cartridge chamber, said driving device interlocking with said manipulating device.

14. A camera according to claim 1, wherein a film cartridge is loaded into said cartridge chamber.

15. A camera comprising:
(A) a cartridge chamber;
(B) a cartridge chamber lid which opens and closes said cartridge chamber;
(C) a manipulating device for manually manipulating said cartridge chamber lid to cause said cartridge chamber lid to open;
(D) a holding device which holds said cartridge chamber lid in a closed state, the holding of said holding device being released by an opening operation of said manipulating device;
(E) an engagement device which keeps said holding device in a locked state with said first engagement device being held by said holding device; and
(F) a warning device which warns when said manipulating device manipulates while said engagement device keeps said holding device in the locked state.

16. A camera according to claim 15, further comprising a stopping device which stops an operation of said camera if said manipulating device is manipulated when said engagement device is operating.

17. A camera according to claim 15, wherein a film cartridge is loaded into said cartridge chamber.

18. A camera according to claim 1, further comprising film transport means for winding and rewinding a film, wherein said second engagement device brings said cartridge chamber lid into a locked state in association with the winding operation of said film transport means, and releases the locked state in association with the rewinding operation of said film transport means.

19. A camera according to claim 1, further comprising:
a shutter member which exposes light on a film; and
a shutter charging mechanism which charges said shutter member to effect the exposure of said film, wherein said first engagement device brings said cartridge chamber lid into a locked state in association with the charging operation of said shutter charging mechanism, and releases the locked state at least while the film is exposed by said shutter member.

20. A camera according to claim 18, further comprising:
a shutter member which exposes light on the film; and
a shutter charging mechanism which charges said shutter member to effect the exposure of said film, wherein said first engagement device brings said cartridge chamber lid into a locked state in association with the charging operation of said shutter charging mechanism, and releases the locked state at least while the film is exposed by said shutter member.

* * * * *

UNITED STATES PATENT AND TRADEMARK OFFICE
CERTIFICATE OF CORRECTION

PATENT NO.     : 6,295,421 B1                                            Page 1 of 1
DATED          : September 25, 2001
INVENTOR(S)    : Toshio Matsumoto It is certified that error appears in the above-identified patent and that said Letters Patent is hereby corrected as shown below:

Title page,
Item [54] delete "CAMERA" and insert -- CAMERA HAVING A CARTRIDGE CHAMBER LID --.

Column 5,
Line 38, delete "an" and insert -- a --.

Signed and Sealed this

Ninth Day of July, 2002

*Attest:*

JAMES E. ROGAN
*Attesting Officer*                    *Director of the United States Patent and Trademark Office*